United States Patent
Finn et al.

(10) Patent No.: US 6,728,205 B1
(45) Date of Patent: Apr. 27, 2004

(54) METHOD AND APPARATUS FOR AUTOMATIC PROTECTION SWITCHING

(75) Inventors: Steven G. Finn, Framingham, MA (US); Muriel Medard, Lexington, MA (US); Richard A. Barry, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/018,354

(22) Filed: Feb. 4, 1998

Related U.S. Application Data

(63) Continuation-in-part of application No. 08/803,169, filed on Feb. 19, 1997, now Pat. No. 6,047,331.
(60) Provisional application No. 60/067,272, filed on Dec. 3, 1997.

(51) Int. Cl.[7] .......................... H04L 12/26; H04L 12/28; G06T 11/20
(52) U.S. Cl. ...................... 370/217; 370/400; 370/254; 345/440
(58) Field of Search ............................... 370/217, 216, 370/241, 224, 249, 256, 248, 258, 400, 406, 408, 410, 242, 244, 221, 351, 389, 392, 254; 345/440; 716/10; 709/220, 200, 221, 223, 224, 225, 226, 229, 238, 239; 714/1, 2, 776, 712, 716

(56) References Cited

U.S. PATENT DOCUMENTS

| | | | |
|---|---|---|---|
| 4,527,012 A | 7/1985 | Caplan et al. | 179/18 ES |
| 5,210,871 A | 5/1993 | Lala et al. | 395/650 |
| 5,233,604 A * | 8/1993 | Ahmadi et al. | 370/235 |
| 5,243,704 A | 9/1993 | Baty et al. | 395/325 |

(List continued on next page.)

OTHER PUBLICATIONS

"A Quick Method for Finding Shortest Pairs of Disjoint Paths", Suurballe, et al., NETWORKS, vol. 14 (1984) 325–336, 1984.

"Dynamics of Distributed Shortest–Path Routing Algorithms", Zaumen, et al., SRI International, 333 Ravenswood Avenue, Menlo Park, CA 94025, 1991 ACM 0–89791–444–9/91/0008/0031, pp. 31–43.

(List continued on next page.)

*Primary Examiner*—Min Jung
*Assistant Examiner*—Andy Lee
(74) *Attorney, Agent, or Firm*—Daly, Crowley & Mofford, LLP

(57) ABSTRACT

A Bi-directional Link Self-healing Network (BLSN) for implementing bi-directional link automatic protection switching (APS) for an arbitrary edge or node redundant network and a technique for implementing APS recovery in response to an edge or node failure in a network is described. The BLSN technique does not require permanent allocation of spare capacity for each connection and allows sharing of capacity among many network connections by allocating capacity for use only in the event of a failure. The described technique allows loopback protection to be performed over node or edge redundant networks and operates such that the remains connected after the failure of a node or an edge in the network. The technique makes use of connected directed subgraphs of the network. Also described are techniques for generating the directed subgraphs on node and edge redundant networks having an arbitrary network topology.

22 Claims, 30 Drawing Sheets

U.S. PATENT DOCUMENTS

| | | | |
|---|---|---|---|
| 5,271,014 A | 12/1993 | Bruck et al. | 371/11.1 |
| 5,327,427 A | 7/1994 | Sandesara | 370/85.14 |
| 5,333,130 A | 7/1994 | Weissmann et al. | 370/16 |
| 5,408,462 A | 4/1995 | Opoczynski | 370/16 |
| 5,495,471 A * | 2/1996 | Chow et al. | 370/221 |
| 5,515,367 A | 5/1996 | Cox, Jr. et al. | 370/60.1 |
| 5,515,487 A * | 5/1996 | Beaudet et al. | 345/440 |
| 5,544,330 A | 8/1996 | Bither et al. | 395/280 |
| 5,550,805 A | 8/1996 | Takatori et al. | 370/16.1 |
| 5,572,513 A | 11/1996 | Yamamoto et al. | 370/16 |
| 5,610,904 A * | 3/1997 | Eng et al. | 370/408 |
| 5,777,988 A * | 7/1998 | Cisneros | 370/238 |
| 5,831,975 A * | 11/1998 | Chen et al. | 370/256 |
| 5,923,646 A * | 7/1999 | Mandhyan | 370/254 |
| 5,971,596 A * | 10/1999 | Nishikawa | 716/10 |
| 5,999,286 A * | 12/1999 | Venkatesan | 370/225 |
| 6,061,335 A * | 5/2000 | De Vito et al. | 370/258 |
| 6,122,283 A * | 9/2000 | Lee | 370/408 |
| 6,430,150 B1 * | 8/2002 | Azuma et al. | 370/218 |

OTHER PUBLICATIONS

"Edge–Disjoint Branchng in directed Multigraphs", Shiloach, Computer Science Department, Stanford University, Standord, CA 94305, vol. 8, No. 1, Jan. 1979, pp 24–27.

"Design and Performance of Convergence Routing on Multiple Spanning Trees", Yener, et al., 1994 IEEE, pp. 169–175.

"Optimal Routing in Circuit Switched Communication Networks", Gersht, et al., IEEE, vol. 37, No. 11 Nov. 1989, pp 1203–1211.

"A Linear–Time Algorithm for Finding a Sparse $k$–Connected Spanning Subgraph of a $k$–Connected Graph[1]", Nagamochi[2], et al., Algorithmica (1992) 7: 583–596.

"On Algorithms for Enumerating All Circuits of A Graph*", Mateti, et al. SIAM J. Comput., vol. 5, No. 1, Mar. 1976, pp 90–99.

"Finding Maximal Link Disjoint Paths in a Multigraph", Whalen, et al., Tellabs, Inc. Research Center, 3702 N. Main Bldg. 2, Mishawaka, IN 46545, 1990 IEEE, pp. 403.6.1–403.6.5.

"Disjoint Paths in a Network", Suurballe, Netowrks, 4: 125–145, 1974 by John Wiley & Sons, Inc.

"An Optimal Spare–Capacity Assignment Model for Survivable Netowrks with Hop Limits", Herzberg, et al., Telecom Australia Research Laboratories, 770 Blackburn Rd., Clayton vic. 3168, Australia, Globecom '94, vol. 3, pp. 1601–1606.

"Implementation of Self–Healing Function in ATM Networks", Kawamura, et al., Journal of Network & Systems Management, vol. 3, No. 3, 1995, pp 243–265.

"Feasibility Study of a High–Speed SONET Self–Healing Ring Architecture in Future Interoffice Networks", Wu, et al. Nov. 1990, IEEE Communications Magazine, vol. 28, No. 11, pp 33–51.

"Dimensioning of Self–Healing Rings and Their Interconnections", Shi, et al., School of Engineering & Computer Science, University of Texas at Dallas, EC 33, 2601 North Floyd Rd, Richardson, TX 75080, 1993 IEEE, pp. 1579–1583.

"An Algorithm for Designing Rings for Survivable Fiber Networks", Wasem, IEEE Transactions on Reliability, vol. 40, No. 4, 1991 Oct., pp 428–432.

"A Capacity Comparison for SONET Self–Healing Ring Networks", Shyur, et al., Telecommunication Labs, DGT Taiwan R.O.C., 6F No. 16, Chinan Road, Sec. 2, Taipei 100, 1993 IEEE, pp 1574–1578.

"Implementation of Self–Healing Function in ATM Networks", Kawamura, et al., Journal of Network & Systems Management, vol. 3, No. 3, 1995, pp. 243–265.

"Virtual Path Routing for Survivable ATM Networks", Murakami, IEEE/ACM Transactions on Networking, vol. 4, No. 1 Feb. 1996, pp 22–39.

"Multicast Tree Generation in Networks With Asymmetric Links", Ramanathan, IEE/ACN Transactions on Networking, vol. 4, No. 4, Aug. 1996, pp 558–568.

"Address Management and Connection Control for Multicast Communication Applications", Eleftheriadis, et al., Department of Electrical Engineering & Center for Telecommunications Research Columbia University, New York, NY 10027, pp. 386–393.

"Adaptive Multicast Routing in Single Rate Loss Networks", Hwang, Department of Computer Sciences & Information Engineering National Chung Cheng University, Chia–Yi, Taiwan, R.O.C., 1995 IEEE, pp. 571–578.

"Steiner Tree Problems", Hwang et al., NETWORKS, vol. 22 (1992) 55–89.

"Steiner's problem in graphs: heuristic methods", Stefan Voβ, Discrete Applied Mathematics 40 (1992) 45–72 North–Holland.

"A Good Algorithm for Edge–Disjoint Branching", Tarjan, Information Processing Letters, vol. 3, No. 2, Nov. 1974, pp 51–53.

"Steiner Problem in Networks: A Survey", Winter, NETWORKS, vol. 17 (1987) 129–167.

"Dynamic Steiner Tree Problem*", Imase et al., SIAM J. Disc. Math., vol. 4, No. 3, pp. 369–284, Aug. 1991.

"Path–Distance Heuristics for the Steiner Problem in Undirected Networks", Winter et al., Algorithmica (1992) 309–327.

"Routing of Multipoint Connections", Waxman, IEEE Journal on Selected Areas in Communications, vol. 6, No. 9, Dec. 1988.

"Routing to Multiple Destinations in Computer Networks", Bharath–Kumar et al., IEEE Transactions on Communications, vol. Com–31, No. 3, Mar. 1983.

"ARIES: A Rearrangeable Inexpensive Edge–based On–line Steiner Algorithm", Bauer et al., Computer Engineering Department University of California, Santa Cruz, CA 95064.IEEE, 1996.

"An SST–Based Algorithm for the Steiner Problem in Graphs", Beasely, NETWORKS, vol. 19 (1989) 1–16.

"Graph Theoretic Models for Multicast Communications", North–Holland, Computer Networks and ISDN Systems 20 (1990) 95–99.

"Multicasting for Multimedia Applications", Kompella, Computer Sysems Laboratory Department of Computer Science and Engineering University of California, San Diego, La Jolla, CA 92093–0114.

"Greedy Algorithms for the On–Line Steiner Tree and Generalized Steiner Problems", Westbrook et al., Dept. of Computer Science, Yale University, New Haven, CT 06520–2158, Department of Operations Research, Yale University, New Haven, CT 06520–0162, pp 622–633.

"Comparison of Dynamic Multicast Routing Algorithms for Wide–Area Packet Switched (Asynchronous Transfer Mode) Networks", Kadirire et al., University College London, Computer Science Department, Gower Street, London WC1E 6BT.

"Distributed Algorithms for Multicast Path Setup in Data Networks", Bauer et al., Computer Engineering Department University of CA, Santa Cruz, CA 95064, 1995 IEEE.

"Degree–Constrained Multicasting in Point–to–Point Networks", Bauer et al., Computer Engineering Department University of California, Santa Cruz, CA 95064, 1995 IEEE.

"Distributed Algorithms for Multicast Path Setup in Data Networks", Bauer et al., IEEE/ACM Transactions on Networking, vol. 4, No. 2, Apr. 1996.

"Dispersity Routing on ATM Networks", Naxencgyj et ak,m /at&T Bell Laboratories, 1993 IEEE.

"An Optimal VP–Based Multicast Routing in ATM Networks", San–Baeg Kim, Telecommunication Networks Research Laboratories, Korea Telecom, 17 Woomyun–dong, Seocho–gu, Seoul, Korea, 1996 IEEE.

"Hierarchical Mullticast Routing in ATM Netowrks", Venkateswaran et al., School of EECS, Wahsington State University, Pullman, WA 99164–2752, AT&T Bell Laboratories, 101 Crawfords Corner Road, Holmdel, NJ 07747.

"Multipoint Connection Routing", Lee et al., International Journal of Digital and Analog Communication Systems, vol. 3, 177–186 (1990).

"Routing to Multiple Destinations in Computer Networks", Bharath–Kumar et al., IEE Transactions on Communications, vol. Com–31, No. 3, Mar. 1983.

"Routing in the Manhattan Street Network", Maxemchuk, Transactions on Communications, vol. Com–35, No. 5, May 1987.

"Design and Performance of Convergence Routing on Multiple Spanning Trees", Yener et al., Globecom 94, vol. 1, 1994 IEEE.

"Protection Planning in Transmission Networks", Barezzani et al., Telettra S.p.A., Cinisello Balsamo (MI), Italy & UCLA Computer Science Dept., Los Angeles, CA, 1992 IEEE.

"Techniques for Finding Ring Covers in Survivable Networks", Gardner et al., Globecom '96, vol. 3, IEEE, pp 1862–1866.

"Span–Disjoint Paths for Physical Diversity in Networks", Shaikh, Computers & Communications, 1995, pp 127–133.

"Optimal Diverse Routing in Telecommunication Fiber Networks", Bhandari, AT&T Bell Laboratories, Crawfords Corner Road, Holmdel, NJ 077033, 1994 IEEE.

"Interconnection of Self–Healing Rings", Shi et al., University of Texas at Dallas, ICC, 1990.

"How Bad is Naive Multicast Routing?", Doar et al., University of Cambridge Computer Laboratory, New Museums Site, Pembroke Street, Cambridge CB2 3QG. U.K., 1993 IEEE.

"Combinatorial Algorithms", Edmonds, Courant Computer Science Symposium 9: Jan. 24–25, 1972.

"Increased capacity in an MS protection ring using WDM technique and OADM: the 'coloured section' ring", Hamel et al., Electronics Letters Online No: 19960118, Aug. 24, 1995.

"A Novel Passive Protected SONET Bi–Directional Self–Healing Ring Architecture", Wu et al., Bellcore, 331 Newman Springs Rd., Red Bank, NJ 07701–7040, MILCOM 1991.

"Use of quasi–distributed optical amplification in SONET self–healing inter–exchange networks", Goldstein et al., Optical Fiber Communication Conference, 1992 Technical Digest Series, vol. 5, Conference Edition, Feb. 2–7, 1992, San Jose, California.

"Synchronizing The Rings and Chains of Sonet", 1995 Telecom Solutions, a division of SymmetriCom, Inc., Iss 3, pp. 1–11.

"Multiwavelength Ring Networks for Switch Consolidation and Interconnection", Wagner et al., Bellcore, 445 South Street, Morristown, NJ 07962, pp. 1173–1179, 1992 IEEE.

"OFC/IOOC'93", Conference on Optical Fiber communication/International Conference on Integrated Optics and Optical Fiber Communication, 1993 Technical Digest Series, vol. 4 Conference Edition, Feb. 21–26, 1993.

"A Class of Self–Healing Ring Architectures for SONET Network Applications", Wu et al., Bell Communications Research, 331 Newman Springs Road, Red Bank, NJ 07701, 1990 IEEE.

"A Self–Routing WDM High–Capacity SONET Ring Network", Way et al., IEEE Photonics Technology Letters, vol. 4, No. 4, Apr. 1992.

"An Optical FDM–Add/Drop Multiplexing Ring Network Utilizing Fiber Fabry–Perot Filters and Optical Circulators", Oda et al., IEE Photonics Technology Letters, vol. 5, No. 7, Jul. 1993.

"Multilayer add–drop multiplexers in a self–healing WDM ring network", "OFC '95 Optical Fiber Communication", Feb. 26–Mar. 3, 1995, vol. 8, 1995 Technical Digest Series.

"Optical wavelength add–drop multiplexer in installed submarine WdM network", ELECTRONICS LETTERS, Nov. 23rd, 1995, vol. 31, No. 24.

"A new answer to fiber protection", Edinger et al., Telephony/Apr. 1990.

"16ch Optical Add/Drop Multiplexer using Silca–Based Arrayed–Waveguide Gratings", Okamoto et al., NIT Optoelectronics Laboratories, 162 Tokai, Naka–gun, Ibaraki, 319–11, Japan, pp. 363–366.

"Anticrosstalk arrayed–waveguide add–drop multiplexer with foldback paths for penalty free transmission", Takahashi et al., Electronics Letters Online No: 19941371, Oct. 5, 1994.

"Demonstration of Optical FDM Based Self–Healing Ring Network Employing Arrayed–Waveguide–Grating ADM Filters and EDFAs", Toba et al., NTT Transmission Systems Laboratories, 1–2356, Take, Yokosuka, 238–03 Japan, NTT Optoelectronics Laboratories, Japan.

"Arrayed–waveguide grating add–drop multiplexer with loop–back optical paths", Tachikawa et al., Electronics Letters, Nov. 25, year unknown.

"Subcarrier–Multiplexed Signaling Based Add/Drop Multiplexer in Optical FDM Networks", Kitayama, IEEE Photonics Technology Letters, vol. 8, No. 6, Jun. 1996.

10 channel x 10 Gbit/s WDM add/drop multiplexing/transmission experiment over 240Km of dispersion–shifted fibre employing unequally–spaced arrayed–waveguide–grating ADM filter with fold–back configuration, Fukui et al. Electronics Letters, Sep. 28, 1995, vol. 31, No. 20.

"A Fully Transparent Fiber–Optic Ring Architecture for WDM Netowrks", Irshid et al., Journal of Lightwave Technology, vol. 10, No. 1 Jan. 1992.

"Multiwavelength Erbium–Doped Power Limiting Amplifier in All–Optical Self–Healing Ring Network", Chen, et al., IEEE Photonics, Technology Letters, vol. 8, No. 6, Jun. 1996.

"SONET Bidirectional Ring Capacity Analysis: A Pragmatic View", Smith, et al., Southwestern Bell Technology Resources, St. Louis, Missouri, 1994 IEEE, vol. 1., pp. 489–493.

Narrow–Band Optical Channel–Dropping Filter, Haus, et al., Journal of Lightwave Technology, vol. 10, No. 1 Jan. 1992.

"Suppression of Signal Fluctuation Induced by Crosstalk Light in a Gain Saturated Laser Diode Amplifier", Inoue, IEEE Photonics Technology Letters, vol. 8, No. 3, Mar. 1996.

"Demonstration of WDM survivable unidirectional ring network using tunable channel dropping receivers", Tholey, et al., Electronics Letters Online No: 19940905, Jun. 9, 1994.

"Optically–Amplified WDM Ring Network Incorporating Channel–Dropping Filters", Willner, et al., IEEE Photonics Technology Letters, vol. 6, No. 6, Jun. 1994.

"Multiwavelength Erbium–Doped Power Limiting Amplifier in All–Optical Self–Healing Ring Network", Chen, et al., IEEE Photonics Technology Letters, vol. 8, No. 6, Jun. 1996.

"Self–Healing Ring Network Architecture Using WDM For Growth", Elrefaie, Bellcore, Red Bank, NJ 07701, pp. 285–288, Tu P1.16, 1992.

"A Capacity Comparison for SONET Self–Healing Ring Networks", Shyur, et al., Telecommunication Labs. DGT Taiwan, R.O.C. 6F No. 16, Chinan Road, Sec. 2, Taipei 100, Globecom 93, vol. 1.

"Vertex Cutsets of Undirected Graphs", Patvardhan, et al. 1995 IEEE, vol. 44, No. 2, Jun. 1995, pp. 347–353.

"Feasibility Study of a High–Speed SONET Self–Healing Ring Architecture in future Interoffice Networks", Wu, Nov. 1990, IEEE Communications Magazine.

"Multiwavelength Survivable Ring Network Architectures", Elrefaie, IEEE International conference on Communications '93, May 23–26, 1993, Geneva, Switzerland, Technical Program, Conference Record, vol. 2/3.

"Hierarchical Self–Healing Rings", Shi, IEEE/ACM Transactions on Networking, vol. 3, No. 6, Dec. 1995.

"An Algorithm for Survivable Network Design Employing Multiple Self–healing Rings", Slevinsky, et al., TRLabs, #800 Park Plaza, 10611 98 Avenue, Edmonton, Alberta, Canada, 5K 2P7, Globecom 93, vol. 3., pp. 1568–1573.

"Self–healing algorithm for logical mesh connection on ring networks", Tomizawa, et al., Electronics Letters, Sep. 15th, 1994, vol. 30, No. 19.

"Development of SONET 2.4 Gbps 4–Fiber Ring Network System", Nakagawa, et al., NEC Research & Development, vol. 36, No. 4, Oct. 1995.

"High–Speed Self–Healing Ring Architectures for Future Interoffice Networks", Wu, et al. Dallas Globecom '89, Nov. 27–30, 1989, Communications Technology for the 1990s and Beyond, vol. 2 of 3.1.

Design of Hierarchical Self–Healing Ring Networks, Shi, et al., School of Engineering and Computer Science, University of Texas at Dallas, EC 33, 2601 North Floyd Road, Richardson, Texas 75080, 1994 IEEE, vol. 1, pp. 478–482.

"Optimal Topologies for Survivable Fiber Optic Networks Using Sonet Self–Healing Rings", Wasem, Globecom '91, Phoenix, Arizona, Dec. 2–5, 1991, vol. 3 of 3.

"A Class of Self–Healing Ring Architectures for SONET Network Applications", Wu, et al., Globecom '90, IEEE Global Telecommunications Conference & Exhibition, San Diego, California, Dec. 2–5, 1990, vol. 1 of 3.

"A Novel Passive Protected SONET Bidirectional SelfHealing Ring Architecture", Wu, et al., Journal of Lightwave Technology, vol. 10, No. 9, Sep. 1992.

"Distributed Self–Healing Control in SONET", Sakauchi, et al., Journal of Network and systems Management, vol. 1, No. 2, 1993.

"A Multi–layer Restoration Strategy for Reconfigurable Networks", Chng, et al., Systems Research Division, BT Laboratories, Martlesham Health, U.K., Dept. of electronic Systems Engineering, University of Esses, U.K., Globecom '94, vol. 3, pp. 1872–1878.

"A Passive Protected Self–Healing Mesh Network architecture and Applications", Wu, IEEE/ACM Transactions on Networking, vol. 2, No. 1, Feb. 1994.

"Distributed Control Algorithms for Dynamic Restoration in DCS Mesh Networks: Performance Evaluation", Kobrinsk,i et al., Globecom '93, vol. 3, pp. 1584–1588.

"Performance Analysis of Fast Distributed Network Restoration Algorithms", Bicknell, et al., Globecom 93, vol. 3, pp. 1596–1600.

"Double Search Self–Healing Algorithm and Its Characteristics", Fujii, et al., Electronics and Communications in Japan, Part 1, vol. 77, No. 3, 1994.

"Fitness Failure Immunization Technology for Network Service Survivability", Yang, et al., Globecom 88, vol. 3, pp. 1549–1554.

"The Selfhealing Network", A Fast Distributed Restoration Technique for Networks Using Digital Crossconnect Machines, Grover, Globecom '87, vol. 2, pp. 1090–1095.

"Dynamic Reconfiguration of Digital Cross–Connect Systems with Network Control and Management", Hasegawa, et al., Globecom '87, vol. 2., pp. 28.3.1–28.3.5.

"Automatic Restoration of Telecommunication Networks", Mansour, et al., Symposium on Computers and Communications, 1995, pp. 141–147.

"Recovering Guaranteed Performance Service Connections from Single and Multiple Faults", Banerjea, et al., Globecom '94, vol. 1, pp. 162–168.

"Effect of Traffic Splitting on Link and Path Restoration Planning", Veerasamy, et al., Globecom '94, vol. 3, pp. 1867–1871.

"Reliable Switching System Recovery", Nakamura, et al., Globecom '94, vol. 3, pp. 1596–1600.

"A Fast Distributed Network Restoration Algorithm", Chow, et al., Twelfth Annual International Phoenix Conference on Computers and Communications, Tempe, Arizona, Mar. 23–26, 1993.

"Distributed Restoration Strategies in Telecommunications Networks", Johnson, et al., ICC '94, vol. 1, pp. 483–488.

Dynamic Bandwidth–Allocation and Path–Restoration in SONET Self–Healing Networks, Gersht, et al., IEEE Transactions on Reliability, vol. 45, No. 2, Jun. 1996.

"Comparison of Capacity Efficiency of DCS Network Restoration Routing Techniques", doverspike, et al., Journal of Network and Systems Management, vol. 2, No. 2, 1994.

"On a Scalable Topology for Lightwave Networks", Venkateswaran, et al., Department of Computer Science University of South Carolina, Columbia, Sc 29208, 1996, pp. 427–434.

"Optimal Capacity Placement for Path Restoration in Mesh Survivable Networks", Iraschko, et al., ICC '96, consisting of eight unnumbered pages.

"Topological Layout of Links for Optimizing the S–T Reliability in a Computer Communication System", Aggarwal, et al., Microelectron. Reliab., vol. 22, No. 3, pp. 341–345, 1982.

"Network Topology for Maximizing the Terminal Reliability in a Computer Communication Network", Chopra, et al., Microelectron.Reliab., vol. 24, No. 5, pp. 911–913, 1984.

"Topological Layout of Links for OPTIMIZING the Overall Reliability in a Computer Communication System", Aggarwal, et al., Microelectron. Reliab., vol. 22, No. 3, pp. 347–351, 1982.

"Survivable Network Architectures for Broad–Band Fiber Optic Networks: Model and Performance Comparison", Wu, et al., Journal of Lightwave Technology, vol. 6., No. 11, Nov. 1988.

Protocols for a Self–Healing Network, Green, Applied Machine Intelligence, 26462 Briarwood Lane, San Juan Capistrano, CA 92675, 1995, pp. 252–256.

Self–Healing Ring Networks: Gateway to Public Information Networking, Towster, et al., Jun. 1990, IEEE Communications Magazine.

Fiber Network Survivability, Flanagan, Jun. 1990, IEEE Communications Magazine.

"Using Distributed Topology Update and Preplanned Configurations to Achieve Trunk Network Survivability", Coan, et al., IEEE Transactions on Reliability, vol. 40, No. 4, Oct. 1991.

"A Multi–Period Design Model for Survivable Network Architecture Selection for SONET Interoffice Networks", Wu, et al., IEEE Transactions on Reliability, vol. 40, No. 4, Oct. 1991.

"Design of Survivable Communications Networks under Performance Constraints", Newport, et al., IEEE Transactions on Reliability, vol. 40, No. 4, Oct. 1991.

"Forests, Frames, and Games: Algorithms for Matroid Sums and Applications[1]", Gabow, et al. Algorithmica, (1992) 7: 465–497.

"Routing Multipoint SONET Connections Using Virtual Paths in an ATM Network", Ammar, et al.,College of Computing, Georgia Institute of Technology, Aatlanta, Georgia 30332, 1993, IEEE, pp. 1c.4.1–1c.4.8.

"Broadband in the Local Loop", Phillips, Nov. 1994, pp. 37–42.

"Near Optimal Spare Capacity Planning IN a Mesh Restorable Network", Grover, et al., Globecom '91, Phoenix, Arizona, Dec. 2–5, 1991, pp. 2007–2012.

Autonet: A High–Speed, Self–Configuring Local Area Network Using Point–to–Point Links, Schroeder, et al., IEEE Journal on Selected Areas in Communications, vol. 9, No. 8, Oct. 1991.

"Case Studies of Survivable Ring, Mesh and Mesh–Arc Hybrid Networks", Grover, Globecom '92, pp. 633–638.

"Decreasing Survivable Fiber network Cost Using Optical Switches", Wu, et al., IEEE Global Telecommunications Conference & Exhibition, Hollywood, Florida, Nov. 28–Dec. 1, 1988, vol. 1 of 3.

"Survivable Network Architectures of Broad–Band Fiber Optic Networks: Model and Performance Comparison", Wu, et al., Journal of Lightwave Technology, vol. 6, No. 11, Nov. 1988.

"Strategies and Technologies for Planning a Cost–Effective Survivable Fiber Network Architecture Using Optical Switches", Wu, et al., Journal of Lightwave Technology, vol. 8, No. 2, Feb. 1990.

Alon Itai and Michael Rodeh "The Multi–Tree Approach to Reliability in distributed Networks" Information and Computation 79, 43–59 (1988).

* cited by examiner

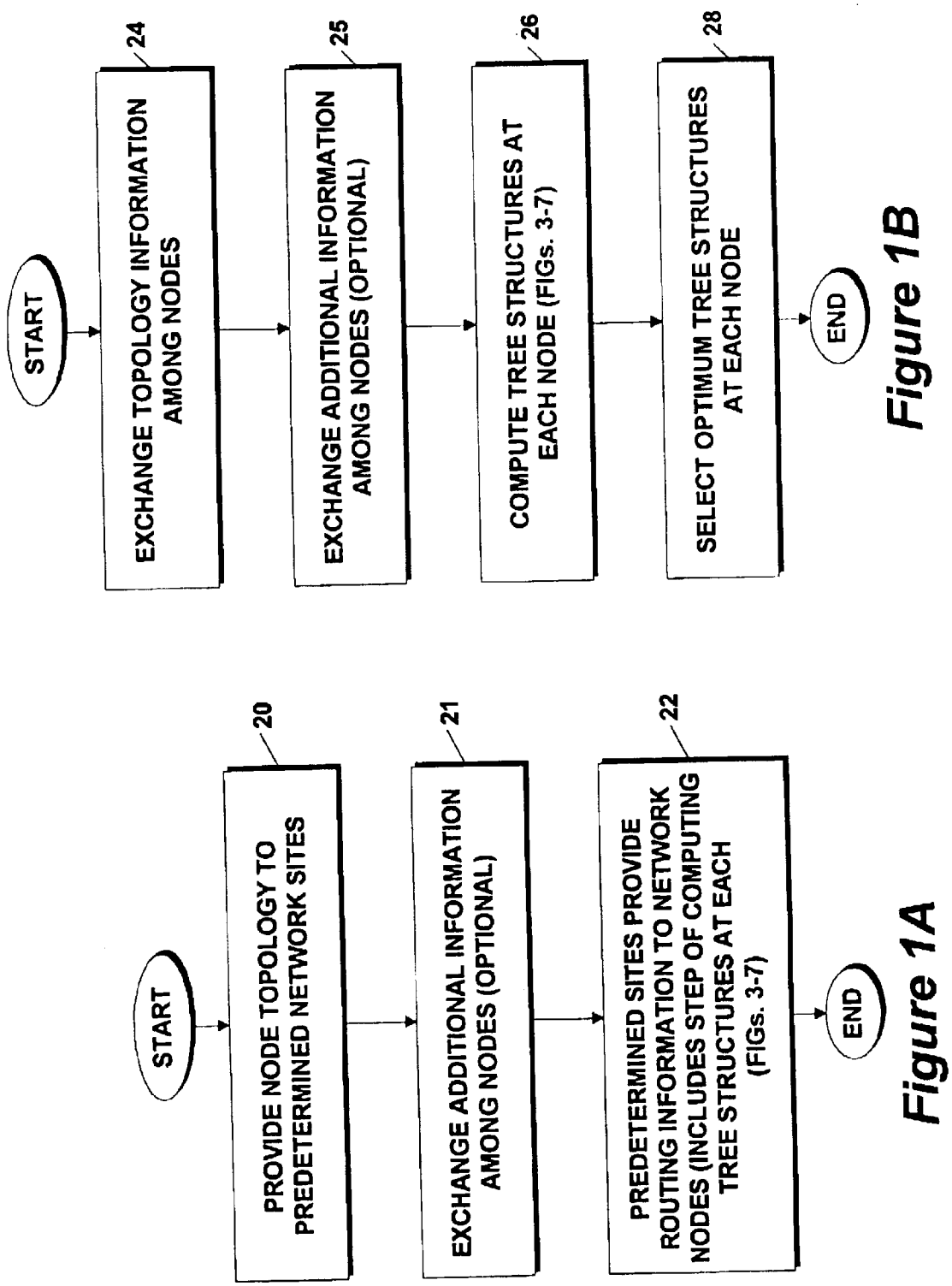

METHOD AND APPARATUS FOR AUTOMATIC PROTECTION SWITCHING

RELATED APPLICATIONS

This application claims priority under 35 U.S.C. §119(e) from application Ser. No. 60/067,272, filed Dec. 3, 1997 and is a continuation-in-part of application Ser. No. 08/803,169 filed Feb. 19, 1997, now U.S. Pat. No. 6,047,331.

GOVERNMENT RIGHTS

This invention was made with government support under Contract No. 719628-95-C-0002 awarded by the Department of the Air Force. The Government has certain rights in this invention.

FIELD OF THE INVENTION

This invention relates generally to communication or power networks and more particularly to a method and apparatus for planning and implementing automatic protection switching in networks.

BACKGROUND OF THE INVENTION

As is known in the art, a network includes a plurality of processing sites generally referred to as stations or nodes connected by one or more physical and/or logical connections. When the connections establish transmission of a signal in at least one direction between the nodes, the connections are generally referred to as links. Each node typically performs a switching function and one or more additional functions.

The nodes may be coupled together in a variety of different network structures typically referred to as network topologies. For example, network nodes may be coupled in a circular structure, generally referred to as a ring topology. Other topologies such as star topologies and tree topologies are also known.

The transmission of a signal from a first or source node to a second or destination node may involve the transmission of the signal through a plurality of intermediate links and nodes coupled between the source node and the destination node. Such a succession of links and nodes between a source node and a destination node is referred to as a path.

When a link or node in a path fails, communication between a source node and a destination node in that path is disrupted. Thus, to continue communications between the source and destination nodes, an alternate path must be found and the signal being transmitted from the source node to the destination is routed through the alternate path.

A self-healing network refers to a network which automatically restores connections among nodes in the event of a link or node failure in a path from a source node to a destination node. There is a growing trend and reliance on such networks owing to increasing reliance on and use of high-speed communication networks and the requirement that these communication networks be robust in the case of certain failures. Self-healing networks are central not only to applications where failures occur very often, such as military networks under attack, but also in public networks where failures, albeit rare, can be extremely disruptive. Self-healing networks can also be used in power transmission grids to aid in the distribution of power signals in a power network. Thus self-healing networks have use in a wide variety of applications including but not limited to communications networks and power systems networks.

Self-healing networks typically detect and report a failure, establish and connect a restoration path and then return the network to normal communications, not necessarily in that order. Such self-healing characteristics are incorporated, for example, in the Synchronous Optical Network (SONET) protocols.

A network may be represented as a graph which includes nodes representing the network nodes and edges representing bidirectional connections between the nodes. For a network to be capable of having a self-healing feature which leaves all nodes mutually connected even after the failure of a node and/or an edge, a graph representing the network must be either node and/or edge redundant. A node redundant graph is a graph in which the nodes remain mutually connected even after the elimination of any node in the network. Similarly, an edge redundant graph is a graph in which the nodes remain mutually connected even after elimination of any edge in the network. Node or edge redundancy ensures that all nodes remain connected even after the failure of a node or edge, respectively. One problem, however, is that not all self-healing techniques are guaranteed to work over an arbitrary redundant network (i.e. a network having some portions which are node redundant and other portions which are edge redundant). For instance, a technique which performs self-healing locally may not be able to use the redundancy afforded by a more distant part of the network. Node or edge redundancy is thus the minimum topological requirement for a network to perform self-healing which allows all remaining nodes to remain mutually connected after failure of a node or edge.

Self-healing networks can be classified according to the following three criteria: (1) the use of line (or link) rerouting versus path (or end-to-end) rerouting, (2) the use of centralized versus distributed schemes and (3) the use of precomputed versus dynamically computed routes. The criterion of link rerouting versus path rerouting maps to the criterion, common in optimization, of local versus global. The different criteria are not in practice, selected independently of each other for self-healing networks. Because path rerouting is less local in nature than link rerouting, path rerouting schemes are not usually distributed.

Furthermore, since path rerouting tends to require a relatively large amount of computation and covers a relatively large span of a network compared with link rerouting, path rerouting is typically implemented using precomputed routes. Link rerouting, which usually considers only a few hops away from the rerouted link in the network, is better suited to dynamically computed routes and thus may be done in a distributed fashion.

For example, in a bidirectional self-healing ring (SHR), after a link or node failure, traffic that was previously carried along one link is carried around the rest of the ring using a technique generally referred to as loopback.

One problem with this approach, however, is that a limitation may exist with respect to the number of nodes which may be traversed to replace the failed link. If there is a hop limit, for example, link rerouting may not be possible in a network having a ring topology.

One of the most common ways in SONET to restore rapidly network functionality is to combine SHRs and diversity protection (DP), using add-drop multiplexers (ADMs), for automatic protection switching (APS). Systems using One-to-n (1:n) DP have one back up link for n working links. SHRs perform loopback, which may be regarded as a special case of APS. SHR architectures may be classified into unidirectional rings, in which the duplex channel travels over a different path than the forward channel, and bi-directional rings where the forward channel and the duplex channel may travel the same path. Bi-directional rings typically include two or four fibers. Using mechanical ADMs, the restoration time is typically about 50 milliseconds (ms) while path switching typically requires less than 20 ms and loopback switching typically require under 80 ms. DP or SHR architectures typically require about 10 ms to detect and 50 ms to complete the switch.

One problem with the DP and SHRs approaches is that they require built-in excess capacity to handle failures. Moreover such systems may be difficult to upgrade as more nodes are added to the network. A system utilizing one-to-one (1:1) DP requires the most spare capacity, since the spare capacity is the same as the capacity used during normal operation. SHRs may require as much spare capacity as DP, depending upon network traffic patterns.

Furthermore, placing constraints on possible network topologies may result in increased network cost. For example, a ring topology may be used in a particular application to implement APS. The ring topology, however, may not be the most cost effective topology for the application. This results in a relatively expensive network.

It would, therefore, be desirable to provide a system which allows APS over any arbitrary network topology. Such a system can be used with any existing topology, allows relatively inexpensive expansion of existing networks regardless of topology and allows construction of new and relatively inexpensive networks.

One approach to self-healing uses optical switches such as acousto-optical switches. Optical switches allow switching to a backup fiber, in a time delay which is in the order of micro-seconds ($\mu s$). For four-fiber bi-directional rings, optical switches and amplifiers have been proposed to act as ADMs. Optical wavelength division multiplex (WDM) ADMs have been proposed to add/drop channels within a fiber rather than add/drop whole fibers. Such WDM ADMs are useful to overcome the limitation in capacity of traditional SONET ADMs. Many optical WDM ADMs have been proposed and demonstrated. Being able to drop channels rather than whole fibers also gives more flexibility in operating SHRs. WDM survivable rings using a single switch central office have been proposed.

Still another class of self-healing networks which reduces the amount of spare capacity needed, involves utilizing real-time spare capacity in either a distributed or a centralized dynamic restoration system. Thus, real-time excess capacity is used to transmit in case of a failure. This class of self-healing schemes commonly relies on digital cross-connect systems (DCSs) which provide greater flexibility than ADMs. However, such schemes utilize real-time spare capacity at the expense of relatively complex and computationally intensive software processing and thus greater time delays.

Yet other approaches attempt to perform optimal routing in centralized circuit switched networks with the goal of preserving spare capacity. While centralized restoration offers improvement in terms of spare capacity utilization over distributed restoration, it requires real-time computation having a complexity which increases with increasing network size. Thus, one problem with a centralized restoration approach is that it is relatively slow, with restoration times reaching minutes.

To overcome the relatively slow restoration times which occur in centralized restoration schemes, dynamic restoration schemes utilizing distributed control or a hybrid of distributed and centralized control are used. The greatest improvements in speed are provided by distributed schemes.

A variety of different distributed schemes have been proposed, each of which rely on some variation of a sender-chooser scheme where a sender floods a network with help messages and a chooser selects a restoration path based on reception of those help messages. Other schemes involve a single sender-chooser pair, one sender and multiple choosers, two senders and two choosers, etc . . . . Thus, suffice it to say that a variety of different self-healing schemes each having different advantages, drawbacks and limitations have been used or proposed.

In addition to self-healing features another feature of increasing importance in networks is that of a multicasting and/or an incasting operation. Multicasting refers to transmission of a signal from a source node to a predetermined set of nodes in a network. When the set of nodes corresponds to all of the nodes in the network, the operation is referred to as a broadcast operation. It is desirable to provide networks having a multicasting feature since in many types of networks, it is relatively simple for a node to receive a signal and replicate it for transmission to several other nodes. Incasting refers to transmission of a signal from a set of nodes in a network to a predetermined destination node. The need for the ability to multicast and/or incast tends to occur relatively often in relatively high-bandwidth networks.

For instance, a server may transmit a single video signal to several receivers or a file server may simultaneously back up data stored thereon to several geographically separate locations. Multicasting and/or incasting are relatively easy to perform when the network nodes are connected in a tree topology. In networks which allow duplication of signals at nodes, a link need only carry at most a single copy of a multicast signal. All-optical nodes for instance, allow simple replication by splitting a first received optical signal into a pair of optical signals and thereafter amplifying the pair of optical signals. The SONET standard, for example, includes a multicasting standard.

If a network is provided having a tree topology and an edge failure occurs in a tree originating at some source node S, all the nodes in the tree which were connected to the source node S that are not downstream of that failure are still connected by the same tree. The nodes of the tree which are downstream of the failure, however, are no longer connected owing to the edge failure. Complete functionality is restored to the network by re-connecting to the source node S the nodes that were downstream of the failure.

It would, therefore, be desirable to provide a network having a redundant tree topology in which such re-connection is possible for both link and node failures. It would also be desirable to provide a means for constructing a tree topology on any node or edge redundant network so that failure of a node or edge does not disconnect any node from the network.

As discussed above, self-healing networks use alternate routes in the case of failures. These routes can be pre-computed or dynamically computed. Pre-computed schemes, a.k.a. APS schemes, are typically fast and guarantee the existence of an alternate route. One problem with such schemes, however, is that they may be bandwidth inefficient. Dynamic schemes can be more bandwidth efficient but are typically slower and generally do not guarantee success, i.e. it is possible that no route with sufficient spare capacity can be found. Thus, to guarantee the existence of an alternate route and provide a relatively fast recovery speed, precomputed routes, such as those specified in SONET protocols, should be used.

A self-healing network having a ring topology is referred to as a self-healing ring. One type of self-healing ring (SHR), is provided from so-called dual-fed path protection, as used in SONET Dual-Fed Unidirectional Path Switched Ring (UPSR). Another type of SHR is provided using loopback protection, as used in SONET Bidirectional Line Switched Ring (BLSR).

In a network utilizing dual-fed path protection, the primary and back-up streams traverse two different paths. In the event of a failure, a node switches from listening to the primary stream to listening to the back-up stream, e.g. by using a SONET add-drop multiplexer (ADM).

In a network utilizing loopback protection, on the other hand, a failure leads to looping on either side of the failure, regardless of whether the failure is a node failure or a link failure. The primary stream is redirected in the opposite direction it was originally traversing until it reaches the other side of the failure, where it rejoins its original route. The actual looping most likely occurs at the nodes adjacent to the failure. One problem with this approach, however, is that failure recovery by loopback may cause the stream to traverse the same nodes twice in opposite directions. This characteristic is referred to as backhauling. Backhauling is undesirable since it results in a waste of bandwidth. Backhauling may be eliminated by looping back at points other than the failure location.

There are many performance differences between path protection and loopback protection. Dual-fed path protection is extremely rapid since it simply entails switching from one live stream to another. Loopback protection requires nodes to have more capabilities such as the ability to loop and possibly the means of distinguishing a node failure from a link failure. However, loopback has spare capacity advantages. In the case of a ring under worst case traffic conditions, path protection may require the spare capacity to be nearly equal to the sum of the rates of all the streams in the ring. Using loopback the spare capacity can be shared with backup channels only having active traffic in the event of a failure. In the case of protection against a link or a node failure, the spare capacity, need only be equal to the maximum rate through any link or node. Depending upon the traffic pattern, the spare capacity savings of loopback may be very significant. This is one reason why SONET BLSR systems are typically more bandwidth efficient than UPSR systems. Another reason BLSR systems are typically more bandwidth efficient than UPSR systems is that BLSR systems are bidirectional which typically shortens paths and provides more routing flexibility.

SUMMARY OF THE INVENTION

In view of the above problems and limitations of existing self-healing schemes and in accordance with the present invention, it has been recognized that combining the need for self-healing networks with the usefulness and desirability of performing multicasting and/or incasting operations in mesh and other networks leads to the problem of self-healing networks having a logical tree topology. As described herein, a tree topology refers to a topology having no cycles and in which every node has a single incoming directed arc and in which all nodes are connected to a root node.

It would, therefore, be desirable to provide a self-healing network having a topology which allows multicasting and/or incasting to be accomplished in a relatively easy manner. It would also be desirable to provide a technique to generate logical tree topologies for arbitrary redundant networks since it provides compatibility with all existing redundant networks and, when building new networks, requires no special consideration for the network topology other than it satisfies the redundancy required.

Also, in view of the above problems and limitations it has been recognized in accordance with the present invention that APS, whether it be path or loopback, can be performed on arbitrary redundant networks. That is, for any edge or node redundant network which may be represented as a node or an edge redundant graph, there exists a pair of node or edge-disjoint paths between any two nodes in the network. It should be noted, however, that the mere existence of alternate paths does not insure that the paths can actually be used as an alternate path since they may not have sufficient spare capacity. Therefore, knowing that an alternate path exists is only the starting point for designing an APS scheme which must also consider rules for routing and reserving spare capacity to be used in case of failure.

There have been a variety of proposed path rerouting schemes such as SubNetwork Connection Protection (SNCP) and different variants of it. Such schemes typically use some sort of shortest path selection and may not provide guarantees. Furthermore, automatic protection switching over arbitrary redundant networks need not restrict itself to two paths between every pair of nodes, but can instead be performed with trees, which is more bandwidth efficient for multicast traffic.

Previous methods for loopback protection typically have been limited to SHRs and interconnections of SHRs. While there are many schemes which dynamically re-route around a failure, loopback uses pre-computed routes. SHRs are generally inter-connected by one shared node (single-homed), two adjacent shared nodes (dual-homed) or through links with diversity protection (DP). However, rings place topological constraints which may entail higher costs in network layout.

It would, therefore, also be desirable to provide a technique for providing pre-computed or pre-planned protection mechanisms protection over networks having arbitrary redundant topologies. It would also be desirable to provide a technique for performing loopback protection which provides guaranteed fast recovery and which works on redundant networks having arbitrary topologies.

In accordance with the present invention, an apparatus for generating first and second tree topologies for any source node in a network which can be represented as a node redundant graph, such that any node in the graph remains connected to the source node via at least one tree even after the failure of a node includes means for selecting a source node from a plurality of nodes, means for selecting a cycle around the source node, means for assigning first and second source node values to the source node and means for assigning a node value to each of the first plurality of nodes wherein the node value assigned to each node decreases in a first direction around the cycle. The apparatus further includes means for constructing a first and second set of arcs, each of the arcs in the first set connecting an upstream node and a downstream node with the upstream node having a node value which is greater than the node value of the downstream node and each of the arcs in the second set connecting an upstream node and a downstream node with the upstream node having a node value which is less than the node value of the downstream node. With this particular arrangement, an apparatus for generating tree structures on any node redundant network topology so that failure of any single node leaves all remaining nodes in the tree connected is provided. By providing a redundant tree structure, a network having rapid fault recovery is provided. The benefits of such an apparatus are that the apparatus can be utilized in arbitrary node redundant networks. Additionally, the apparatus allows selection of particular edges to be used to form tree topologies and thus the apparatus can generate a large number of tree topologies for a single network. Furthermore, the tree structures provided by the apparatus of the present invention are well suited to broadcasting and/or multicasting and/or incasting operations. In one particular embodiment, the technique of the present invention includes a means for taking into account costs to allow selection of particular tree structures from a plurality of different tree structures. The main cost component of the system may be specified, for example, as network infrastructure topology or network capacity. Other cost components such as computational complexity may also be specified. Depending upon the specified criteria, a preferred pair of redundant tree structures may be selected from a plurality of different redundant tree structures. Thus, it is possible to select sets of redundant trees which optimize predetermined network performance or cost criteria. Moreover the particular tree topologies obtained may be taken into account when generating a network. For example, it is possible to generate unbalanced tree structures having relatively long individual paths. Alternatively balanced tree structures having relatively short paths may be generated.

In accordance with a further aspect of the present invention, an apparatus for generating first and second tree topologies for any source node in a network which can be represented as an edge redundant graph, such that any node in the graph remains connected to the source node via at least one tree even after the failure of any edge in the graph includes means for selecting a source node from a plurality of nodes, means for selecting a cycle around the source node, means for assigning first and second source node values to the source node and each of a first plurality of nodes in the cycle wherein the node values assigned to each node decrease in a first direction around the cycle and increase in a second opposite direction around the cycle. The apparatus further includes means for constructing first and second sets of arcs, each of the arcs in the first set connecting an upstream node and a downstream node with the upstream node in each of the first set of arcs having a node value which is greater than a node value of the downstream node and each of the arcs in the second set connecting an upstream node and a downstream node with the upstream node in each of the second set of arcs having a node value which is less than a node value of the downstream node. With this particular arrangement, a technique for generating tree structures on any edge redundant network topology so that failure of any edge leaves all remaining nodes connected in the tree, is provided. By providing a redundant tree structure, a network having rapid fault recovery is provided. The benefits of such an apparatus are that it can be applied to arbitrary edge redundant networks, that it provides great flexibility in selecting which particular edges can be used to form the trees and that the tree structures yielded are well suited to broadcasting and/or multicasting and/or incasting operations. The main cost component of the system may be specified as network topology or network capacity. In other cases, it may be desirable to specify other cost components such as computational complexity. Depending upon the specified criteria, a preferred one of a plurality of redundant tree structures may be provided.

The techniques of the present invention thus generate pairs of directed trees which are redundant after the failure of a node or of two directed links corresponding to one undirected link. The technique, however, only requires that the network have the characteristic that it is either node redundant or edge redundant. The only currently used approaches which are applicable to any node or edge redundant graphs consider a pair of node-disjoint or edge-disjoint paths for each pair of communicating nodes and do not guarantee trees. The technique of the present invention does not require any limitation with respect to node-disjoint or edge-disjoint paths. Thus, the networks are relatively flexible and can be utilized in a variety of different network applications including internet protocol (IP), frame relay (FR), optical networking (ON), asynchronous transfer mode (ATM) and SONET applications.

In accordance with a still further aspect of the present invention, a method of establishing at least a pair of paths between a source node and a destination node in a node redundant network including a plurality of nodes, includes the steps of (a) selecting a source node, (b) selecting a cycle around the source node, (c) assigning first and second source node values to the source node, (d) assigning a node value to each of a first plurality of nodes in the cycle wherein the node values assigned to each node decrease in a first direction around the cycle, (e) constructing a first set of arcs, each of the arcs connecting an upstream node and a downstream node, the upstream node in each of the arcs having a node value which is greater than the node value of the downstream node and (f) constructing a second set of arcs, each of the arcs connecting an upstream node and a downstream node, the upstream node in each of the arcs having a node value which is less than the node value of the downstream node. With this particular technique, for any node redundant undirected graph, two directed trees can be built, such that eliminating any node of the undirected graph leaves each node in the graph connected by at least one of the two directed trees. To determine if all nodes desired to be connected are connected, the method further includes the steps of determining if the first plurality of nodes in the cycle includes each of the nodes to be connected in the network and in response to the first plurality of nodes in the cycle not including each of the plurality of nodes to be connected then performing the steps of: (1) selecting a first path having a starting node, an ending node and at least one intermediate node wherein the starting node corresponds to one of the first plurality of nodes in the cycle, the ending node corresponds to a second different one of the first plurality of nodes in the cycle having a value less than the value of the starting node and each of the at least one intermediate nodes corresponds to a node not included in the first plurality of nodes in the cycle; and (2) assigning a node value to each of the at least one intermediate nodes wherein the node values assigned to each of the at least one intermediate nodes decrease when traversing the first path in a direction from the starting node to the ending node. With this approach, an arbitrary number of nodes can be included in the process to provide an ordered set of nodes. The path selection process can be repeated until all desired nodes in the network are included. It should be noted that in some applications it may be desirable to not include all possible nodes in the network. Once all desired nodes are included and ordered, a pair of redundant tree topologies can be formed. In one embodiment, the step of assigning a node value to each of the at least one intermediate nodes includes the step of assigning the intermediate node immediately prior to the ending node a value which is greater than the maximum of: (i) the second value of the source node; and (ii) the value of any node included in the cycle which is smaller than the value of the starting node.

With this approach, nodes are ordered in a particular manner. Once the nodes are ordered as desired, a first set of arcs can be constructed on the first path. Each of the arcs link an upstream node and a downstream node, the upstream node in each of the arcs having a node value which is greater than an assigned node value of the downstream node. Also a second set of arcs on the first path can be constructed. Each of the arcs connect an upstream node and a downstream node, the upstream node in each of the arcs having a node value which is less than an assigned node value of the downstream node. Once the arcs have been selected, the first and second tree topologies can be selected by selecting first and second sets of arcs along the path between the starting node and the ending node. In the first set of arcs, the value of each of the nodes decreases along the direction of the arc and in the second set of arcs, the value of each of the nodes increases along the direction of the arcs. The source node is assigned two different values. A first one of the values is the largest node value in the network and the second node value is the smallest node value in the network.

In accordance with a still further aspect of the present invention, a method of generating a pair of directed trees from an arbitrary redundant network includes the steps of (a) selecting a source node, (b) selecting a first cycle around the source node, (c) assigning first and second source node values to the source node, (d) assigning first and second node values to each of a first plurality of nodes in the cycle wherein first ones of the first and second node values assigned to each of the first plurality of nodes decrease in value in a first direction around the first cycle and second ones of the first and second node values assigned to each node decrease in value in the first direction around the first cycle and wherein for each node the first node value is greater than the second node value. The method further includes the step of (e) constructing first and second sets of arcs, each of the arcs linking an upstream node and a downstream node in the first cycle. In the first set of arcs, the upstream node has a node value which is greater than a node value of the downstream node and in the second set of arcs, the upstream node has a node value which is less than a node value of the downstream node. With this particular technique, for any edge-redundant graph a pair of directed trees can be generated from an arbitrary edge redundant network, such that eliminating any edge of the undirected graph leaves each node connected by at least one of the pair of directed trees. In one embodiment, the node values are assigned such that the second value of the first node is greater than the first value of the second node. With this step, an advantageous ordering of the nodes to facilitate generation of redundant tree structures is provided.

The techniques of the present invention may be modified to take into account cost functions. Any cost function can be applied to selected cycles and paths. Thus, the cost functions, such as delay minimization, which are usually associated with Steiner trees for multicasting and/or incasting can be taken into account when selecting cycles and paths.

Furthermore, the techniques may be implemented in a distributed fashion for edge redundancy under certain conditions. Since the union of two trees which share a single node is a tree if the shared node is a source in at least one of the trees, the techniques of the present invention can be independently applied to two or more networks which share a node to independently generate redundant tree pairs for each of the two or more networks. First ones of the redundant tree pairs can be joined to form a first composite redundant tree and second ones of the redundant tree pairs can be joined to form a second composite redundant tree.

It should be noted that the techniques of the present invention have applicability to a wide variety of different types of networks. For example, the techniques may be used to generate tree topologies in communications networks, power networks, chemical supply networks and any other type of network including but not limited to a variety of different supply chain networks. Thus the term "network" as used herein refers to a collection of assets, switching apparatus and conduits which permit the transmission of resources. Thus, the networks may be used for communications systems, water or chemical distribution systems and distribution systems in general. In one embodiment, the network may be provided as an internet. The resources may be provided as optical signals and electrical signals such as power signals, information signals, etc . . . or alternatively the resources may be provided as solids or fluids such as gas or liquid fluids.

In accordance with a still further aspect of the present invention, a Bidirectional Link Self-healing Network (BLSN) for implementing bi-directional link automatic protection switching (APS) for an arbitrary edge or node redundant network and a technique for implementing APS recovery in response to an edge or node failure in a network is described. The BLSN technique does not require permanent allocation of spare capacity for each connection and allows sharing of capacity among many network connections by allocating capacity for use only in the event of a failure. The described technique operates so that any network which can be represented as a node or an edge redundant graph remains connected after the failure of a node or an edge in the network. The technique of the present invention allows loopback protection to be performed over node or edge redundant networks having an arbitrary topology. The technique makes use of connected directed subgraphs of the network. Also described are techniques for generating the directed subgraphs on node and edge redundant networks having an arbitrary network topology. With these techniques, a number of advantages are provided including the ability to provide preplanned protection mechanisms which guarantee fast recovery in the presence of single node or link failures and which work on redundant networks having arbitrary topologies. Moreover with the techniques of the present invention, multiple pairs of subgraphs can be provided.

In accordance with a still further aspect of the present invention, an apparatus for implementing bidirectional link automatic protection switching for an arbitrary node or edge redundant network includes: (a) means for representing a network as a graph having N nodes and E edges; (b) means for generating one or more Bi-directional Link Self-healing Network (BLSN) subgraphs; and (c) means for implementing automatic protection switching for an edge or a node failure in response to detection of an edge or a node failure. With this particular arrangement, a technique useful for performing loopback over a network having an arbitrary redundant topology is provided. By representing a redundant network as a redundant graph and generating one or more BLSN subgraphs, a technique for providing automatic protection switching (APS) on redundant networks having arbitrary topologies is provided. Also, by utilizing preplanned or pre-stored protection mechanisms, the technique provides a network having a relatively rapid recovery characteristic in the event of the failure of a network node or link.

In accordance with the present invention, a method for implementing bi-directional link automatic protection switching for an arbitrary node or edge redundant network includes the steps of (a) representing a network as a graph having N nodes and E edges; (b) generating a set of bidirectional link self-healing network (BLSN) subgraphs; and (c) implementing automatic protection switching for an edge or a node failure in response to detection of an edge or a node failure. With this particular technique, a method for implementing bi-directional link APS for an arbitrary edge or node redundant network is provided. Unlike previous techniques used to generate tree structures, in the present technique, spare capacity is not specifically allocated for each connection. Instead, spare capacity may be shared among many connections and is used only in the event of a failure. For a network with N nodes and full-duplex links with capacity C, the technique provides a plurality of advantageous protection properties in the presence of a single edge or node failure including but not limited to: (1) protection of at least C arbitrary simplex unicast or multicast connections; (2) protection of up to $C*N*(N-1)/2$ simplex unicast or multicast connections, depending upon network topology and traffic requirements (i.e. source and destinations for each connection); (3) a spare bandwidth requirement bounded only by the maximum traffic routed over a link or through a node (for a node redundant network); (4) requirement of only local information for APS switching; and (5) provision of protection for arbitrary node or edge redundant network topologies.

In accordance with a further aspect of the present invention, a method for generating a directed subgraph from a network which can be represented as an edge redundant graph includes the steps of: (a) selecting a cycle on a subgraph, (b) selecting a direction for the cycle, (c) determining whether some nodes are not yet reached by any path or cycle, (d) in response to some nodes not yet being reached by any path or cycle, choosing a next path or a next cycle, (e) selecting a direction for the path or cycle selected in step (d), (e) repeating steps (c) and (d) until all nodes are reached by a path or cycle and (f) in response to all desired nodes being reached by a path or cycle, defining first and second subgraphs B, R with the second subgraph having the same set of nodes as the first subgraph with arcs in the reversed direction from the arcs in the first subgraph. With this particular arrangement, construction of a pair of directed subgraphs B, R both of which span the desired nodes and both of which can each be used for primary connections between any pair of nodes in the subgraph results in a method which allows loopback in an edge redundant network. In the event of a failure, effected connections on the first subgraph B are looped back around the failure using the second subgraph R. Similarly, effected connections on the second subgraph R are looped back around the failure using the first subgraph B. For instance, if a network G having a ring topology were used, then the first and second subgraphs B and R would correspond to cycles around the ring in the clockwise and counter-clockwise directions, respectively. In the case where an edge between nodes x and y in a edge redundant network having any arbitrary topology fails (i.e. edge [x,y] in the network fails), if arc (x,y) is an arc of subgraph B, and arc (y,x) is an arc of subgraph R, two looping arcs, $Bloop_{x,y}$ and $Rloop_{y,x}$ can be generated so that signals which arrive for transmission on arc (x,y) in subgraph B are now looped back to node x along subgraph R and any signal which arrives for transmission on arc (y,x) in subgraph R is looped back to node y in subgraph B. In this manner, edge [x,y] can be successfully bypassed as long as there exists a working path with sufficient capacity from node x to node y in subgraph R and a working path with sufficient capacity from node y to node x in subgraph B. Each arc includes a first or start node sometimes referred to hereinbelow as a "head" and a second or end node sometimes referred to hereinbelow as a "tail." Signals flow or are transmitted from the start (or head) node to the end (or tail) node. Thus, an arc is an ordered set of nodes between which a signal flows or is transmitted in only one direction. The looping arcs $Bloop_{x,y}$ and $Rloop_{y,x}$ can be generated in the following manner. Looping arc $Bloop_{x,y}$ is generated by attaching the head of arc (x,y) which belongs to the set of arcs in subgraph B to the tail of arc (y,x) which belongs to the set of arcs in subgraph R so that signals which arrive for transmission on arc (x,y) in subgraph B are now looped back to node x in subgraph R. Similarly, looping arc $Rloop_{y,x}$ is generated by attaching the head of arc (y,x) which belongs to the set of arcs in subgraph R to the tail of arc (x,y) at node y which belongs to the set of arcs in subgraph B so that any signal which arrives for transmission on arc (y,x) in subgraph R is looped back to node y in subgraph B.

In accordance with yet another aspect of the present invention, a method for generating a directed subgraph in a network which can be represented as node redundant graph includes the steps of: (a) selecting a first edge from an undirected graph having a first plurality of nodes and a first plurality of edges with each of the edges having a predetermined capacity, (b) selecting a first cycle which includes the first edge, (c) assigning node values to each node in the first cycle in accordance with a predetermined criteria to define a directed subgraph having a second plurality of nodes and a second plurality of arcs, and (d) determining whether the subgraph includes all nodes to be connected. In response to the subgraph not including all nodes to be connected, the method further includes the steps of: (e1) selecting a path having a starting node and an ending node already included in the subgraph but which includes at least one node not already included in the subgraph and (e2) assigning node values to each of the at least one intermediate nodes in the first path in accordance with a predetermined criteria to define a new directed subgraph having a third plurality of nodes and a third plurality of arcs. With this particular technique, a failed network node from the third plurality of nodes can be successfully bypassed to maintain a connection between a source and a destination. In a preferred embodiment, the method further includes the step of repeating steps (d), (e1) and (e2) until all desired nodes are included in a subgraph. With this arrangement, a failed network node included in the subgraphs can be successfully bypassed to maintain a connection between a source node and a destination node. The processing which takes place in the event of a node failure is similar to that performed in response to a link failure except that many links may be affected. In the case where a node n fails, then all nodes which are adjacent to node n perform loopback as above in the edge redundant case. In particular, if arc (x,n) is an arc of subgraph B, and arc (n,x) is an arc of subgraph R, a looping arc $Bloop_{x,n}$ connecting the head of the arc in subgraph B originating at node x to the tail of the arc in subgraph R terminating at node x is generated. If arc (y,n) is an arc of subgraph R, and arc (n,y) is an arc of subgraph B, a looping arc $Rloop_{y,n}$ connecting the head of the arc in subgraph R originating at node y to the tail of the arc in subgraph R terminating at node y is generated. Now, node n can be successfully bypassed as long as there exists a working path with sufficient capacity from node x to y in subgraph R and a working path with sufficient capacity from node y to node x in subgraph B for all nodes x,y such that arcs (x,n), (n,y) belong to the set of arcs in subgraph B. This loopback is more general than the type of loopback used in a ring since the loopback is not restricted to use a backhaul route. Therefore, in order to guarantee loopback in the edge and node redundant cases, subgraphs B and R must be chosen so that in the event of any node or edge failure which affects subgraphs B or R, there exists a working path around the failure on the other graph. In addition, it is necessary to insure sufficient back-up capacity on subgraphs B and R to support the loopback signals in addition to the unaffected connections on subgraphs B and R.

To insure sufficient capacity when protecting against a link failure and representing the maximum arc load in the B and R subgraphs, respectively, as $L_{arc,B}$ and $L_{arc,R}$, then in the worst case, if a link fails which is carrying $L_{arc,B}$ and $L_{arc,R}$ in subgraphs B and R, respectively, and the loopback paths for this link pass through links carrying $L_{arc,R}$ and $L_{arc,B}$ on subgraphs R and B, respectively, then sufficient capacity exists for loopback provided that $L_{arc,B}+L_{arc,R} \leq C$, where C is the capacity of a link in each direction.

To insure sufficient capacity in the node redundant case let $L_{node,B}$ and $L_{node,R}$ be the maximum throughput through a node in the B and R graphs, respectively. The worst case for a node failure is when a node with a load $L_{node,B}$ through it in B fails and all these connections are routed through an arc carrying $L_{arc,R}$ in R, or vice-versa. Therefore, for the node case, it is sufficient to have $L_{node,B}+L_{arc,R} \leq C$ and similarly $L_{arc,B}+L_{node,R} \leq C$.

It should be noted that the spare capacity requirements for node protection are, in general, higher than those for link protection since the traffic through a node is generally larger than that through a link. However, in the special case of a ring, the required excess capacity to protect against a node failure is no more, and can be less, than that required for an edge failure. The reason for this is that connections destined to or from the failed node do not need to be protected. In particular, $L_{node,B} \leq L_{arc,B}$ and $L_{node,R} \leq L_{arc,R}$. So for example, sufficient back-up capacity exists for a node or link failure as long as the maximum load on any link in any direction does not exceed C/2. These constraints can be applied even with different link capacities within the network.

It should also be noted that given a redundant network G there are many possible choices for B which can be chosen to optimize certain criteria, e.g. bandwidth utilization, geographic considerations, political considerations, etc . . . .

BRIEF DESCRIPTION OF THE DRAWINGS

The foregoing features of this invention as well as the invention itself may be more fully understood from the following detailed description of the drawings in which:

FIG. 1A is a flow diagram of a first set of processing steps which take place to provide logical connections with a tree structure to network nodes;

FIG. 1B is a flow diagram of a second set of processing steps which takes place to provide logical connections with a tree structure to network nodes;

DESCRIPTION OF THE PREFERRED EMBODIMENTS

Before describing the processing to be performed by and on networks, it should be appreciated that, in an effort to promote clarity, reference is sometimes made herein to "signals" or "information" being transmitted between "nodes" or "stations" of a "network." Such reference should not be taken as being limited to a communications network. Rather, as mentioned above, the present invention finds application in a wide variety of different network types including but not limited to communications networks, power networks, fluid supply networks, chemical supply networks and other types of supply chain networks.

Accordingly, those of ordinary skill in the art will appreciate that the description and processing taking place on "signals" and "information" could equally be taking place on a power signal, a communication signal a fluid or any other resource. Likewise, the nodes or stations may include electrical apparatus such as computer implemented switches and electromechanical switches, mechanical apparatus such as mechanical switches or mechanical ducts, optical apparatus or any other apparatus appropriate to process the resource being provided to the node.

Figure 1:
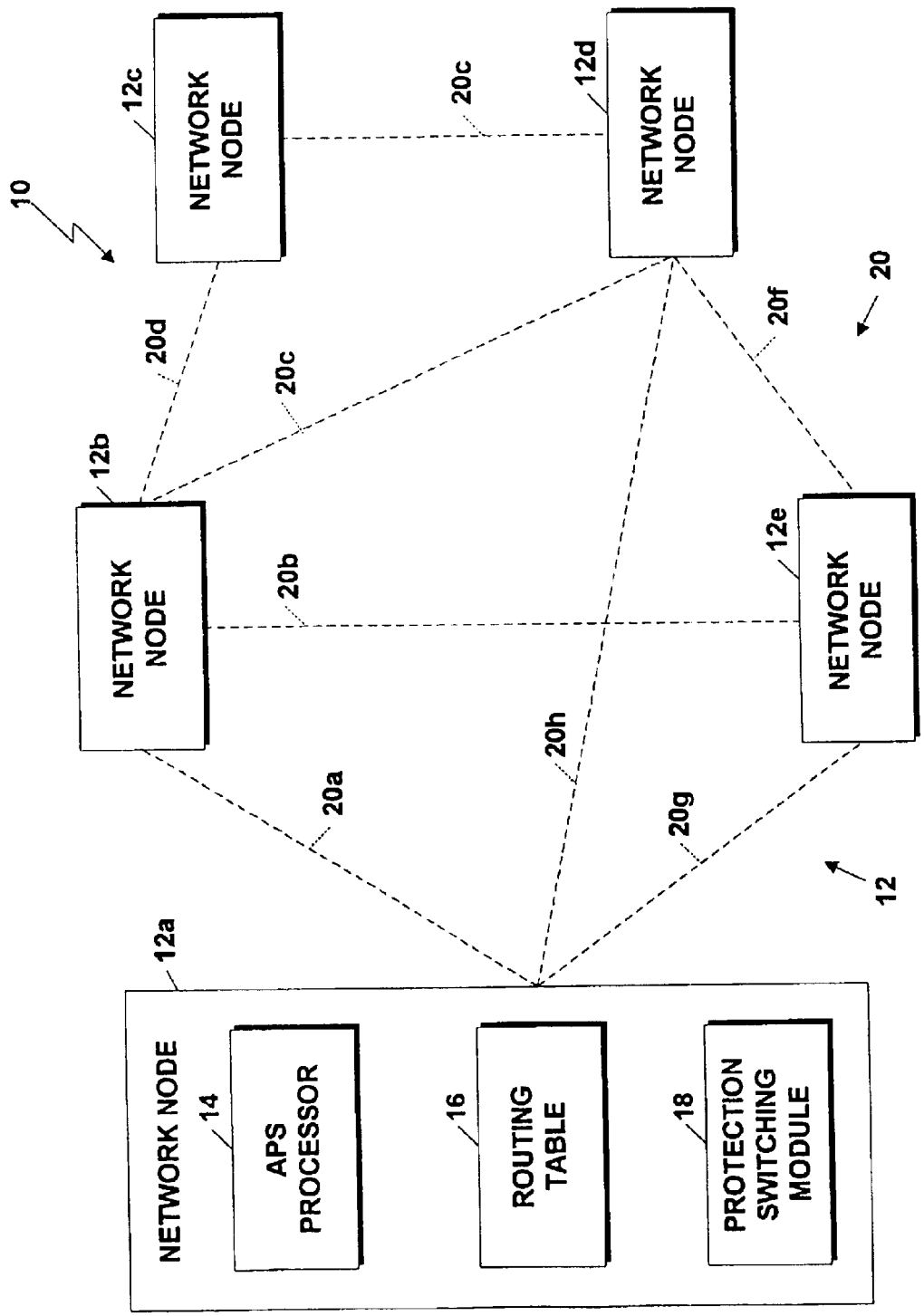
FIG. 1 is a block diagram of a network.

Referring now to FIG. 1, a network 10 includes a plurality of stations or nodes 12a–12e generally denoted 12. Nodes 12 can be coupled as shown through links 20a–20h generally denoted 20. As used herein the term "link" refers to a physical connection between two nodes. It should be noted that, although not illustrated in FIG. 1, it is possible for a separate physical link to exist between each of the nodes 12a–12e in the network. For example, a separate link may be provided from node 12a to each of nodes 12b–12e. Owing to cost considerations, physical construction limitations and technological limitations, however, separate links are typically not provided between each of the nodes 12a–12e.

In some applications, a physical connection (e.g., a fiber optic cable) may connect two nodes, however, there may be no preferred logical connection between the two nodes despite the existence of the physical connection. That is, the preferred path between the two nodes may involve a third node and corresponding links to the third node rather than the direct link between the two nodes. For example, if the direct link between two nodes is unreliable, then it may be desirable to not transmit information or other signals such as data, voice or power signals across this link. Thus, in accordance with the techniques of the present invention and for reasons to be described hereinbelow, only predetermined logical connections are made between the nodes 12a–12e.

In general overview and taking network node 12a as representatives of nodes 12b–12e, network node 12a includes an automatic protection switch (APS) processor 14, a routing table 16 and a protection switching module 18. APS processor 14 receives information describing the network 10. Such information typically includes, but is not limited to, the number of nodes to be connected in the network, the number of links which exist in the network, traffic load, information identifying which of the paths 20 are available to connect particular ones of nodes 12 in existing network 10, the nodes and links which should be used to re-route signals in the event of a failure, etc . . . .

As an alternative to the APS processor being provided as part of a network node as shown in FIG. 1, APS processor 14 may be provided as part of a network planning system. In this case, APS processor 14 receives information concerning the number of nodes which will be eventually included in the network or subnetwork as well as information concerning the availability or desirability of installing and/or maintaining network links between particular nodes, traffic load and cost information with respect to installation and maintenance of the links and nodes, etc . . . .

In response to the information provided to APS processor 14, APS processor 14 computes pairs of tree topologies for each source-node/destination-node pair in the network. APS processor 14 then designates preferred links 20 between each of the network nodes 12a–12e in accordance with the computed tree topologies and any other rules provided thereto.

Once the preferred network topologies and paths between each of the nodes 12a–12e are computed, the path information is stored in a routing table 16. Routing table 16 has stored therein a particular primary order and a particular secondary order of switching entities and links which define primary and secondary paths between the nodes 12a–12e and which are part of primary and secondary tree topology network configurations. Thus, each source node is provided having a primary path and a secondary path to every other node 12 in the network. Moreover, since the primary and secondary paths are provided as part of primary and secondary tree topologies, multicasting and/or incasting can be implemented relatively easily within the network.

In response to signals from protection switching module 18, if a link or a network node in a primary path between a source node and destination node fails, then information concerning the nodes and links and preferred paths among nodes stored in routing table 16 can be accessed and used to re-route automatically the signals through the secondary or protection path thereby allowing flow between the source node and destination node despite the failure of the link or node. For example, designating node 12a as a source node and node 12c as a destination node, a primary path between source node 12a and destination node 12c may include link 20a, node 12b and link 20d. If link 20a fails, then protection switching module 18 detects the failure, by the absence of appropriate flow (e.g. lack of power, missing pilot tone, diagnostic signal not appropriately received) and a predetermined secondary path between source node 12a and destination node 12c stored in routing table 16 in source node 12a is used to re-route automatically signals through the predetermined secondary path which may include, for example, link 20h, node 12d and link 20e. Thus routing table 16 has stored therein information which specifies how to re-route the flow between nodes.

It should be noted that in a preferred embodiment, the primary and protection paths are pre-computed and thus the switching can be accomplished automatically with minimal time delay. Alternatively, the secondary tree path may be computed dynamically in the APS processor 14 and provided to routing table 16. Further alternatively, the flow may be transmitted simultaneously on the primary and secondary trees and the destination node autonomously switches to flow on the secondary tree, possibly after some synchronization.

It should also be noted that, in the case of an existing network, the desired tree topologies computed by APS processor 14 may be computed in a distributed fashion. That is, processors at each node compute tree topologies considering the node to be a source and broadcast the tree topology to other nodes in the network. In such a distributed approach, each node must be provided network topology information to allow computation of the tree topologies.

Alternatively still, the tree topologies may be computed at a single central site and thereafter transmitted to the network nodes. Alternatively still, hybrid approaches involving certain aspects of the above-mentioned distributed and centralized approaches may also be used.

FIGS. 1A, 1B, 3–3B and 6–7 are a series of flow diagrams showing the processing performed by a processing apparatus which may, for example, be provided as part of a node 12 (FIG. 1) to compute redundant tree structure for a network or alternatively, which may be provided as part of a system for planning and/or installing a network. The rectangular elements (typified by element 20 in FIG. 1A), herein denoted "processing blocks," represent computer software instructions or groups of instructions. The diamond shaped elements (typified by element 70 in FIG. 3A), herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that, unless otherwise indicated herein, the particular sequence of steps described is illustrative only and can be varied without departing from the spirit of the invention.

Turning now to FIG. 1A, the processing in a system in which all node topology is sent to one or more central sites for computation of all routing paths and transmission to network nodes is shown. Processing begins in step 20 where the node topology of the network is provided to one or more predetermined network sites. Thus, all network node information can be sent to one central site where redundant tree topologies are computed in accordance with the techniques described below. Alternatively, a hybrid approach may be taken where more than one but less than all predetermined nodes generate tree topologies.

Processing then optionally proceeds to step 21 where additional information among the nodes is exchanged if necessary. Such information may include criteria or information which may be used to select desirable tree structures from a plurality of different tree structures. For example, known or expected demand or traffic in each of the nodes and/or along particular links between nodes may be exchanged between some or all of the nodes, the cost of installing or maintaining particular nodes or links, component availability projections, load balancing, reliability of paths, maximum number of nodes on a path, average number of nodes traversed by a communication sessions, symmetry of trees, separability of subtrees, maximum load on a link, capacity pre-planning, average transmission costs, etc . . . may also be exchanged between nodes.

After receiving the information, then as shown in step 22 the one or more predetermined sites provide routing information to network nodes which require the information. The routing information is computed using techniques to be described in detail below for computing tree topologies in conjunction with FIGS. 3–7.

Referring now to FIG. 1B, a flow diagram illustrating the steps to compute tree structures at individual nodes in a network is shown. Processing begins at step 24 in which all nodes exchange network topology information. Such a step may be accomplished in an existing network by transmitting the topology information to all nodes in the network using a network broadcast or multicast. Alternatively, the information may be transmitted among the nodes via so-called point-to-point transmission techniques.

Processing then proceeds to optional step 25 where any additional information among the nodes can be exchanged. Such additional information may include but is not limited to, known or expected traffic in each of the nodes and/or along particular links between nodes, component availability projections, load balancing, reliability of paths, maximum number of nodes on a path, average number of nodes traversed in a communication session, symmetry of trees, separability of trees, maximum load on a link, capacity pre-planning and average transmission costs, etc . . . . Other considerations may also play a role in the design of a network such as the cost of installing a node and/or a link, the dollar cost of maintaining the node and/or link, etc . . .

In processing step 26, once each of the nodes has all of the network topology information, then redundant tree topologies for each node can be computed. Thus, each node considers itself a source and all other nodes to be included in the tree topology as possible destinations. Such computations are performed in accordance with the techniques described below in conjunction with FIGS. 3–7. In the case where a plurality of redundant tree structures are computed, then as shown in step 28 a desirable pair of redundant tree structures (according to some metric) are selected at each node. Once the pairs of redundant tree structures have been selected at each node, processing ends. This process can be performed once or repeatedly for different nodes in the network or to provide different tree topologies.

Figure 2:
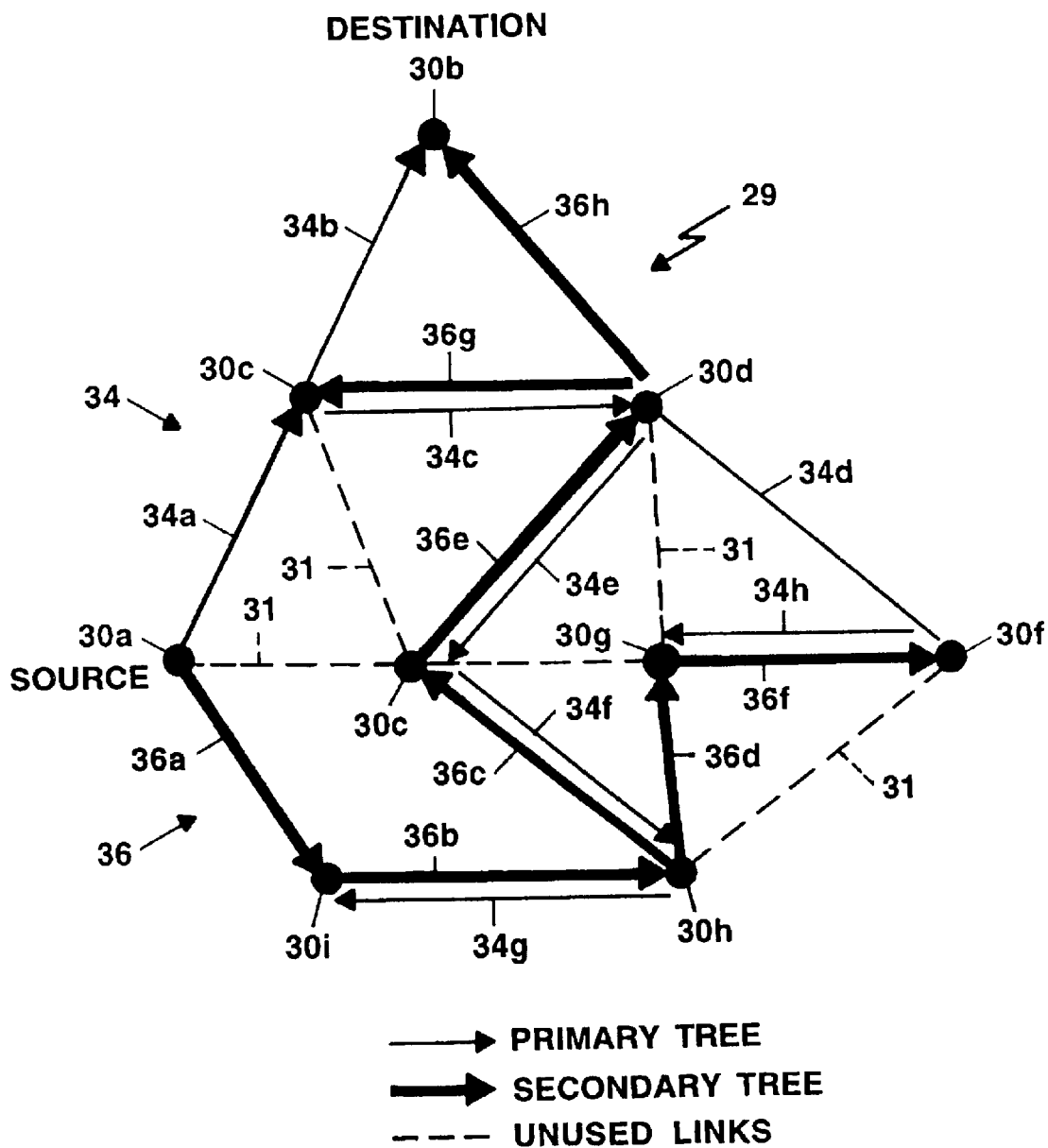
FIG. 2 is a schematic diagram illustrating the first and second trees connecting a plurality of nodes.

Referring now to FIG. 2, a network illustrated as a node redundant graph 29 includes a source node 30*a* and a destination node 30*b* connected by a pair of redundant trees 34, 36. Tree 34 includes arcs 34*a*–34*h* coupled to respective ones of the nodes 30*a*–30*i*, as shown. Tree 36 includes arcs 36*a*–36*h* coupled as shown to respective ones of the nodes 30*a*–30*i*. Trees 34, 36 are provided by following the process discussed below in conjunction with FIGS. 6–6B. Although the trees 34, 36 include nodes connected by arcs in two opposite directions (i.e., trees 34, 36 share edges), it should be noted that eliminating any edge does not disconnect any node from the source 30.

Figure 2A:
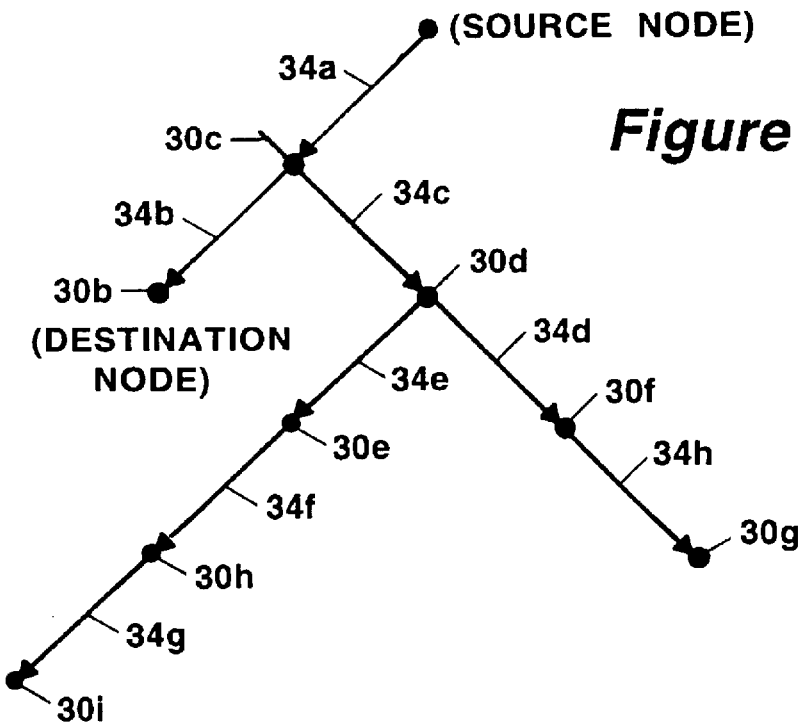
FIGS. 2A and 2B are a series of diagrammatical illustrations showing a pair of trees resultant from the connection of the plurality of nodes in FIG. 2.
Figure 2B:
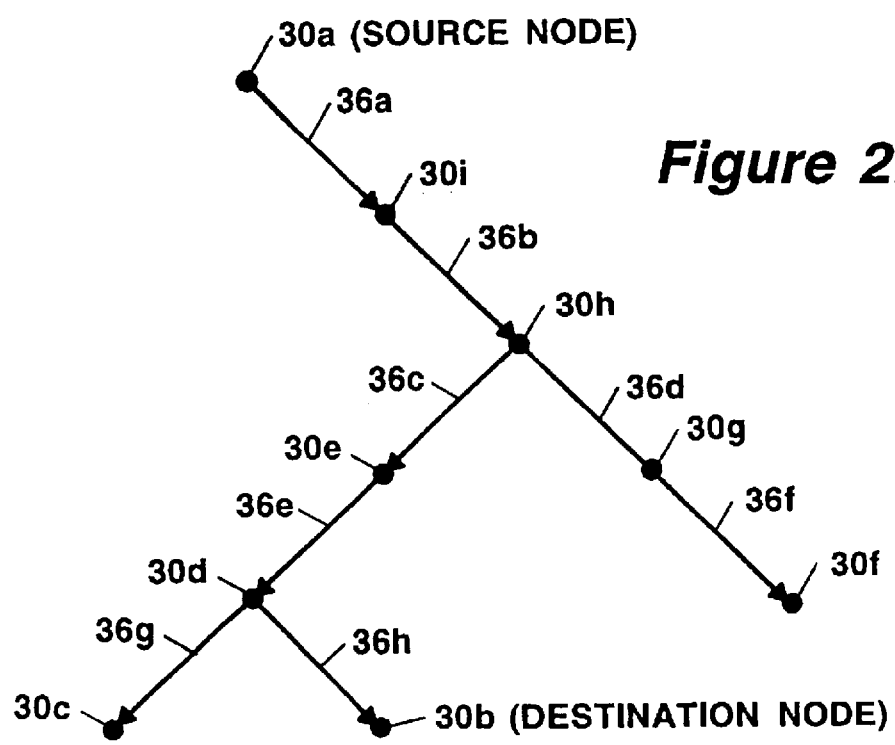

Referring briefly to FIGS. 2A, 2B the tree structures formed by the primary paths 34*a*–34*h* (FIG. 2A) and the tree structure formed by the secondary paths 36*a*–36*g* (FIG. 2B) on graph 29 (FIG. 2) are shown. As can be seen in FIG. 2A, tree 34 corresponds to a tree rooted at source node 30*a*. After a node failure, e.g. failure of node 30*d*, nodes 30*b*, 30*c* remain connected to the source node 30*a* since they are not downstream of failed node 30*d* in tree 34. Nodes 30*e*–30*i* are no longer connected to the source node 30*a* by tree 34 since nodes 30*e*–30*i* are downstream of the failed node 30*d* in tree 34. Thus nodes 30*b*, 30*c* can still be connected to source node 30*a* by the same tree 34, even though the tree 34 is no longer connected to all the nodes in the network owing to the node failure.

To restore all of the functionality to the network, the nodes downstream of the failed node 30*d* simply need to be re-connected to the source node 30*a*. Such re-connection is possible for node or edge failure as long as the undirected graph representing the network is node or edge redundant, respectively. As shown in FIG. 2B, nodes 30*e*–30*i* are not downstream from failed node 30*d* in tree 36 and thus they remain connected to the source node 30*a* via tree 36.

Furthermore the redundant tree structures 34, 36 allow multicasting and/or incasting applications to be included in the network with relatively little effort. This is especially true when links 34, 36 are provided as fiber optic signal paths. Thus, with the techniques of the present invention, trees which facilitate multicast and/or incast applications can be provided.

In operation, the redundant trees 34, 36 can be utilized by having a sender or source node make a determination that flow should be switched from a first tree (e.g. tree 34) to a second tree (e.g. tree 36). Alternatively, the redundant trees 34, 36 can be utilized by having a receiver or destination node make a determination that flow should be switched from a first tree (e.g. tree 34) to a second tree (e.g. tree 36). Alternatively still, in some applications, it may be desirable to simultaneously provide active signals on both trees 34, 36.

It should also be noted that by reversing the directions of the arcs, incast trees rather than multicast trees are provided.

Figure 3:
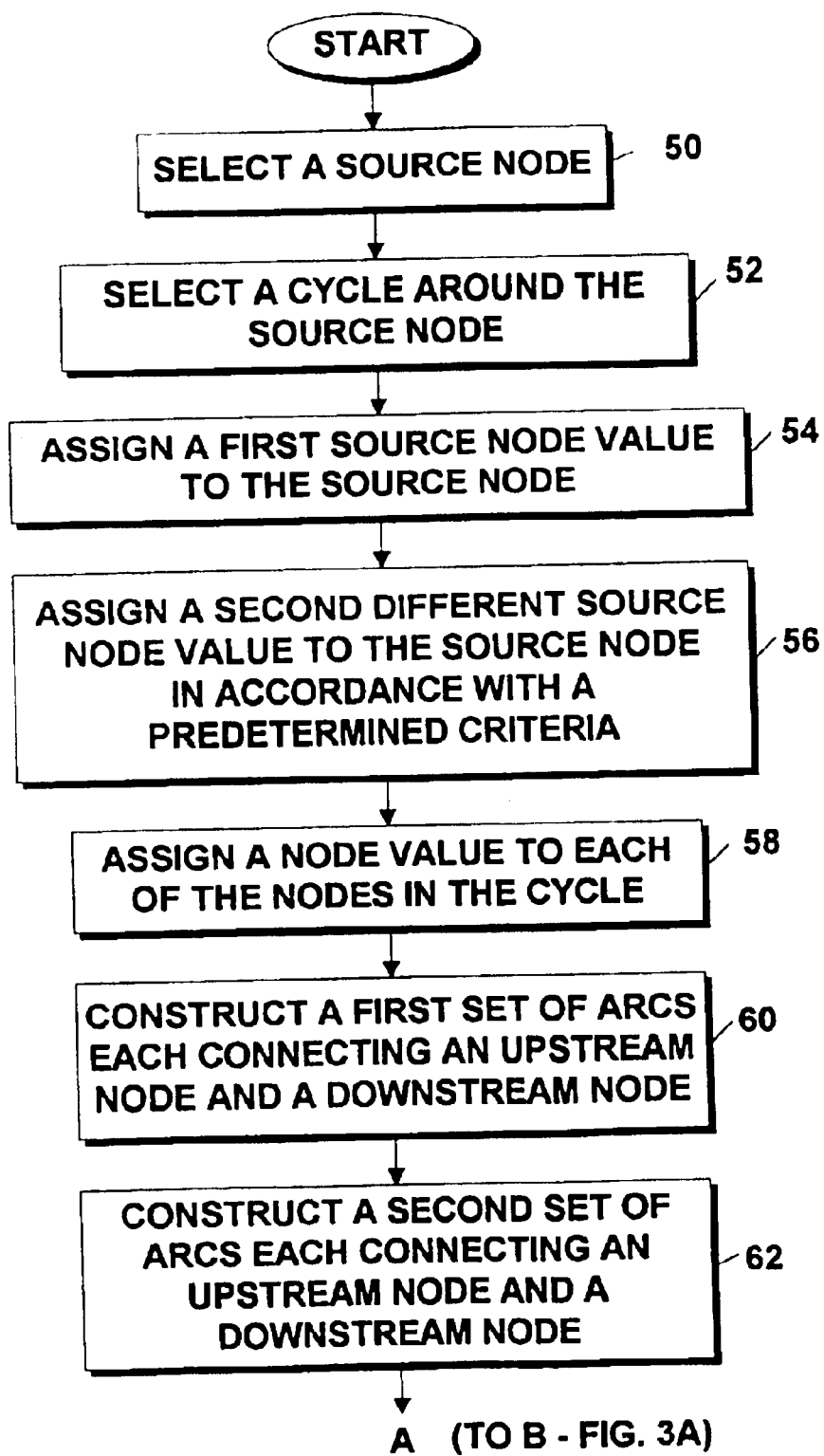
FIGS. 3–3B are a series of flow diagrams illustrating the steps to generate redundant trees from a node redundant graph.
Figure 3A:
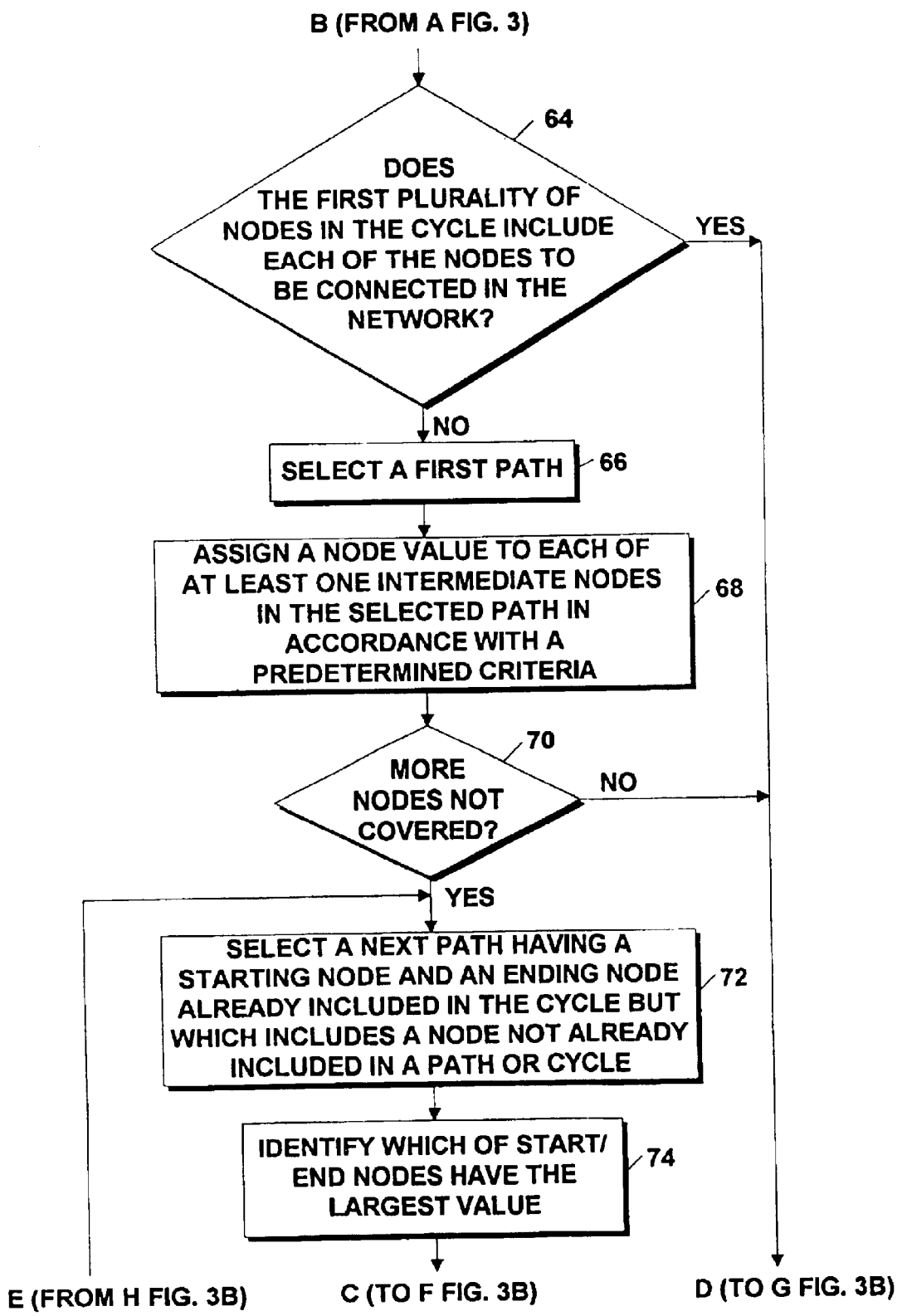
Figure 3B:
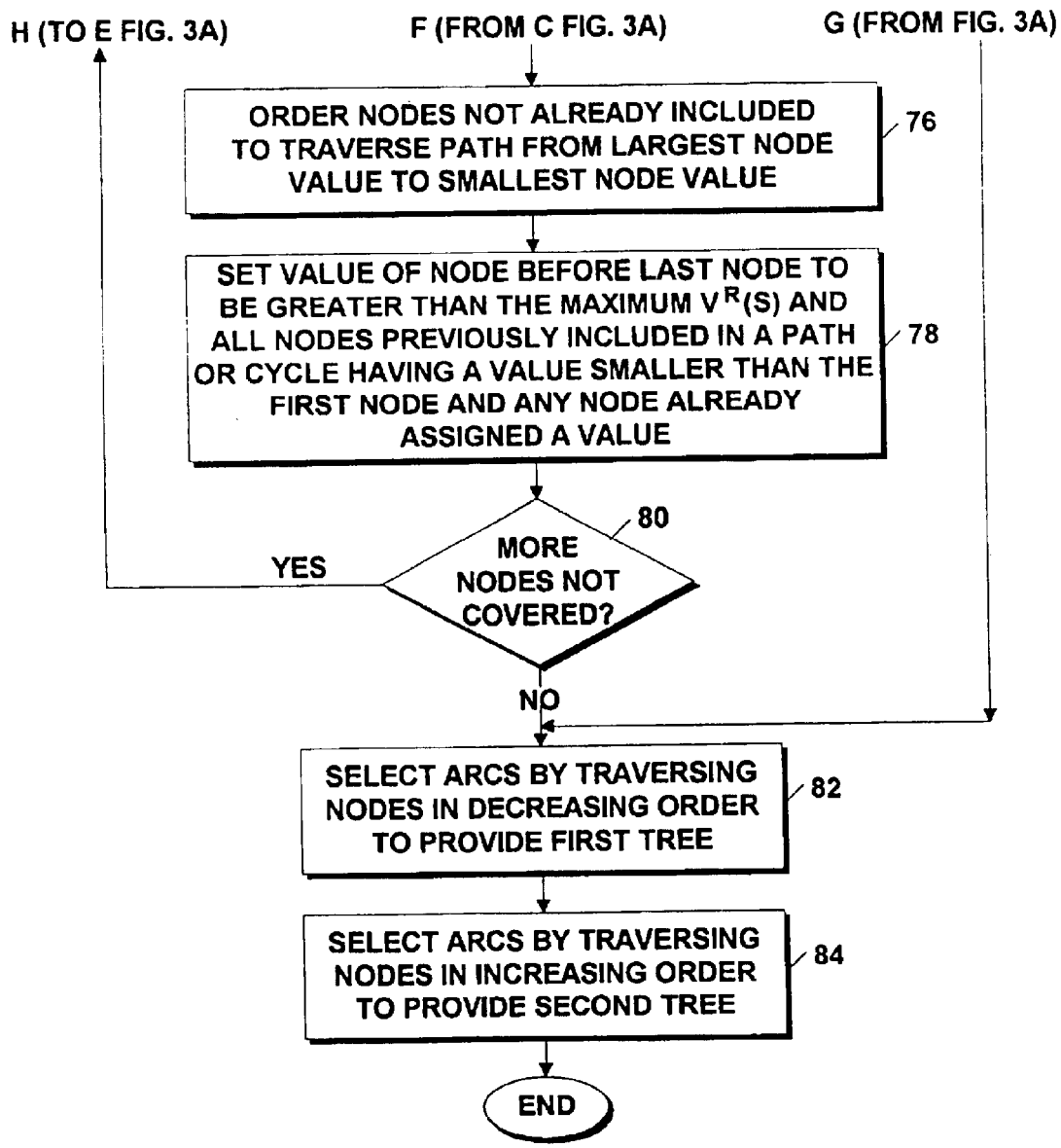

Referring now to FIGS. 3–3B, a series of flow diagrams illustrating the processing to be performed to compute a pair of redundant trees for a network which is node redundant are shown. As used herein, the phrase "node redundant network" refers to a network in which elimination of any single node does not totally inhibit communication with any other node in the network among remaining nodes. The processing shown in FIGS. 3–3B can be performed to identify tree structures in an existing network or alternatively the processing can be performed to plan a network not yet in existence. In either case the network may be represented as a node redundant undirected graph G denoted as:

$$G(N, E)$$

in which:

N represents the nodes in the network; and

E represents the edges in the network.

An undirected edge refers to an unordered pair of nodes (i.e., nodes between which information flows or can be transmitted in either direction). An undirected edge will be denoted herein using the following notation:

$$[n_1, n_2].$$

Thus, an undirected edge $[n_1, n_2]$ indicates that information can flow in either direction between node $n_1$ and node $n_2$.

A directed path is an ordered set of nodes (i.e. a path with a direction) which does not include a cycle and in which there exists an edge between two adjacent nodes within the ordered set of nodes.

A directed cycle is an ordered set of nodes in which there exists an edge between two adjacent nodes and in which there is no repetition of nodes within the set except that the first and last nodes are identical.

It should be noted that the terms "node" and "vertex" are used interchangeably herein and that an ordered pair of nodes refers to nodes between which a signal flows or is transmitted in only one direction. Such an ordered pair of nodes is typically referred to as an arc. Thus, an arc from node $n_1$ to a node $n_2$ may be denoted using the following notation:

$$(n_1, n_2).$$

Thus, arc $(n_1, n_2)$ indicates that information flows from the first node $n_1$ to the second node $n_2$. Accordingly, a pair of arcs $(x_1, x_2)$ and $(x_2, x_1)$ are functionally equivalent to the undirected edge $[x_1, x_2]$.

In accordance with the techniques of the present invention, for any source node S which belongs to the set of nodes N (which may be denoted as S∈N), one can generate a first directed tree herein designated B and a second directed tree herein designated R such that, after eliminating any node (in the node redundant case) or any edge (in the edge redundant case), the source node S remains connected to all other nodes N of the network through the first tree B and/or through the second tree R even when deprived of the eliminated node or edge, respectively.

In general overview, starting with a node redundant graph G=(N, E) and a source node S, the process of the present invention includes the steps of selecting a cycle, and then subsequent paths, and ordering the node 'voltages' as they get included in the cycle or one of the paths. Two arbitrary 'voltages' designated $v^B(s)$ and $v^R(s)$, are associated with the source node S and the voltages are selected such that $v^B(s) > v^R(s)$. Reference is sometimes made herein to voltage $v^B(s)$ as $v(s)$ in the process. The set of nodes which have already been assigned a voltage at stage j of the process are denoted as $N_j$. At each stage j of the process, a first or Blue (B) directed tree, $(N_j, A_j^B)$ and a second or Red (R) directed tree $(N_j, A_j^R)$ are formed, both of which span the set of nodes $N_j$.

The superscripts B, R used in the arc notation A indicates the tree to which a set of arcs belongs. Thus, superscript B denotes a set of arcs in the first or Blue tree and superscript R denotes a set of arcs in the second or Red tree.

The subscript j used in the arc notation A indicates the subtree to which the arc belongs. Thus $E_1$ denotes the set of arcs in the first path which correspond to a cycle. $A_2$ denotes a set of arcs formed by the union of the first set of arcs $A_1$ and the first path selected after the cycle, if any. $A_3$ would be similarly formed by adding to $A_2$. Hence the notation $E_1^B$ denotes the set of arcs derived from the cycle of the first or Blue tree while $E_1^R$ denotes the set of arcs derived from the first cycle of the second or Red tree.

Turning now to FIG. 3, as shown in processing steps 50 and 52, processing begins by defining one of the network nodes N as a source node S and selecting a cycle containing the source node S and a plurality, here k, additional nodes denoted as $c_1, \ldots, c_k$. Then, as shown in steps 54, 56 first and second source node values are assigned to the source node in accordance with predetermined criteria. In one particular embodiment, the criteria requires that the second source node value be less than the first source node value.

Processing then proceeds to processing block 58 where a node value is assigned to each node in the cycle. In a preferred embodiment, the node values are assigned such that each node has a value between the first and second source node values. Moreover, the node values should be assigned such that, when traversing the nodes s through $c_k$ on the cycle, the node values are reached in either descending or ascending order.

Steps 50–58 may be mathematically represented as follows:

selecting a cycle $(s, c_1, \ldots, c_k, s)$ in the graph G with $k \geq 2$ where k corresponds to the number of nodes in the cycle excluding the source node.

Expressing the set of nodes $\{s, c_1, \ldots, c_k\}$ as $N_1$, the nodes can be ordered as shown in Equation 1 below:

$$v^B(s) > v(c_1) > \ldots v(c_k) > v^R(s) \quad \text{Equation 1}$$

in which $v(n)$ corresponds to the node values of the $n^{th}$ node where n corresponds to $c_1 – c_k$;

superscript B indicates that the value is associated with the first or Blue tree topology; and superscript R indicates that the value is associated with the second or Red tree topology.

Thus as can be seen in Equation 1, the nodes are ordered in a particular manner.

Processing then flows to processing steps 60 and 62 where a first set of arcs connecting an upstream node and a downstream node and a second set of arcs connecting a down stream node and a upstream node are respectively computed.

This may be expressed as shown in Equations 2 and 3:

$$A_1^B = \{(s,c_1), (c_1c_2), \ldots, (c_{k-1}, c_k)\} \quad \text{Equation 2}$$

$$A_1^R = \{(s,c_k), (c_k, c_{k-1}), \ldots, (c_2, c_1)\} \quad \text{Equation 3}$$

in which:

A corresponds to a set of arcs;

superscript B indicates that the value is associated with the first or Blue tree topology;

superscript R indicates that the value is associated with the second or Red tree topology; and subscripts on A indicate which set of nodes have been processed (e.g. subscript 1 indicates it is the first subtree which is from the first cycle).

Processing then flows to decision block 64, where a decision is made as to whether the cycle selected in step 52 includes all nodes which should be connected in the graph. It should be noted that in some applications all the nodes to be connected may fewer than all of the nodes in the graph. That is, it may be desirable to connect a subset of all of the nodes which already exist or which may exist in a network in future plans. Alternatively, it may not be possible to connect all nodes in a network.

If not all the nodes to be connected are included in the cycle, then processing flows to processing block 66 where a path starting on some node in the cycle is selected. The selected path passes through some set of nodes not on the cycle, and ends on another node on the cycle. At this point, the first path is being processed and thus the index j is set equal to 2 (i.e. j=2). The selected path may be expressed as shown in Equation 4 where the index j has been included:

$$\text{selected path} = (x_{j,0}, x_{j,1}, \ldots x_{j,Lj}) \qquad \text{Equation 4}$$

in which $x_{j,0}$ corresponds to the starting node on the $j^{th}$ path;

$x_{j,1}$ corresponds to the second node on the $j^{th}$ path; and $x_{j,Lj}$ corresponds to the last node on the $j^{th}$ path.

It should be noted that the selected path should include at least three nodes (i.e. $L_j$ should be provided having a value greater than or equal to two), the starting and ending nodes $x_{j,0}$ and $x_{j,Lj}$ respectively in the path should belong to the set of nodes which have already been assigned a value with the node value of the starting node $x_{j,0}$ being greater than the node value of the ending node $x_{j,Lj}$.

This may be expressed mathematically as:

$$x_{j,0} \in N_{j-1}$$

$$x_{j,Lj} \in N_{j-1}$$

$$v(x_{j,0}) > v(x_{j,Lj})$$

Processing then flows to step 68 where the nodes in the selected path which do not already have a value are assigned a value in accordance with a predetermined criteria. This may be accomplished by adding the new nodes to the set of nodes which have already been assigned a value at a previous stage in the processing and then ordering the nodes in accordance with the predetermined criteria.

This may be expressed as shown in Equations 5 and 6, respectively:

$$N_j = N_{j-1} \cup \{x_{j,1}, \ldots, x_{j,Lj-1}\} \qquad \text{Equation 5}$$

$$v(x_{j,0}) > v(x_{j,1}) > \ldots > v(x_{j,Lj-1}) > v_{max} \qquad \text{Equation 6}$$

where $v_{max} = \max [v^R(s), \max[v(y):v(y)<v(x_{j,0})]]$ in which $y \in N_{j-1}$; and $v(y) < v(x_{j,0})$ indicates node values having a value less than the value of node $x_{j,0}$.

If in decision block 70 decision is made that the cycle and path above do not include all nodes of the graph, then processing proceeds to steps 72–78 and another path is again constructed starting on some node already included, passing through one or more nodes not included, and then ending on another already included node. Counter j is then incremented.

In processing block 74, the node value of the starting node on the path is compared to the value of the ending node on the path and the node having the largest value is identified. Processing then proceeds to processing block 76 where the nodes not already included are ordered such that the path can be traversed from the node having the largest value to the node having the smallest value.

Processing then proceeds to step 78 where the value of the node adjacent the starting or ending node on the path having the largest value is set to be the greater of: (1) the maximum of the Red value of the source node on the Red tree and (2) all nodes previously included in a path or cycle having a value smaller than the first node and any node already assigned a value.

Decision block 80 implements a loop to continue the processing in steps 72–78 such that the technique continues to add new nodes until all nodes which are desired to be included are included.

If a decision is made in decision block 80 that all nodes which should be included have been included, then processing proceeds to steps 82 and 84 where arcs are selected by traversing nodes in decreasing and increasing orders, respectively, to provide the first and second trees, respectively.

The steps outlined above specify a particular ordering of nodes without assigning specific numerical values to associate with the nodes. Based on this ordering, the process incrementally builds the network tree topology.

This particular way of ordering nodes has the convenient feature that the new nodes at each new path are entered all together into the previously ordered set. It is also recognized that the dominant computational task is simply finding the cycle and the subsequent paths. It is simplest to search for an arbitrary path, and then reorder it if need be. Choosing the cycle and paths in different ways can yield a variety of different tree structures. For example, unbalanced trees with long individual paths or balanced trees with short paths, will become clearer below, depending on particular requirements and criteria. Such criteria might include in a communications network, minimum error rate or minimum delay. In a power network (e.g. a power distribution grid), on the other hand, such criteria might include a minimum resistance. Still in other types of network, other criteria appropriate to the network would be used.

Figure 4A:
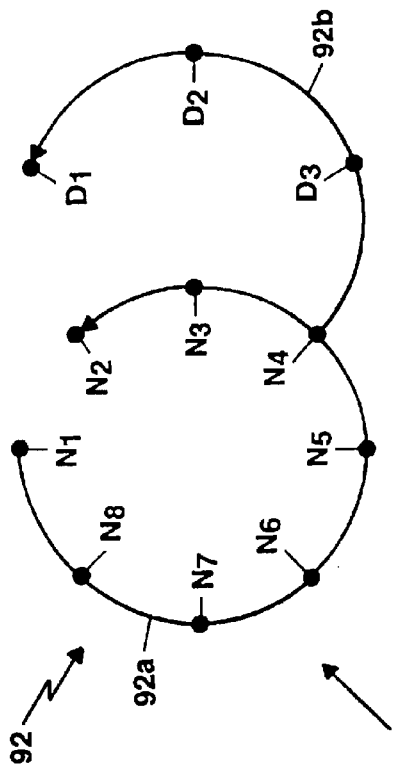
FIGS. 4–4B are a series of diagrams illustrating selection of a trees in a graph.
Figure 4B:
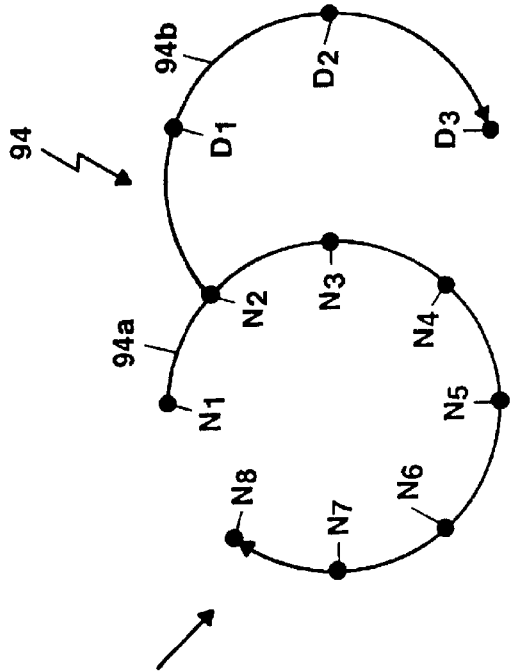
Figure 4:
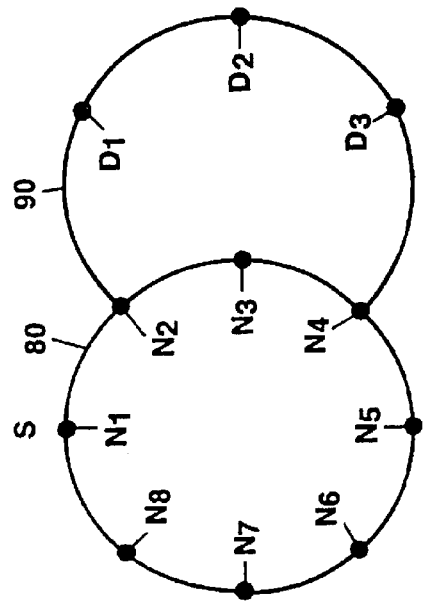

Referring now to FIG. 4, an example of the selection of a cycle and a path are shown. A cycle 88 includes nodes $N_1$–$N_8$ with node $N_1$ designated as a source node. A path 90 beginning and ending on the cycle 88 includes nodes $D_1$–$D_3$.

It should be noted that in a node redundant graph, the selection of cycles and paths is made such that a cycle containing the source node $N_1$ exists and that for any such cycle, a path can be added as described above in conjunction with FIGS. 3–3B. Subsequent such paths can be added, in arbitrary ways in compliance with some preselected criteria, until all nodes to be connected are included in a cycle or a path.

Care must be taken in selection of cycles and paths since it is possible to select cycles and paths which do not result in the desired redundant tree structures. That is, it is possible to select cycles and paths such that failure of a single node may leave a destination node disconnected. In accordance with the techniques of the present invention, however, appropriate selection of cycles and paths is guaranteed by appropriate ordering of nodes.

For example, selection of cycle 88 and path 90 can result in generation of a first tree 92 (FIG. 4A) and a second tree 94 (FIG. 4B). As illustrated in FIGS. 4–4B, tree structures 92, 94 result in redundancy such that all nodes can be reached from source node $N_1$ by one of the trees 92, 94. It should be noted, however that other tree topologies can be generated based on the same cycle and path, so that failure of a node or link does not leave all remaining nodes connected to the source node. For example, if the directions of paths 92a (FIG. 4A) and path 94a (FIG. 4B) are reversed, then failure of node $N_3$ or failure of the link between nodes $N_2$ and $N_3$ results in a situation where the nodes $D_1$, $D_2$, and $D_3$ on paths 92b, 94b are disconnected from the source node $N_1$.

Appropriate selection of a direction for the cycle 88 and path 90, allows selection of a first tree 92 following a first direction around the cycle 88 and path 90 and selection of a second tree 94 following a second opposite direction around the cycle 88 and path 90. Thus, the technique of the present invention allows selection of directions for cycles 88 and paths 90 which lead to the provision of pairs of redundant tree structures such as tree structures 92, 94.

Assigning directions to the cycles and paths may be thought of in terms of the following analogy. A source node is provided as a voltage source and each edge of the cycle and any added paths corresponds to a resistor having a predetermined resistance value (removing all other edges of the original graph from consideration). The directions around the cycle and path then correspond to the direction in which current would flow. The nodes are ordered in terms of node voltages assigned thereto with the source node S having two voltages (one on each side of the battery) assigned thereto.

Continuing with the analogy, selecting different resistor values can sometimes lead to different directions of current flow. Any such set of directions will yield network topologies having a least first and second tree structures B and R with the desired properties. In many cases more than one pair of tree topologies can be identified and steps can be taken to select preferred topologies. This corresponds to selecting these possible sets of directions for current flow.

Figure 5A:
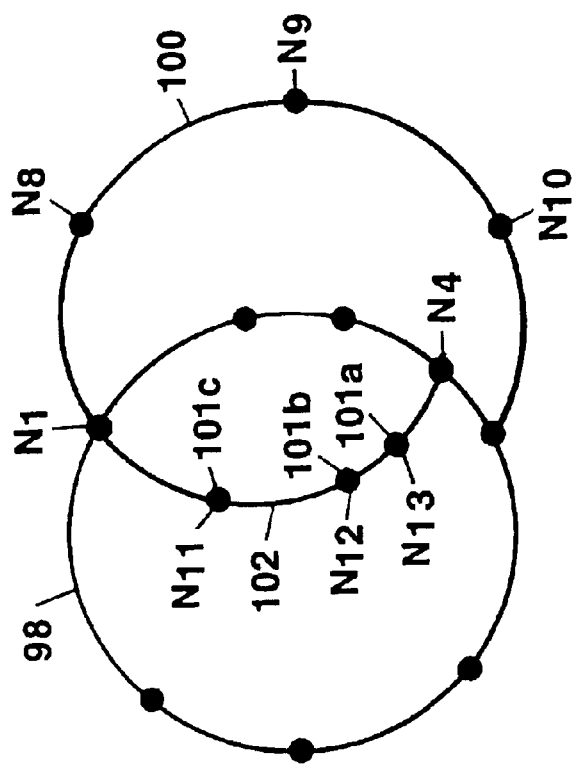
FIGS. 5–5B are a series of diagrams illustrating the assignment of node values in a graph.
Figure 5:
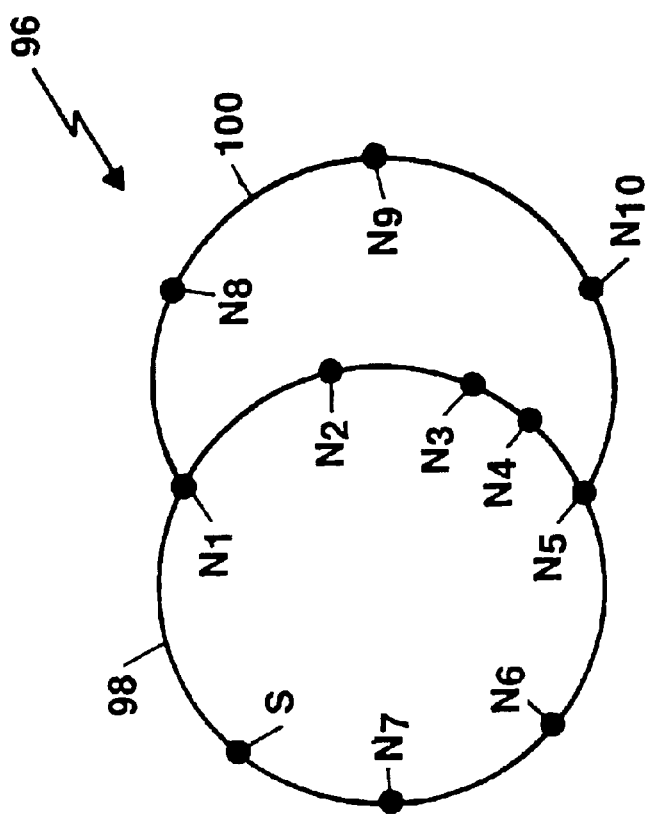
Figure 5B:
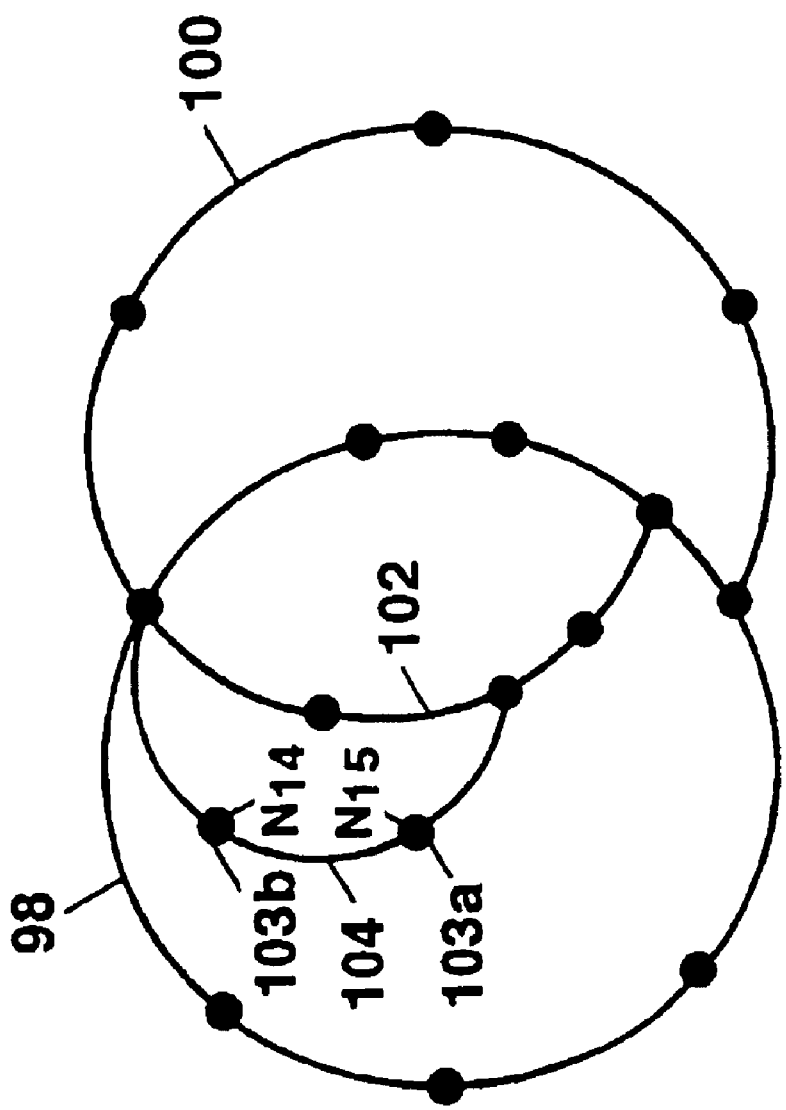

Referring now to FIGS. 5–5B, a series of diagrams illustrating the assignment of node values are shown. A cycle 98 includes a source node S and a plurality of intermediate nodes $N_1$–$N_7$. Once cycle 98 is selected, source node S may be assigned first and second source node values. For example, source node S may be assigned a first value of one hundred and a second value of zero. Each of the nodes $N_1$–$N_7$ may then be assigned a value in accordance with a predetermined criteria.

Alternatively, rather than assigning node values after immediately selecting a cycle or a path, all cycles and paths may first be selected. For example, after selecting cycle 98 a path 100 beginning on node $N_1$, ending on node $N_5$ and including nodes $N_8$–$N_{10}$ may first be generated and then node values assigned to nodes $N_1$–$N_{10}$.

For ease of explanation, in this particular example, node values will be assigned as nodes are included in added paths. Those of ordinary skill in the art will appreciate, however, that all the paths to be described below could first be selected and then once all the nodes to be included in the network are included in a cycle or a path, node values could be assigned. Alternatively still, a combination of cycle and path selection and node assignment values may also be used.

With the source node assigned a first value of 100 and a second value of zero, nodes $N_1$–$N_7$ may be assigned the value shown in Table 1 below.

TABLE 1

| Node | Node Values |
|---|---|
| S | 100, 0 |
| $N_1$ | 90 |
| $N_2$ | 80 |
| $N_3$ | 70 |
| $N_4$ | 60 |
| $N_5$ | 50 |
| $N_6$ | 40 |
| $N_7$ | 30 |

Next, path 100 is selected to include nodes $N_8$, $N_9$ and $N_{10}$. In accordance with the technique of the present invention, these nodes are assigned values which are between the starting and ending nodes of the path 100. Thus, in this particular example, the staring node $N_1$ has been assigned a value of ninety (90) and the ending node $N_5$ of the path 100 has been assigned a value of fifty (50). Thus, nodes $N_8$, $N_9$, and $N_{10}$ should be assigned node values between the values of ninety (90) and fifty (50). The possible node values to select from are further limited in that node $N_2$ has a value of eighty (80) and new node values must have an value greater than eighty (80) and less than ninety (90). Thus, one possible selection of node values is that shown in Table 2.

TABLE 2

| Node | Node Value |
|---|---|
| $N_8$ | 88 |
| $N_9$ | 86 |
| $N_{10}$ | 84 |

Thus, upon assignment of the node values, an ordered set of nodes $N_1$–$N_{10}$ in network 96 is provided. From this ordered set of nodes, a pair of trees similar to trees 92 (FIG. 4A) and 94 (FIG. 4B) may be generated.

Referring now to FIG. 5A, additional nodes $N_{11}$–$N_{13}$ are included in a path 102. Path 102 begins on node $N_1$, ends on node $N_4$ and includes nodes $N_{11}$–$N_{13}$. Thus, nodes $N_{11}$–$N_{13}$ must be assigned node values which are between the values of node $N_1$ and node $N_4$. Furthermore, the node values assigned to node values $N_{11}$–$N_{13}$ can be no greater than the node value of the starting node on the path and can be no less than the largest node value already included on any cycle or path. For example, nodes $N_1$–$N_{10}$ are already included in a previous cycle or path. Thus, appropriate node values for nodes $N_{11}$–$N_{13}$ are shown in Table 3 below.

TABLE 3

| Node | Node Value |
|---|---|
| $N_{11}$ | 89.8 |
| $N_{12}$ | 89.6 |
| $N_{13}$ | 89.4 |

It should be noted that assignment of such node values again results in an ordered set of nodes $N_1$–$N_{13}$.

Referring now to FIG. 5B, a third path 104 beginning on node $N_1$, ending on node $N_{12}$ and including nodes $N_{14}$, $N_{15}$ is shown. Thus, the nodes $N_{14}$ and $N_{15}$ must be assigned values between the values assigned to nodes $N_1$ and $N_{12}$ and must also satisfy the condition that they are greater than the node values of any other node already included in a cycle or a path. Thus, appropriate node values for nodes $N_{14}$ and $N_{15}$ are shown below in Table 4.

TABLE 4

| Node | Node Value |
|---|---|
| $N_{14}$ | 89.98 |
| $N_{15}$ | 89.96 |

Thus, nodes $N_1$–$N_{15}$ are now provided as an ordered set of nodes. It should be noted that it is not necessary that certain nodes have different values. For example, nodes $N_2$ and $N_3$ may be assigned like node values since no path begins or ends on either of these nodes.-

Figure 6:
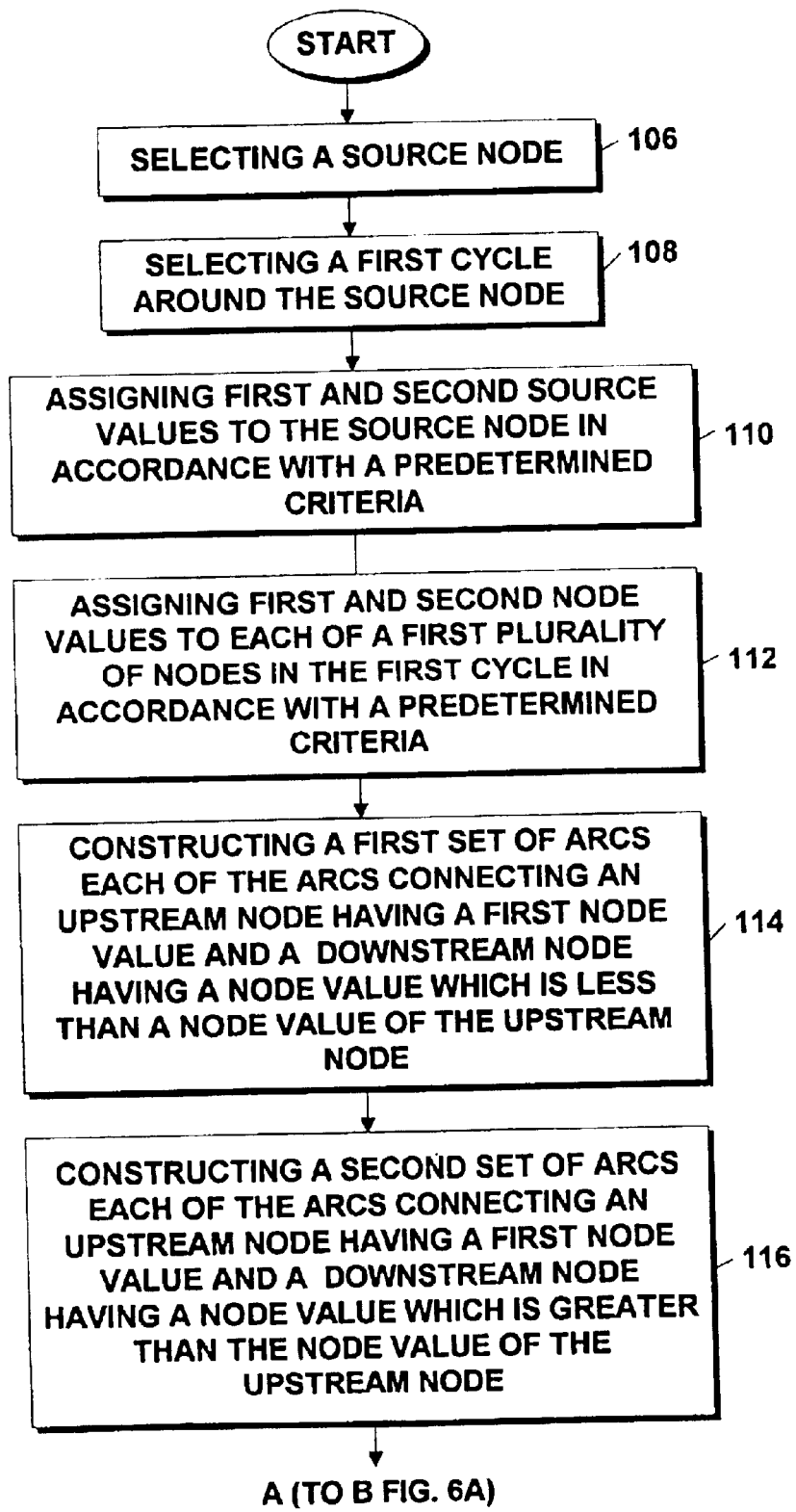
FIGS. 6–6B are a series of flow diagrams illustrating the steps to generate redundant trees from an edge redundant graph.
Figure 6A:
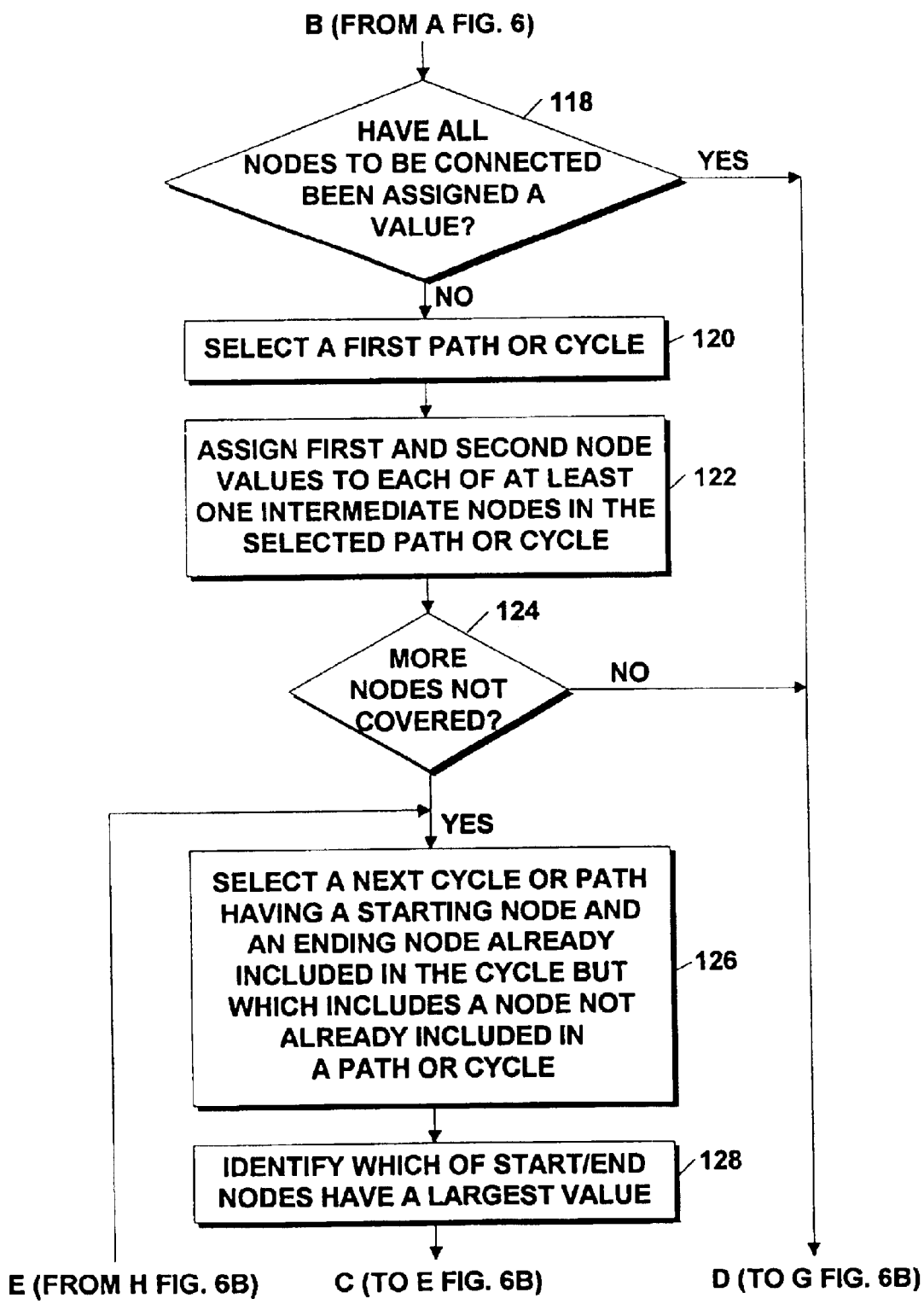
Figure 6B:
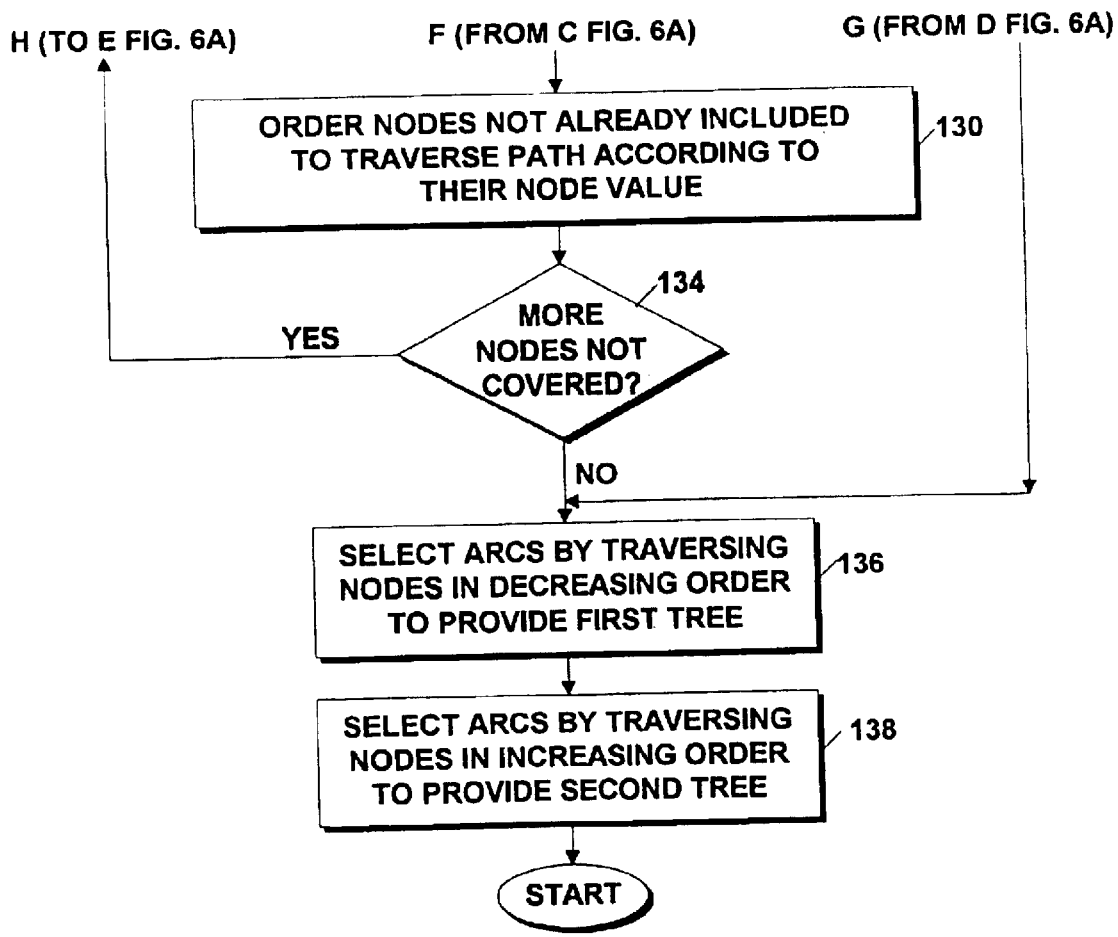

Referring now to FIGS. 6–6B, the process steps to provide a pair of redundant trees for switch protection for link failure are shown. Processing in FIGS. 6–6B assumes that an edge redundant graph is being processed. Unless otherwise defined differently hereinbelow, the notation used in conjunction with FIGS. 6–6B is the same as that explained above in conjunction with FIGS. 3–3B.

In general overview, starting with an edge graph which may be expressed as G=(N, E) and a source node S, the process of the present invention selects a cycle, and then subsequent paths, and also orders the node 'voltages' as they get included in the cycle or one of the paths. Two arbitrary 'voltages' designated $v^B(s)$ and $v^R(s)$, are associated with the source node S and the voltages are selected such that $v^B(s) > v^R(s)$. During the processing of the edge redundant graph G, each of the nodes is assigned a first or blue node value and a second or red node value. The set of nodes which have already been assigned a voltage at a stage j of the process are denoted as $N_j$. At each stage j of the process, a first or Blue (B) tree, $(N_j, E_j^B)$ and a second or Red (R) tree $(N_j, E_j^R)$ are formed, both of which span the set of nodes $N_j$.

The steps discussed above in conjunction with FIGS. 3–3B, for node failure protection do not provide a pair of redundant tree structures for the case where a link failure is considered, because it is not always possible at a stage $j \geq 2$ to find paths as described above in conjunction with FIGS. 3–3B. Sometimes, it is necessary to find a cycle that leaves the set of nodes $N_{j-1}$ on one node and returns to the same node, i.e. with $x_{j,O} = x_{j,Lj}$. This can be handled by letting each node x have two 'voltages,' $v^B(x)$ and $v^R(x)$ associated with it. Thus, the ordering described above in process steps 58, 68 and 76 are modified by ordering the nodes in accordance with the criteria of Equation 7.

$$v^B(s) > v^B(c_1) > v^R(c_1) > v^B(c_2) > v^R(c_2) > \ldots > v^B(c_k) > v^R(c_k) > v^R(s) \quad \text{Equation 7}$$

Turning now in more detail to FIGS. 6–6B, processing begins in steps 106, 108 with selection of a source node S and a cycle containing the source node S and k additional nodes $c_1, \ldots, c_k$. Then, as shown in step 110 first and second source node values are assigned to the source node in accordance with a predetermined criterion. In one particular embodiment, the criteria requires that the second (or red) source node value be less than the first (or blue) source node value.

Processing then proceeds to processing block 112 where first and second node values are assigned to each node in the cycle. In a preferred embodiment, the node values are assigned such that the first and second node values assigned each node are between the first and second source node values. Moreover, the node values should be assigned such that when traversing the nodes on the cycle, the first or blue node values are reached in either descending or ascending order.

Steps 106–112 may be mathematically represented as follows:

selecting any cycle (s, $c_1, \ldots, c_k$, s) in the graph G with $k \geq 2$ where k corresponds to the number of nodes in the cycle excluding the source node.

Expressing the set of cycle nodes $\{s, c_1, \ldots, c_k\}$ as $N_1$, the nodes can be ordered as shown in Equation 7 above and repeated here for convenience:

$$v^B(s) > v^B(c_1) > v^R(c_1) > v^B(c_2) > v^R(c_2) > \ldots > v^B(c_k) > v^R(c_k) > v^R(s) \quad \text{Equation 7}$$

in which v(n) corresponds to the node values of the $n^{th}$ node where $n = c_1 - c_k$;

superscript B indicates that the value is associated with the first or Blue tree topology; and superscript R indicates that the value is associated with the second or Red tree topology.

Thus as can be seen in Equation 7, the nodes are ordered in a particular manner.

Next, as shown in processing steps 114 and 116 where first and second sets of arcs are constructed. Each of the arcs in the first set link an upstream node having a first node value and a downstream node having a node value which is less than a node value of the upstream node. Each of the arcs in the second set connect an upstream node having a first value and a downstream having a node value which is greater than a node value of the upstream node. This results in an ordered set of nodes which are connected by arcs.

This may be expressed as shown in Equations 8 and 9:

$$A_1^B = \{(s, c_1), (c_1, c_2), \ldots, (c_{k-1}, c_k)\} \quad \text{Equation 8}$$

$$A_1^R = \{(s, c_k), (c_k, c_{k-1}), \ldots, (c_2, c_1)\} \quad \text{Equation 9}$$

in which the notation is the same as that described above in conjunction with FIGS. 3–3B.

In decision block 118, a determination is made as to whether all nodes to be connected have been assigned node values (i.e. were all desired nodes included in the cycle). If all nodes were included in the cycle, then processing proceeds to steps 136, 138 where arcs are selected by traversing nodes in decreasing and increasing order, respectively, to provide the first and second trees.

If all nodes have not been assigned a value, then steps 120, 122 and 124 are performed to ensure that each node to be connected is assigned a node value. It should be noted that in some applications, all nodes to be connected may be fewer than all nodes included in the graph. That is, it may be desirable to connect a subset of all of the nodes which exist or which may exist in a graph representing a network.

As shown in step 120, a first path or cycle including one or more intermediate nodes is selected and processing proceeds to step 122 where first and second node values are assigned to each of the at least one intermediate nodes in the selected path or cycle. In decision block 124, a decision is made that if all nodes are covered (i.e. all nodes have been included in a path or cycle) then processing proceeds to steps 136, 138 as described above. Otherwise, if all nodes are not covered then processing proceeds to processing step 126 where a next path having a starting node and an ending node already included in the cycle but which includes a node not already included in a previous path or cycle is selected. This may be expressed as shown in Equation 10:

$$\text{selected path or cycle} = (x_{j,0}, x_{j,1}, \ldots x_{j,Lj}) \quad \text{Equation 10}$$

in which $x_{j,0}$ corresponds to the starting node on the $j^{th}$ path;

$x_{j,1}$ corresponds to the second node on the $j^{th}$ path; and $x_{j,Lj}$ corresponds to the ending node on the $j^{th}$ path; and $L_j$ has a value equal to the number of nodes on the $j_{th}$ path minus 1.

It should be noted that for a path the following conditions should be met: (1) at least three nodes should be included (i.e. the quantity Lj should be provided having a value greater than or equal to two); (2) the starting and ending nodes $x_{j,0}$ and $x_{j,Lj}$ respectively in the path should belong to the set of nodes which have already been assigned a value; and (3) the first (or blue) node value of the starting node $x_{j,0}$ should be greater than the first (or blue) node value of the ending node $x_{j,Lj}$.

This may be expressed mathematically as:

$$x_{j,0} \in N_{j-1}$$

$$x_{j,Lj} \in N_{j-1}$$

$$v^B(x_{j,0}) > v^B(x_{j,Lj})$$

For a cycle on the other hand, the following conditions should be met: (1) at least three nodes should be included (i.e. $L_j$ should be provided having a value greater than or equal to three) and (2) the starting and ending nodes $x_{j,0}$ and $x_{j,Lj}$ are the same node and should belong to the set of nodes which have already been assigned a value.

This may be expressed mathematically as:

$$x_{j,0} = x_{j,Lj} \in N_{j-1}$$

$$v^B(x_{j,0}) = v^B(x_{j,Lj})$$

Processing then flows to step 128 where the beginning and ending nodes on each of the paths having the largest value of the first and second values are identified.

Processing then flows to step 130 where the nodes in the selected path which do not already have a value assigned thereto are assigned a value in accordance with predetermined criteria. This may be accomplished by adding the new nodes to the set of nodes which have already been assigned a value and at a previous stage in the processing and then ordering the nodes in accordance with the predetermined criteria. The nodes are ordered such that the path or cycle in which the nodes are included may be traversed according to the node values.

This may be expressed as shown in Equations 11 and 12, respectively:

$$N_j = N_{j-1} \cup \{x_{j,1}, \ldots, x_{j,Lj-1}\} \qquad \text{Equation 11}$$

$$v^B(x_{j,0}) > v^B(x_{j,1}) > v^R(x_{j,1}) > v^B(x_{j,2}) > v^R(x_{j,2}) > \ldots > v^B(x_{j,Lj-1}) > v^R(x_{j,Lj-1}) > v_{max} \qquad \text{Equation 12}$$

where $v_{max}$=is the maximum of $v^B(y) < v^B(x_{j,0})$ and $v^R(y) < v^B(x_{j,0})$ where $y \in N_{j-1}$.

Processing then proceeds to decision block 134 where a decision is made as to whether all nodes to be included in the network have been included. If more nodes must be included, then processing flows back to step 126 and steps 126, 128 and 130 are repeated until all nodes are included in a cycle or path and are assigned values.

In decision block 134, if decision is made that all nodes have been covered, then processing proceeds to steps 136 and 138 where arcs are selected by traversing nodes in decreasing order to provide a first (or Blue) tree and arcs are selected by traversing nodes in an increasing order to provide the second (or Red) tree. This results in a network having nodes logically connected via first and second redundant tree topologies.

Figure 7:
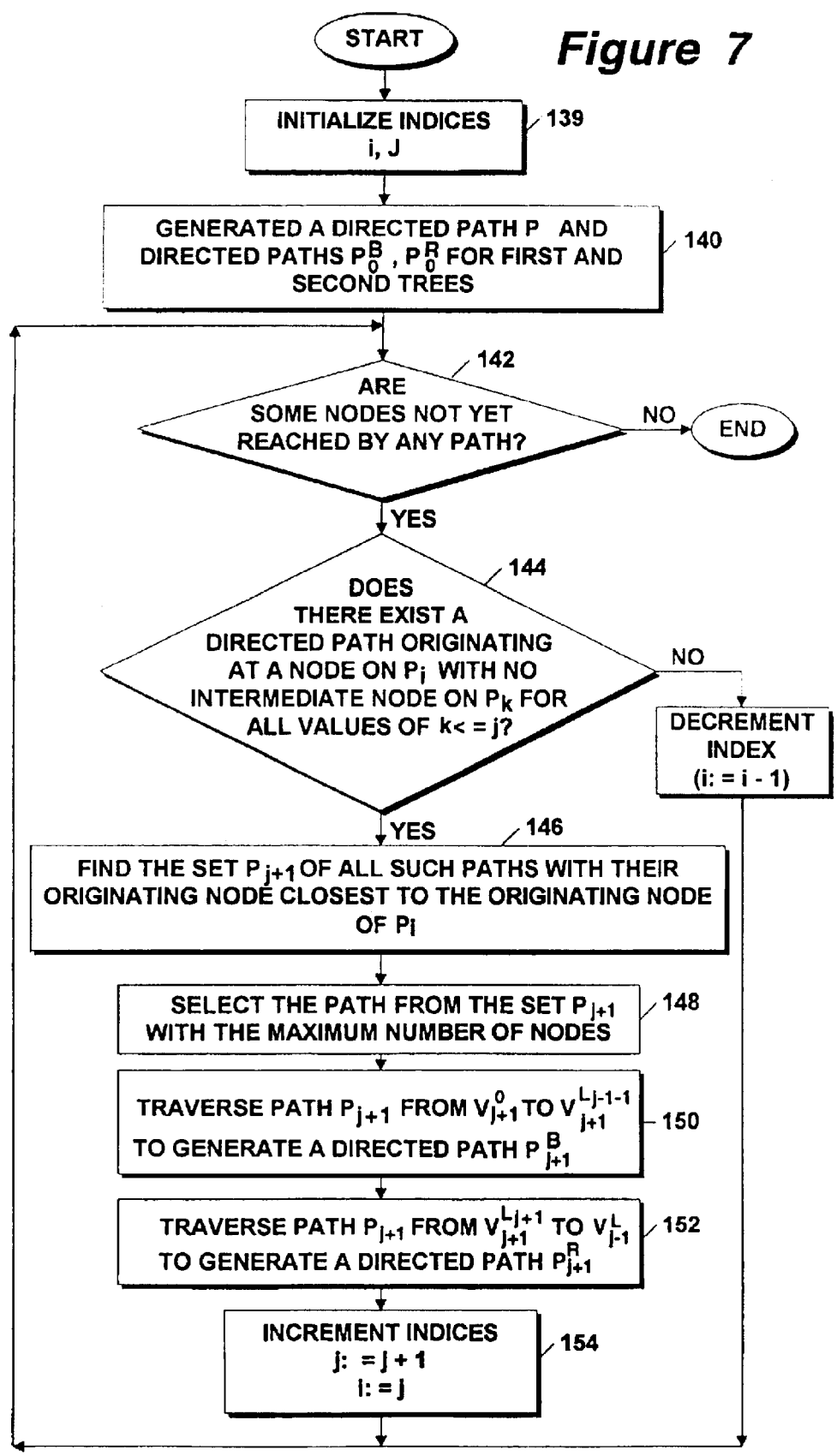
FIG. 7 is a flow diagram illustrating the steps to generate a limited number of trees from an edge redundant undirected graph.

Referring now to FIG. 7, a flow diagram illustrating the steps to select a pair of redundant trees using a predetermined criteria are shown. In this particular example, optimum trees based on a longest path criteria are selected. It should be noted, however, that trees may be selected to optimize any criteria including but not limited to load balancing, path costs, reliability of paths, maximum number of nodes on a path, average number of nodes traversed by a communication session, symmetry of trees, separability of sub-trees, maximum load on a link and average transmission costs.

Considering an edge redundant undirected graph G(V,E) whereby the phrase edge redundant indicates that eliminating any one single edge from the set of edges E leaves the graph nodes mutually connected. From the graph E a digraph G' (N, A) is constructed where the set of arcs A is constructed from edges E by replacing each edge $[v_1, v_2]$ by the arcs $(v_1, v_2)$ and $(v_2, v_1)$. For any source node S belong to the set of nodes N two directed trees identified as Blue tree B and Red tree R may be generated such that after eliminating any pair of arcs $(v_1, v_2)$ and $(v_2, v_1)$ from the set of arcs A, the source node S remains connected to all nodes N of the network through the arcs of the Blue and/or Red trees.

Processing begins in step 139 with initialization of indices i, j. Index j corresponds to a path being generated while index i corresponds to a path which is a parent of a next path being generated (i.e. a path being examined to determine if another path will emanate therefrom).

Processing then proceeds to step 140 where a path $P_0$ (i.e. j=0) and directed paths $P_0^B$ and $P_0^R$ are generated.

As shown in step 142, a decision is made as to whether any nodes to be included are not yet reached by any paths. If a decision is made that all desired nodes have been included, then processing ends as shown.

If some nodes are not yet reached by any path, processing proceeds to step 144 where a decision is made as to whether there exists a directed path originating at a node on a path $P_i$ terminating on a node on a path $P_k$ for some k less than or equal to j and with no intermediate node on $P_k$ for all values of k less than j.

If such a directed path exists, then processing proceeds to step 146 which generates the set of paths $P_{j+1}$ within all such paths with their originating node closest to the originating node of path $P_i$. Next, processing proceeds to step 148 where a path is selected from the set of paths $P_{j+1}$ and subscript with the maximum numbers of nodes. This imposes a condition that the longest paths are selected.

Next, as shown in step 150 a directed path P is generated by traversing the path $P_{j+1}$ from $v_{j+1}^0$ until $v_{j-1}^{Lj-1-1}$. Next, processing proceeds to step 152 where a directed path $P_{j+1}^R$ is generated by traversing the path $P_{j+1}$ from $v_{j-1}^{1j+1}$ until $v_{j+1}^1$. Next, in step 154 the indices j and i are incremented and processing moves back to step 142 until all desired nodes are included in a cycle or a path. It should be noted that the value of index i may change by more than one.

The techniques described above in conjunction with FIGS. 1–7 (referred to hereinbelow as MFBG techniques) explain how to generate networks having tree structures which provide automatic protection switching (APS). Tree structures generated in this manner can be used to provide self-healing APS particularly appropriate and advantageous for multicast connections. If the links in the network are full-duplex and have a capacity C in each direction, then using the techniques described above, at least C protected trees can be constructed and used for multicasting and/or incasting operations.

It is recognized hereinbelow, however, that the novel techniques described above for providing APS using tree structures have a practical limitation when used for protection switching in commercial networks. In particular, for the above-described techniques to be used effectively, significant spare bandwidth in the networks is required to support the techniques. The bandwidth requirements of the techniques described above in conjunction with FIGS. 1–7 are analogous to Unidirectional Path Self-healing Rings (UPSR) APS on SDH/SONET rings in the sense that spare bandwidth is permanently allocated for each connection. Thus, the techniques described above in conjunction with FIGS.

1–7 are well-suited for use in systems having a large available bandwidth.

However, such specific bandwidth allocation for each connection results in bandwidth inefficiencies. This can be illustrated by observing the number of protected Simplex Point-To-Point (SPTP) connections that can be supported on a ring network. Using conventional UPSR techniques or the novel APS techniques described above in conjunction with FIGS. 1–7, on a ring with N nodes and full-duplex links between nodes (with link capacity of C channels in each direction), the maximum number of SPTP connections that can be protected corresponds to twice the capacity which may be expressed in equation form as:

$$2*C.$$

Thus, the permanent bandwidth requirement of the above techniques and any other technique which requires permanent bandwidth allocation limits the number of connections that can be protected using such techniques.

While the above mentioned techniques result in acceptable APS performance, the techniques are not well-suited for use in those networks having a relatively small bandwidth.

One approach which does not have the above requirement for permanent bandwidth allocation is the Bidirectional Link Switched Ring (BLSR) technique. The BLSR technique protects a maximum number of SPTP connections on a ring, depending upon traffic in the ring, corresponding to:

$$N*C$$

in which,

N corresponds to the number of nodes in the network; and

C corresponds to the number of channels in each direction on the links between nodes.

Each of the BLSR, UPSR and MFBG approaches result in a minimum number of protected SPTP, unicast or multicast connections corresponding to C protected connections. For most traffic patterns on ring networks, BLSR supports more protected connections than UPSR. The reasons for this are twofold: first, routes are often shorter under BLSR than under UPSR; and second, spare capacity is not dedicated for each connection but is shared among multiple connections thus reducing the spare capacity required. One problem with this approach however, is that it is limited to operation on ring networks.

It would thus be desirable to provide an APS approach which is well-suited to networks having relatively small bandwidth. It would also be desirable to provide a loopback APS approach which does not require the network to have a ring or any other particular network topology.

In accordance with the present invention and as will be described below in conjunction with FIGS. 8–16A, a technique based on link loopback which implements Bi-directional Link APS for an arbitrary edge or node redundant network and which does not require specific allocation of spare capacity for each connection is described. Rather than requiring specific allocation of spare capacity for each connection, the technique allows sharing of capacity among many connections and capacity is allocated for use only in the event of a failure. Furthermore, the network need not have a ring topology but rather can have any arbitrary topology which may be represented as a node or edge redundant graph.

For a network with N nodes and full-duplex links with capacity C, the technique provides a plurality of advantageous protection properties in the presence of a single edge or node failure including but not limited to: (1) protection of at least C arbitrary simplex unicast or multicast connections; (2) protection of up to $C*N(N-1)/2$ simplex unicast or multicast connections, depending upon network topology and traffic requirements (i.e. source and destinations for each connection); (3) a spare bandwidth requirement bounded only by the maximum traffic routed over a link (for a link redundant network) or through a node (for a node redundant network); (4) requires only local information for APS switching; and (5) provides protection for arbitrary network topologies which are either node or edge redundant.

In general overview, the technique of the present invention includes three portions. The first portion generates one or more redundant graphs, referred to herein as a Bi-directional Link Self-healing Network (BLSN) subgraphs, over an edge or node redundant network having an arbitrary network topology. The second portion of the technique relates to routing multicast and unicast (e.g. point-to-point) traffic connection requests over the BLSN subgraphs in such a way that BLSN automatic protection switching (APS) can be provided. The third portion of the technique relates to implementing APS recovery for an edge or a node failure in the network. Thus, after establishing or generating BLSN subgraphs, the subgraphs can be used to route multicast or unicast traffic connections and then can be used to implement APS recovery for an edge or a node failure in the network.

Figure 8:
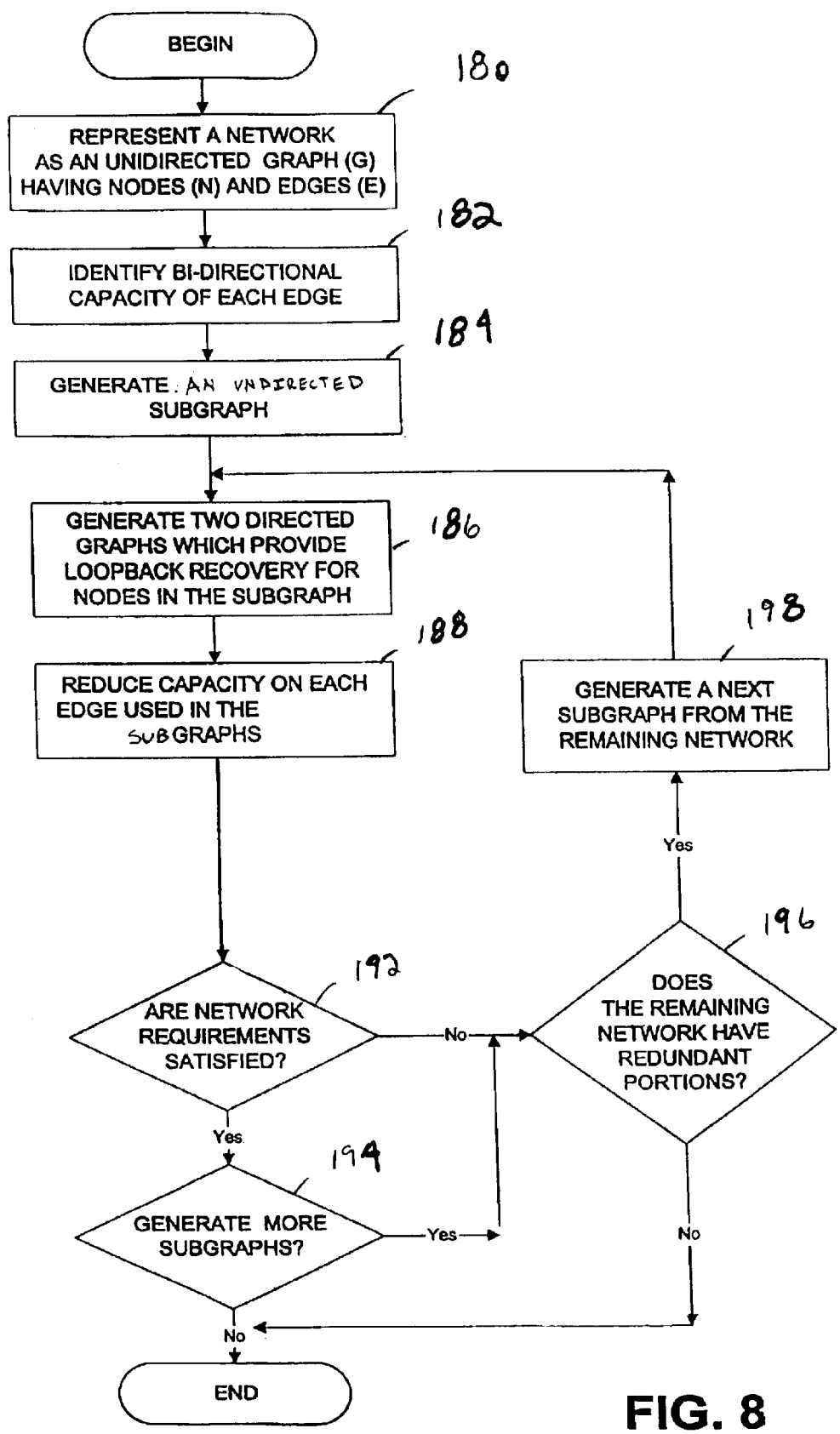
FIG. 8 is a flow diagram illustrating the steps to generate one or more bi-directional subgraphs.
Figure 9:
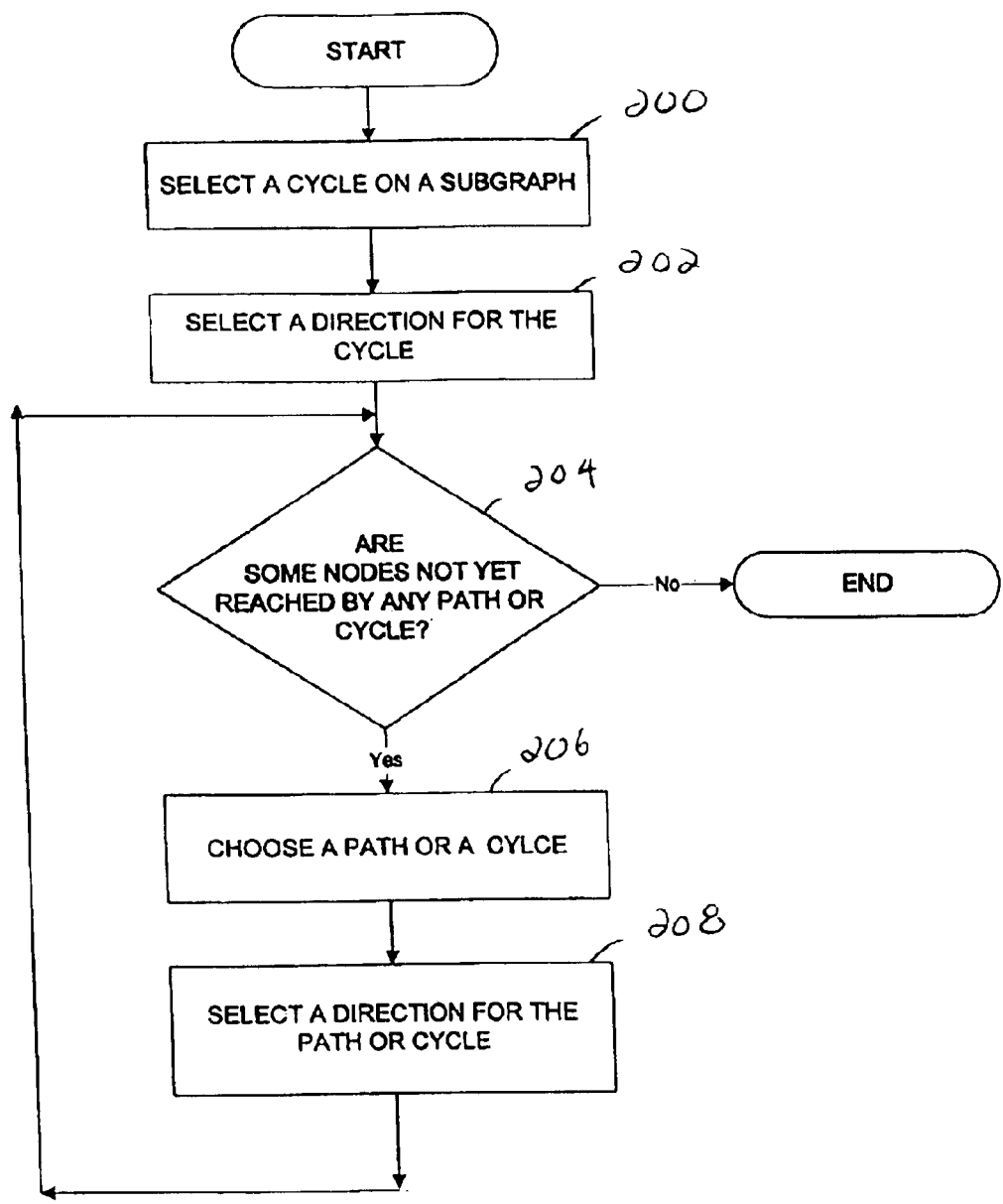
FIG. 9 is a flow diagram illustrating the steps to generate a subgraph in an edge redundant network.
Figure 10:
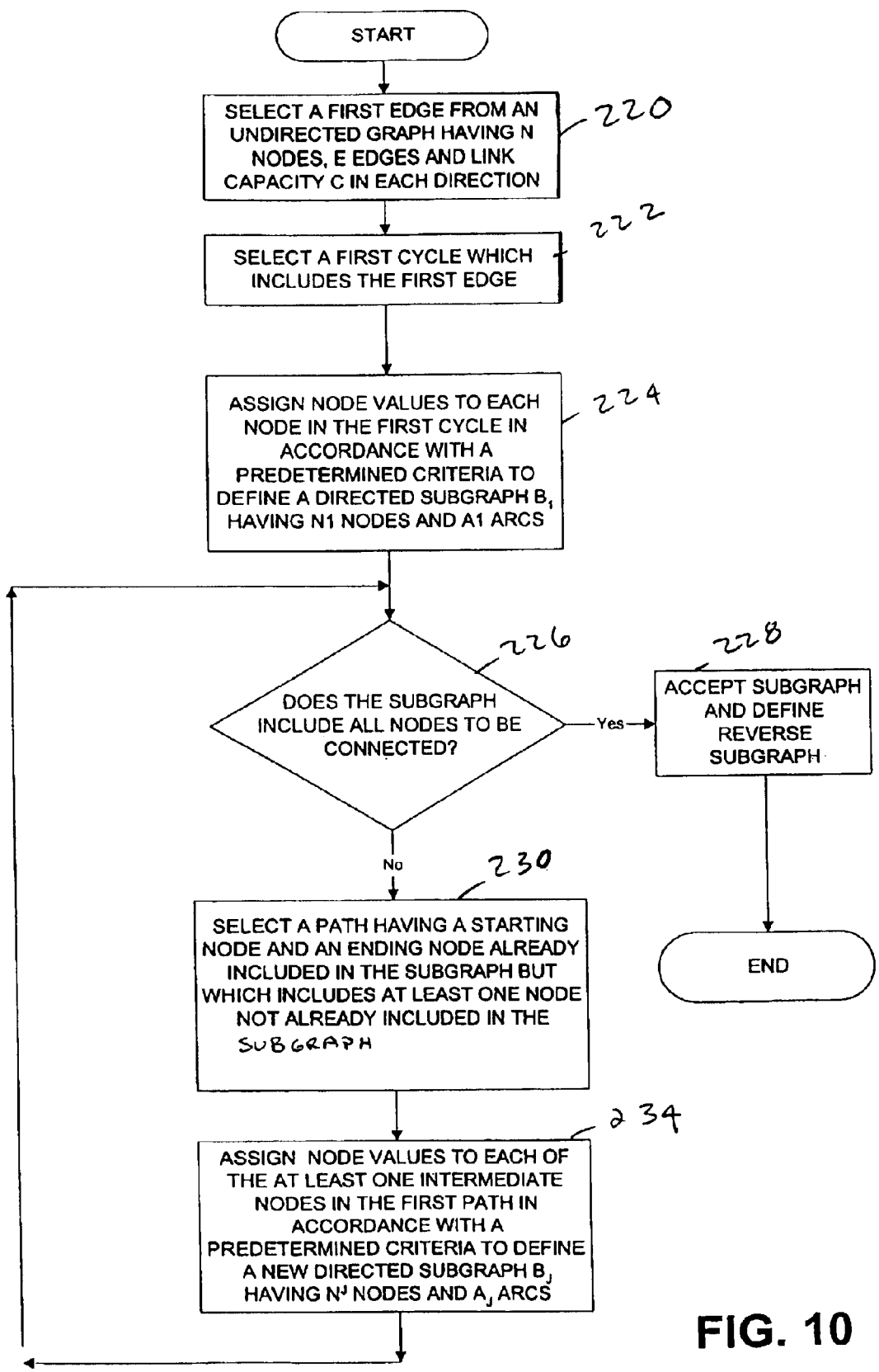
FIG. 10 is a flow diagram illustrating the steps to generate a subgraph in a node redundant network.

FIGS. 8–10 are a series of flow diagrams illustrating the processing to be performed to provide loopback protection on edge or node redundant networks having an arbitrary network topology. An edge redundant network refers to a network in which failure of a single edge will not disconnect the network. Similarly, a node redundant network refers to a network in which failure of a single node will not disconnect the network. An edge or node redundant network G may be expressed mathematically as:

$$G=(N, E)$$

in which:

N is a set of N nodes which may also be expressed as: $\{n_i \text{ with } i=1 \ldots N\}$; and E is a set of E edges between nodes which may also be expressed as: $\{e_i \text{ with } i=1 \ldots E\}$.

An "undirected edge" or a "link", or more simply an "edge", between nodes x and y is denoted as [x,y] and describes a pair of nodes between which information flows or can be transmitted in either direction between the nodes. The terms link and edge are used interchangeably herein.

A directed edge or arc from node x to node y is denoted as (x,y) and describes nodes between which information flows or can be transmitted in only one direction between the nodes. For example, arc (x,y) describes a path along which information flows only from node x to node y. Thus, arcs (x,y) and (y,x) correspond to edge [x,y] and if an edge [x,y] fails, then arcs (x,y) and (y,x) also fail.

In the description provided hereinbelow, full-duplex links are considered. Link capacity is denoted C. Thus the capacity C of the $j^{th}$ link $e_j$ is denoted as $C_j$, which means that link $e_j$ can support $C_j$ communication circuits in each direction.

A directed graph P describes a set of nodes denoted N and a set of directed arcs denoted A. This may be expressed as:

$$P=(N,A).$$

A set of arcs directed in a direction opposite to the set of arcs A (i.e. the reversal of A) may be denoted as Â and expressed in equation form as:

$$\hat{A}=\{(i,j)|(j,i) \in A\}.$$

Similarly, given a directed graph P=(N,A), the reverse graph P̂ may be expressed as:

$$\hat{P}=(N,\hat{A}).$$

Considering a node or edge redundant graph G (i.e. a graph in which removal of a node or an edge, respectively, leaves the graph connected) the method of the invention to be described hereinbelow is based on the construction of a pair of directed spanning subgraphs, B=(N,A) and the reversal of B denoted as R=B̂=(N,Â). Each of the two directed spanning subgraphs B, R can be used for primary connections between any pair of nodes in the graph. In the event of a failure, effected connections on subgraph B are looped back around the failure using appropriately selected ones of the nodes and arcs in the subgraph R. Similarly, effected connections on subgraph R are looped back around the failure using appropriately selected ones of the nodes and arcs in the subgraph B. For instance, if graph G were provided having a ring topology, then subgraphs B and R would be the clockwise and counter-clockwise cycles around the ring.

Considering a general mesh network and the case where an edge [x,y] fails, loopback is performed in the following manner. Assume an arc (x,y) belongs to the set of arcs A of subgraph B, and that arc (y,x) belongs to the set of arcs Â of subgraph R.

Further assume that arc (x,y) is not an arc of both subgraph R and subgraph B.

A first looping arc $Bloop_{x,y}$ is generated by attaching the head of arc (x,y) which is a member of the set of arcs A to the tail of arc (y,x) which is a member of the set of arcs Â so that signals which arrive for transmission on arc (x,y) in subgraph B are consequently looped back to node x in subgraph R. Similarly, a second looping arc $Rloop_{y,x}$ is generated by attaching the head of arc (y,x) in the subgraph R to the tail of arc (x,y) in the subgraph B so that any signal which arrives for transmission on arc (y,x) in subgraph R is looped back to node y in subgraph B. Now, edge [x,y] can be successfully bypassed as long as there exists a working path with sufficient capacity from node x to node y in subgraph R and a working path with sufficient capacity from node y to node x in subgraph B.

Next, considering a general mesh network and the case where a node n fails, loopback operates in a manner similar that described above for the edge case except that many links may be affected. Assume that node n fails. Then all nodes which are adjacent to node n perform loopback as above. In particular, if: (1) arc (x,n) is an arc of subgraph B, and arc (n,x) is an arc of subgraph R, a first looping arc $Bloop_{x,n}$ connecting the head of the arc (x,n) (i.e. the arc on subgraph B originating at node x) to the tail of the arc (n,x) (i.e. the arc on subgraph R terminating at node x) can be generated; and (2) if arc (y,n) is an arc of subgraph R, and arc (n,y) is an arc of subgraph B, a looping arc $Rloop_{y,n}$ connecting the head of arc (y,n) (i.e. the arc on subgraph R originating at node y) to the tail of the arc (n,y) (i.e. the arc on subgraph R terminating at node y) can be generated.

Now, node n can be successfully bypassed as long as their exists a working path with sufficient capacity from node x to node y in subgraph R and a working path with sufficient capacity from node y to node x in subgraph B for all nodes x,y such that arcs (x,n), (n,y) belong to the set of arcs A.

For example, selecting two distinct nodes w and z, a path p, can be defined as a path in subgraph B from node w to node z. Node n corresponds to a node other than node w or node z traversed by path $p_1$. Assume the nodes x and y are such that arc (x,n) and arc (n,y) are traversed in that order in path $p_1$. Further assume that path $p_2$ is a path in subgraph R from node x to node y. Loopback may be performed from node w to node z on paths $p_1$, $p_2$ at node n by traversing the following directed circuit: (1) from node w to node x, use path $p_1$; (2) at node x, use path $Bloop_{x,n}$; (3) from node x to node y, use path $p_2$; (4) at node y, use path $Rloop_{y,n}$; and (5) from node y to node z, use path $p_1$.

This technique for providing loopback restoration is more general than the type of loopback used in a network having a ring topology since the loopback technique of the present invention is not restricted to using a backhaul route which traverses successively nodes w, x, w, z, y, z. Therefore, in order to guarantee loopback, subgraphs B and R must be chosen so that in the event of any node or edge failure which affects one of subgraphs B or R, there exists a working path around the failure on the other one of subgraphs B, R. Furthermore, sufficient back-up capacity on subgraphs B and R to support the loopback signals in addition to the unaffected connections on B and R must be insured.

The rules to insure sufficient capacity are simple. In the case of protecting against a link failure, sufficient capacity exists for loopback provided that sum of the maximum arc loads in the B and R graphs, respectively is less than or equal to the capacity of a link in each direction. This may be expressed as:

$$L_{arc,B}+L_{arc,R}\leq C$$

where:

C is the capacity of a link in each direction;

$L_{arc,B}$ is the maximum arc load in the directed subgraph B; and $L_{arc,R}$ is the maximum arc load in the directed subgraph R.

The sufficiency of the rule with respect to insuring capacity with $L_{arc,B}$ and $L_{arc,R}$ representing the maximum arc loads in the B and R subgraphs, respectively, may be illustrated with an example. Consider first protecting against a link failure. The worst case in terms of link capacity occurs when a link fails which is carrying a maximum arc load (i.e. an arc load corresponding to one of $L_{arc,B}$ and $L_{arc,R}$ in subgraphs B and R, respectively) and the loopback paths for this link pass through links carrying arc loads $L_{arc,R}$ and $L_{arc,B}$ on the subgraphs R and B, respectively. Thus, sufficient capacity exists for loopback provided that sum of the maximum arc load in the B and R graphs $L_{arc,B}$, $L_{arc,R}$, respectively is less than or equal to the capacity C of a link in each direction (i.e. $L_{arc,B}+L_{arc,R}\leq C$)

Next considering the node redundant case and representing the maximum throughput through a node in the B and R subgraphs, respectively, as $L_{node,B}$ and $L_{node,R}$, the worst case for a node failure occurs when a node with a load $L_{node,B}$ through it in subgraph B fails and all these connections are routed through an arc carrying $L_{arc,R}$ in subgraph R, or vice-versa. Therefore, for the node case, it is sufficient to have the sum of the maximum throughput through a node in the B and R subgraphs less than or equal to the capacity C. This may be expressed as:

$$L_{node,B}+L_{arc,R}\leq C; \text{ and}$$
$$L_{arc,B}+L_{node,R}\leq C.$$

where:

C corresponds to capacity;

$L_{node,B}$ corresponds to the maximum throughput through a node in the B subgraph;

$L_{arc,R}$ corresponds to the maximum arc load in the subgraph R.

$L_{node,R}$ corresponds to the maximum throughput through a node in the R subgraph;

$L_{arc,B}$ corresponds to the maximum arc load in the subgraph B.

It should be noted that the spare capacity requirements for node protection are, in general, higher than the spare capacity requirements for link protection since the traffic through a node is generally larger than that through a link.

It should also be noted that in the special case of a network having a ring topology, the required excess capacity to protect against a node failure is no more, and can be less, than the capacity required for an edge failure. The reason for this is that connections destined to or from the failed node do not need to be protected. In particular, $L_{node,B} \leq L_{arc,B}$ and $L_{node,R} \leq L_{arc,R}$. So for example, sufficient back-up capacity exists for a node or link failure as long as the maximum load on any link in any direction does not exceed C/2. This is typically how SONET BLSR systems are operated. It should further be noted, however, that other possibilities exist.

It is thus recognized that given a redundant network G there exists many possible choices for subgraph B which can be chosen to optimize certain one or more of a plurality of criteria including but not limited to, for example, bandwidth utilization, geographic restraints, cost, etc . . . .

Referring now to FIG. 8, in step 180 a network is represented as an undirected graph G having N nodes and E edges. It should be noted that all edges need not have the same capacity. The network can be of any arbitrary topology that is link and/or node redundant. Processing then flows to step 182 in which the bi-directional capacity of each edge in the network is identified. After identification of the capacity of each edge, a bi-directional subgraph is generated as shown in step 184. The number of bi-directional subgraphs which are generated may be as many as a user desires or needs. It should be noted that one bi-directional subgraph may include the entire network or may include only a portion of the entire network.

Processing then flows to step 186 in which two directed graphs are generated for each undirected subgraph. The two directed graphs together provide loopback recovery for each of the nodes in the subgraph. The particular manner in which the directed graphs are generated will be described below in conjunction with FIGS. 9 or 10 depending upon whether the network is edge redundant (FIG. 9) or node redundant (FIG. 10).

Processing then flows to step 188 where the capacity on each edge used in the directed graphs is reduced.

In decision block 192 a determination is made as to whether network requirements have been satisfied. The network requirements may, for example, be that all nodes in the network are or can be connected. If the requirements are satisfied, processing proceeds to decision block 194 where a determination is made as to whether more subgraphs should be generated.

If a decision is made to generate more subgraphs, then processing flows to decision block 196 where determination is made as to whether the remaining network has redundant portions. If the remaining network does not have redundant portions, then it is not possible to generate more subgraphs and processing ends. If, on the other hand, the remaining network has redundant portions, then processing flows to step 198 where a next subgraph is generated from the remaining network portions and processing flows to step 186. In determining whether to generate more subgraphs, a variety of factors may be considered including but not limited to whether the traffic and capacity requirements on that network are satisfied. Other requirements may also play a role in determining whether to generate more subgraphs.

FIG. 9, shows the processing to provide loopback restoration for link failure in a network which may be represented as an edge redundant undirected graph. Before proceeding with a detailed description of the flow diagram of FIG. 9, however, a general overview of the process is provided. Starting with an edge redundant undirected graph G=(N,E) in which each link has a capacity of C in each direction, to provide loopback restoration for link failure in a network represented by the undirected graph G, it is necessary to find a directed spanning subgraph B=(N,A) of the graph G and its associated reversal subgraph $R=\hat{B}=(N,\hat{A})$, such that the following conditions are satisfied: (1) subgraph B is connected (i.e. there is a directed path in subgraph B from any node to any other node); (2) arc (i,j) belongs to the set of arcs A and arc (j,i) does not belong to the set of arcs A.

Since the subgraph R is connected if and only if subgraph B is connected, condition (1) above insures that any connection can be routed on subgraph B or on subgraph R. Condition (1) also insures that loopback can be performed.

For example, suppose the edge [x, y] fails and that arc (x,y) is an arc of the subgraph B. In order to provide a loopback connection, it is required that there exist a path from the node x to the node y in the subgraph R\(y,x) and a path from the node y to the node x in the subgraph B\(x,y). Such paths are guaranteed to exist because the subgraphs B and R are connected and such paths do not require the arcs (x,y) or (y,x). Hence, connectivity is sufficient to guarantee loopback connectivity in the event of an edge failure.

Since condition (2) implies that the arc (i,j) cannot be an arc of both subgraphs B and R, condition (2) insures that loopback connections on subgraph R do not travel over the same arc as primary connections on subgraph B, and vice-versa. This insures that sufficient redundant capacity exists as long as the sum of the maximum arc loads in the B and R graphs denoted as $L_{arc,B}$ and $L_{arc,R}$ respectively, is less than or equal to the capacity C of a link in each direction (i.e. $L_{arc,B} + L_{arc,R} \leq C$). Therefore, any technique which can be used to generate a subgraph B which satisfies conditions (1) and (2) above will provide a resultant subgraph which guarantees loopback restoration for link failure.

Turning now to FIG. 9, the processing performed in step 186 of FIG. 8 to generate two directed graphs which provide loopback recovery for nodes in the subgraph in the case where the network is edge redundant is shown. The processing begins in step 200 where an arbitrary cycle ($c_1, \ldots, c_k, c_1$) of the undirected graph G is selected. In this example, the graph G is provided having N nodes. The selected cycle must have at least three nodes. Such a cycle is guaranteed to exist if the undirected graph G is edge redundant and the selected cycle may be expressed as:

$$(c_1, \ldots, c_k, c_1) \text{ with } k \geq 3.$$

where:

$c_1$ represents a first or starting node in the cycle;

$c_k$ represents a $k^{th}$ node in the cycle; and k is an integer which corresponds to a node index value.

Processing then flows to step 202 in which a direction for the cycle is selected. After selecting a direction for the cycle, a first directed subgraph $B_1$ may be defined as follows:

$$B_1 = (N_1, A_1)$$

where:

$N_1$ corresponds to the set of nodes $\{c_1, \ldots, c_k\}$ in the subgraph $B_1$; and $A_1$ corresponds to the set of arcs $\{(c_1, c_2), \ldots, (c_{k-1}, c_k), (c_k, c_1)\}$ in the subgraph $B_1$.

Processing then flows to decision block 204 where a determination is made as to whether there exists any nodes not yet reached by any existing path or existing cycle. If no such nodes exist, then the subgraphs B and R are defined with the directions selected as above and processing ends. This may be expressed as:

If $N_j=N$, then set $B=B_j$, $R=\hat{B}$ and terminate.

where:

$N_j$ corresponds to the nodes included on each successive cycle or path (e.g. the first cycle includes $N_1$ nodes);

N corresponds to all of the nodes which should be included in a cycle or path;

$B_j$ corresponds to an intermediate directed subgraph;

B corresponds to the final primary directed subgraph; and $R=\hat{B}$ which corresponds to the final secondary directed subgraph.

If, on the other hand, in decision block 204, decision is made that there exist some nodes not yet reached by any path or cycle (i.e. the cycle selected in step 200 does not include all required nodes in the undirected graph G), then processing flows to processing block 206 where a new directed path or cycle that starts and ends on the cycle and passes through at least one node not on the cycle is selected.

Processing then flows to step 208 where a direction for the path or cycle selected in step 206 is selected. This may be expressed as follows:

(1) increment the index j and choose a path or cycle $pc_j=(x_{j,0}, x_{j,1}, \ldots, x_{j,L1})$ such that:

$x_{j,0}, x_{j,L1} \in N_{j-1}$; and other nodes, $x_{j,i}$, $1 \leq i < L_j$ are chosen outside of $N_{j-1}$.

For a path, it is required that the total number of nodes is greater than two (i.e. $L_j \geq 2$) and that the starting node $x_{j,0}$ is not the same as the ending node $x_{j,Lj}$ (i.e. $x_{j,0} \neq x_{j,Lj}$). For a cycle, it is require that the total number of nodes is greater than three (i.e. $L_j \geq 3$) and that the starting node $x_{j,0}$ is the same as the ending node $x_{j,Lj}$ (i.e. $x_{j,0}=x_{j,Lj}$)

The subgraph $B_j$ is then set to a particular direction as defined by the set of nodes $N_j$ and the set of arcs $A_j$ which may be expressed as:

$B_j=(N_j, A_j)$ where:

$N_j=N_{j-1} \cup \{x_{j,1}, \ldots, x_{j,Lj-1}\}$; and $A_j=A_{j-1} \cup \{x_{j,0}, x_{j,1}), (x_{j,1}, x_{j,2}), \ldots, (x_{j,Lj-1}, x_{j,Lj})\}$.

Processing then returns to decision block 204 where decision is again made as to whether there exists any nodes not yet reached by any path or cycle. If the new graph does not include all nodes of the graph which are intended to be included, another directed path or cycle is constructed, starting on some node already included, passing through one or more nodes not included, and then ending on another already included node. This loop is repeated until all nodes are reached by a path or cycle at which point processing ends. Once processing ends the two directed subgraphs B, R are defined for all nodes to be included in the network.

FIG. 10, shows the processing to provide loopback restoration for node failure in a network which may be represented as a node redundant undirected graph G. Before proceeding with a detailed description of the flow diagram of FIG. 10, however, a general overview of the process is provided.

In general overview, the processing to provide loopback recovery for node failure in a node redundant undirected graph may be explained by considering a node redundant undirected graph G=(N,E) with link capacity C in each direction. To provide loopback recovery for node failure in the node redundant undirected graph G, a directed subgraph B=(N,A) of undirected graph G, and its associated reversal $R=\hat{B}=(N,\hat{A})$ must be found and the following properties must be satisfied: (1) subgraph B is connected (i.e. there is a directed path in subgraph B from any node to any other node); (2) the arc (i,j) belongs to the set of arcs A and the arc (i,j) does not belong to the set of arcs A; (3) for all nodes x, n, y which belong to the set of nodes N such that arcs (x, n) (n,y) are arcs of subgraph B, there exists a directed path from node x to node y in subgraph R which does not pass through node n.

As in the edge redundant case discussed above in conjunction with FIG. 9, condition 1 insures that any connection can be routed on subgraph B or R. It should be noted, however, that unlike the edge redundant case, connectivity is insufficient to guarantee loopback connectivity after failure.

Also as in the edge redundant case, condition 2 insures that loopback connections on subgraph R do not travel over the same arc as primary connections on subgraph B, and vice-versa. This insures that sufficient redundant capacity exists as long as the conditions $L_{arc,B}+L_{arc,R} \leq C$ and $L_{arc,B}+L_{node,R} \leq C$ are satisfied.

Condition (3) insures that loopback can be successfully performed and is equivalent to the statement that three adjacent nodes x, n, y in subgraph B, are contained in a cycle of subgraph B.

Any subgraph which satisfies conditions (1)–(3) above is sufficient to perform loopback as described above. The steps illustrated in the flow diagram of FIG. 10 guarantees these conditions by appropriately amending the steps utilized in the edge redundant case.

It should be noted that the edge-redundant technique described above in conjunction with FIG. 9 above fails to insure condition (3) for two reasons: first, cycles are allowed (e.g. step 208 allows the path $pc_j=(x_{j,0}, x_{j,1}, \ldots, x_{j,0})$ as a possibility in iteration j, and hence failure of node $x_{j,0}$ would leave both subgraphs B and R disconnected); and second and more fundamental perhaps, the ordering of the nodes on the added paths in steps 206, 208 was arbitrary. It is quite easy to construct examples for which a similar technique which adds paths in an arbitrary order would fail to satisfy condition three above. For space considerations we do not present such an example but note that these examples require a graph where step 234 in FIG. 10 is executed at least twice. Therefore, if the final directed subgraph consists of a cycle with a single appended path, the directions on the cycle and path may be selected arbitrarily.

Generally processing begins by selecting a directed cycle of at least three (3) nodes containing some arbitrary edge e=[t,s]. If this cycle does not include all nodes in the graph, a path that starts on some node in the cycle, passes through some set of nodes not on the cycle, and ends on another node on the cycle is then selected. If the cycle and path above do not include all nodes of the graph, another path is constructed, starting on some node already included, passing through one or more nodes not included, and then ending on another already included node. The method continues to add new nodes in this manner until all nodes are included.

In a node redundant graph, a cycle with three nodes must exist containing any edge e and for any such cycle, a path can be added as above and subsequent such paths can be added, in arbitrary ways, until all nodes are included. It is less simple to choose the direction of the added paths and hence the direction of the subgraphs B and R.

Assigning directions can be thought of in terms of an analogy with voltage sources. In this analogy, a voltage source is placed on edge e so that the voltage of node s is V>0 and the voltage of node t is 0. Next resistors having a positive resistance values are placed on each edge of the cycle and added paths (removing all other edges of the original graph from consideration) being careful to insure that no two node voltages are the same. This can be insured by choosing the voltages of the nodes to be greater than a voltage $v_{max}$ where $$v_{max} = \max\ [v(y){:}v(y){<}v(x_{j,0})]y{\in}N_{j-1}$$

With this approach, the direction of current flow determines directions of the arcs.

By choosing different resistor values, different directions of current flow are possible. Any such set of directions will yield a directed subgraph B with the desired properties. The method steps described below in conjunction with FIG. 10 simply choose one of these possible sets of directions. It should be noted that the method steps discussed below incrementally build the directed subgraphs rather than adding resistors at the end as explained above in the conceptual analogy.

Turning now to FIG. 10, the processing performed in step 186 of FIG. 8 to generate two directed graphs which provide loopback recovery for nodes in the subgraph in the case of a node redundant undirected graph G is shown. Processing begins in step 220 where selection of a first edge from an undirected graph having N nodes, E edges and link capacity C in each direction is made.

This may be expressed a:

$$e=[s,t]$$

where
s=a first node on the edge e; and
t=a second node on the edge e.

The nodes are assigned values v(s)=V where V>0 and v(t)=0.

Processing then flows to step 222 where a first cycle which includes the first edge is selected. Such a cycle may be represented as:

$$(s, c_1, c_2, \ldots c_{k-1}, t, s)$$

where:
s, t are as above;
$c_k$ denotes a node k between s and t (i.e. a so-called intermediate node); and
k is an integer corresponding to an intermediate node index.

It should be noted that any cycle which includes the edge having the nodes s,t may be selected but the cycle must include at least two nodes between nodes s and t. Thus, using the above notation this condition may be expressed as: k>2.

Next as shown in processing step 224 node values are assigned to each node in the first cycle in accordance with a predetermined criteria to define a directed subgraph $B_1$ having $N_1$ nodes and $A_1$ arcs. The nodes may be ordered by assigning voltages such that $v(s)=V>v(c_1)> \ldots v(c_{k-1})>v(t)=0$.

Processing then flows to decision block 226 in which a decision is made as to whether the subgraph $B_1$ includes all nodes to be connected.

If decision is made that all nodes to be connected are included in the subgraph, then processing flows to step 228 where the subgraph B is accepted and the reverse subgraph $\hat{B}$ is defined by simply reversing directions on all arcs in the set of arcs $A_1$ included in the subgraph $B_1$. This may be expressed as:

$$B_1=(N_1, A_1)$$

where $N_1=\{s,c_1, \ldots, c_{k-1}, t\}$; and
$A_1=\{(s,c_1), (c_1, c_2), \ldots, (c_{k-1}, c_k), (c_{k-1}, t), (t,s)\}$ and
if $N_j$=N, then set B=$B_j$, R=$\hat{B}$
Processing then ends as shown.

If, on the other hand, decision is made that the subgraph does not include all nodes to be connected, then processing flows to step 230 where a next path is selected having a starting node and an ending node already included in the cycle but which includes at least one node not already included in the cycle or any path in which node values are already assigned. This may be expressed as:

$$p_j=(x_{j,0}, x_{j,1}, \ldots, x_{j,Lj}), L_j \geq 2$$

with
$x_{j,0}, x_{j,Lj} \in N_{j-1}$, with $v(x_{j,0}) > v(x_{j,Lj})$; and
nodes, $x_{j,i}$, $1 \leq I < L_j$ chosen outside of $N_{j-1}$.

where:
$p_j$ corresponds to the jth path in the graph;
$x_{j,0}$ corresponds to the starting node on the jth path in the graph;
$x_{j,Lj}$ corresponds to the ending node on the jth path in the graph;
$N_{j-1}$ corresponds to the set of nodes defined by index j−1;
$v(x_{j,0})$ corresponds to the voltage assigned to node $x_{j,0}$;
$v(x_{j,Lj})$ corresponds to the voltage assigned to node $x_{j,Lj}$; and
$L_j$ corresponds to the number of nodes minus 1 in the jth path.

Processing then flows to step 234 where node values are assigned to each of the at least one intermediate nodes in the first path in accordance with the predetermined criteria. The node values, may be assigned, for example, such that:

$$v(x_{j,0})>v(x_{j,1})> \ldots >v(x_{j,Lj-1})>v_{max}$$

where $$v_{max}=\max\ [v(y){:}v(y){<}v(x_{j,0})]y{\in}N_{j-1}$$

It should be noted that $$v_{max}>=v(x_{j,Lj}).$$

Processing then returns to decision block 226 where decision is made as to whether the subgraph includes all nodes to be connected. Steps 230, 234 and 226 are repeated until all nodes to be connected in the subgraph are connected.

When, the subgraph includes all nodes to be connected, the graph $B_j$ may be expressed as:

$$B_j=(N_j,A_j)$$

where $$N_j=N_{j-1}\cup\{x_{j,1}, \ldots, x_{j,Lj-1}\}$$

$$A_j=A_{j-1}\cup\{(x_{j,0}, x_{j,1}), (x_{j,1}, x_{j,2}), \ldots ,(x_{j,Lj-1}, x_{j,Lj})\}.$$

It should thus be noted that with this process an edge exists between nodes $x_{j,Lj-1}$ and $x_{j,Lj}$.

It should also be noted that this technique generates paths which may incur backhauling. Backhauling can be trimmed in the following manner. Assume $p_1$ is a path in a subgraph B from node y to node z and that node x is a node other than node y or node z traversed by path $p_1$. The nodes $x_1, x_2, x_3$ and $x_4$ are such that the arc $(x_1, x_2)$ and the arc $(x_3, x_4,)$ are traversed in the path $p_1$ and such that $x_1$ is traversed before x and $x_4$ is traversed after x in $p_1$. This technique can be used to eliminate backhaul on the links $[x_1, x_2]$ and $[x_3, x_4]$. Note that if $x_1$=y and $x_4$=z, we perform end-to-end path rerouting. While reducing or eliminating backhauling poses no conceptual difficulty, it requires, in the event of loopback, action by more nodes than when backhauling is not reduced.

Figure 11:
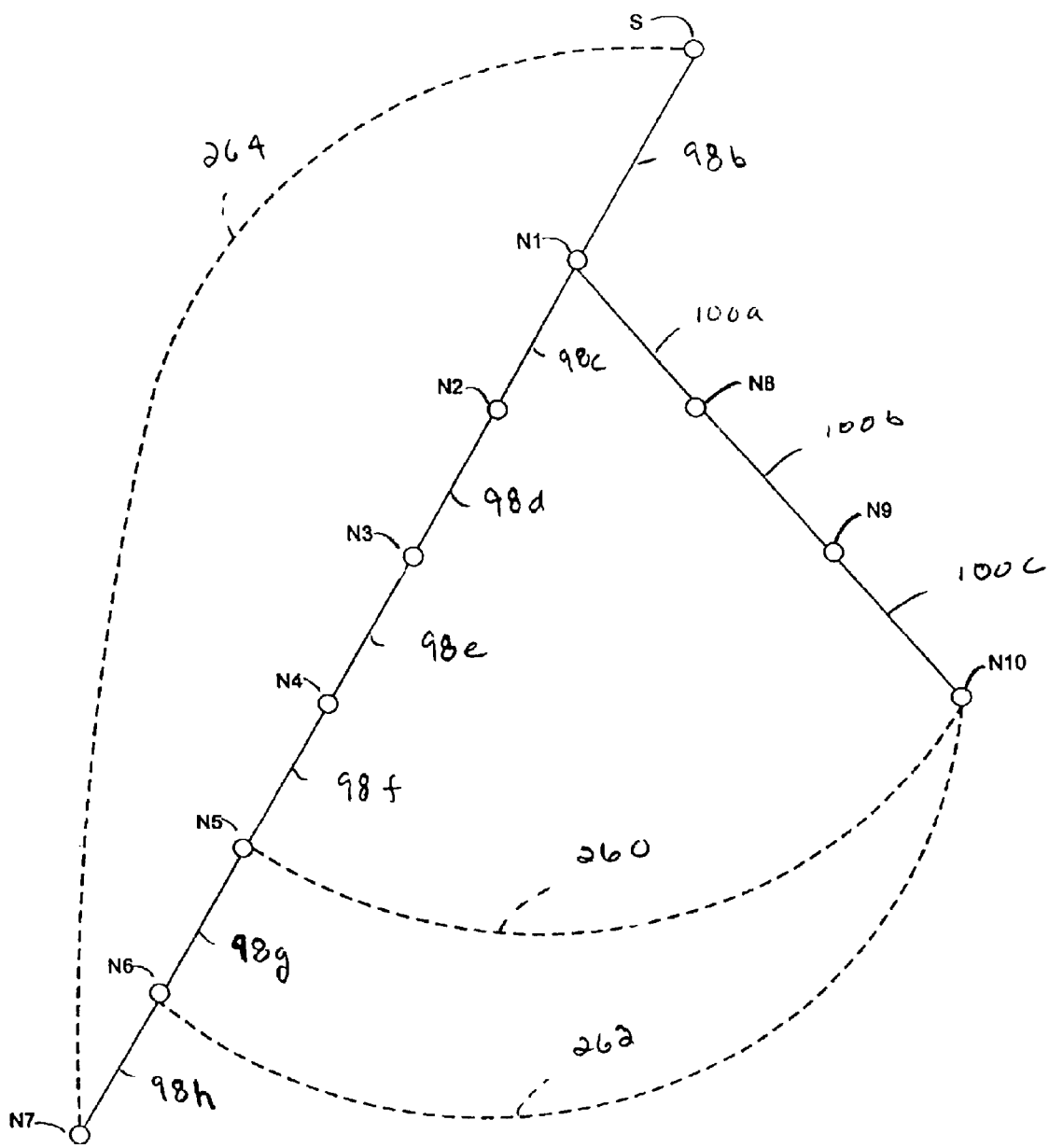
FIG. 11 is a diagrammatical view of a network having loopback capabilities.

Referring now to FIG. 11, a network provided from a first node S and nodes N1–N10 is shown to have a tree structure. Such a tree structure may be provided using the techniques described above in conjunction with FIGS. 1–7. Using the techniques described above in conjunction with FIGS. 8–10 however, one or all of loopback paths 260–264 may be added to this tree structure when necessary to thus allow loopback protection between nodes.

Figure 12:
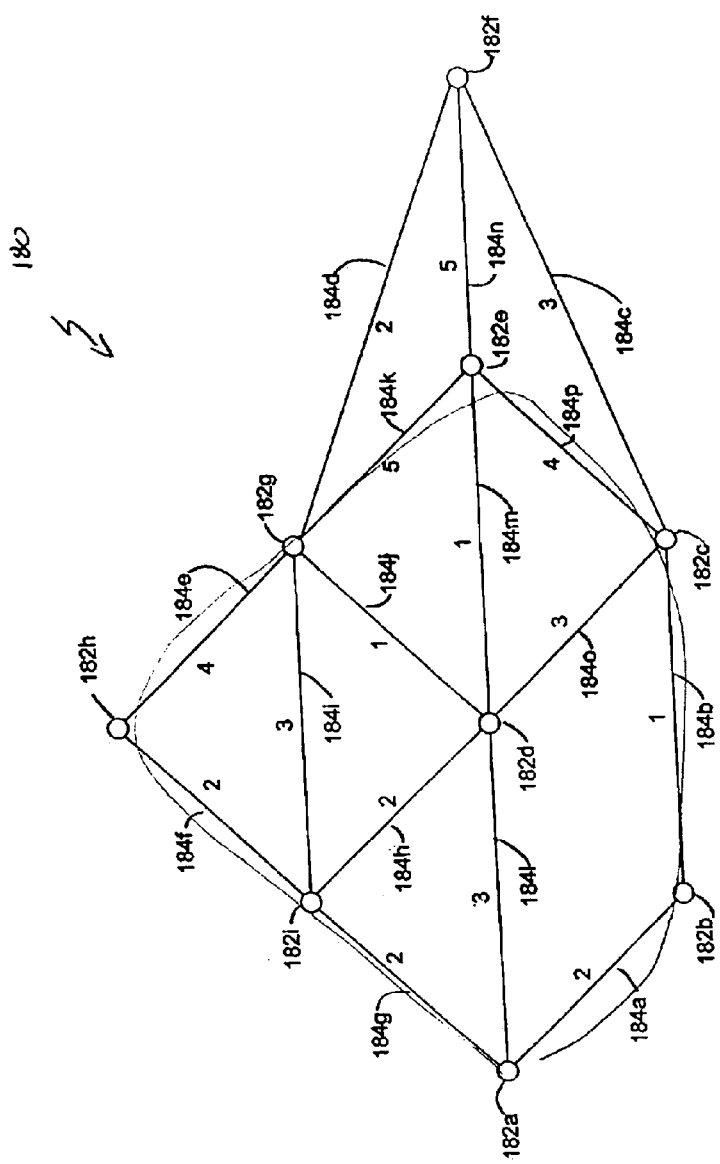
FIGS. 12–12C are a series of diagrams illustrating generation of a set of bi-directional link self-healing networks.
Figure 12A:
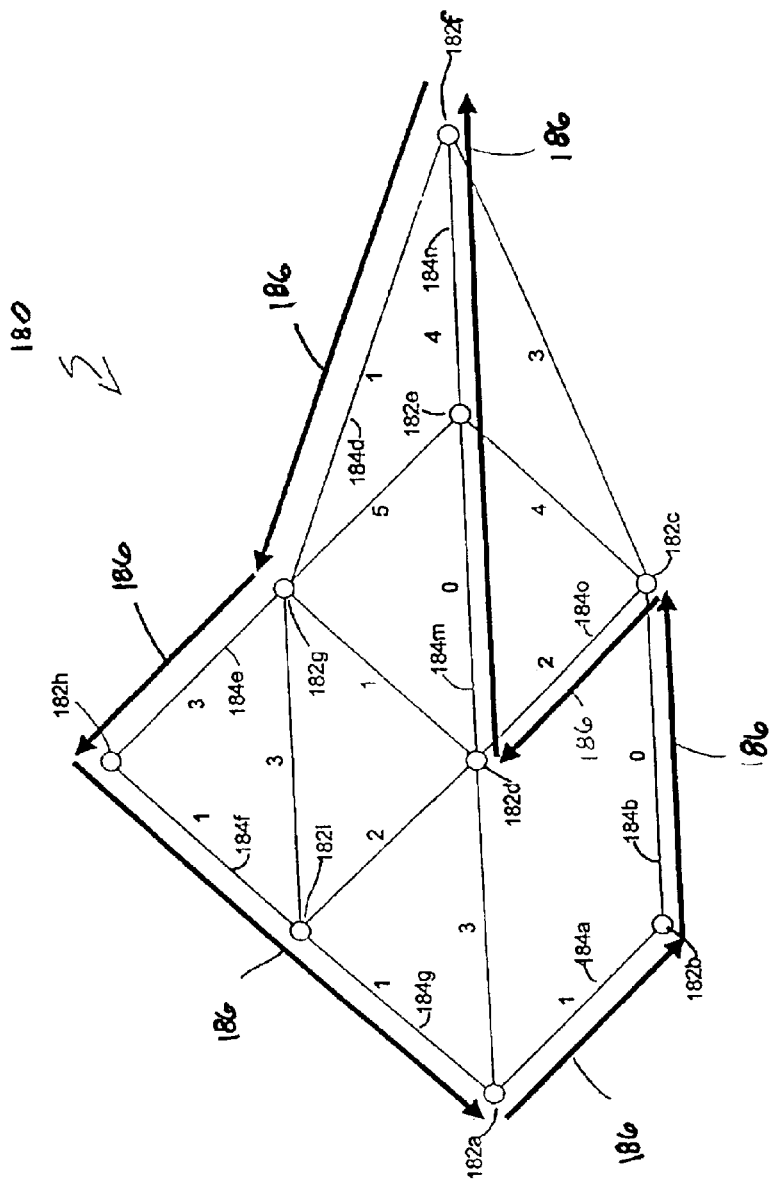
Figure 12B:
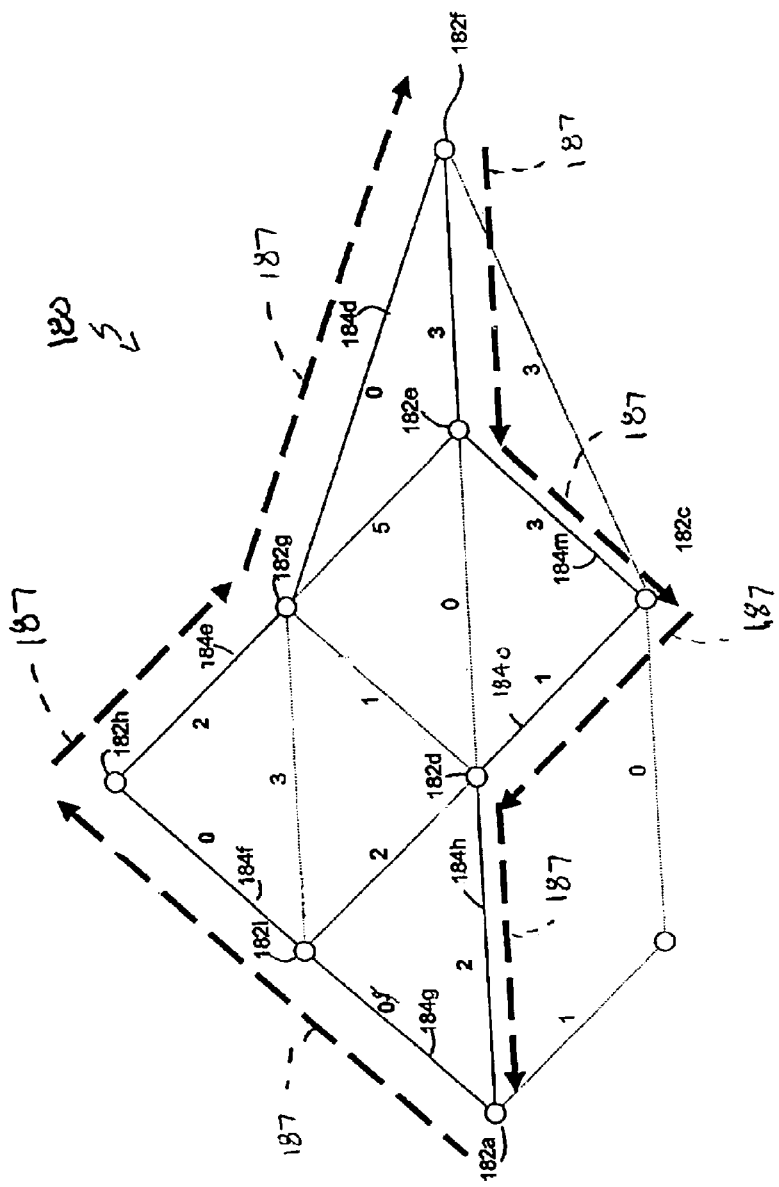
Figure 12C:
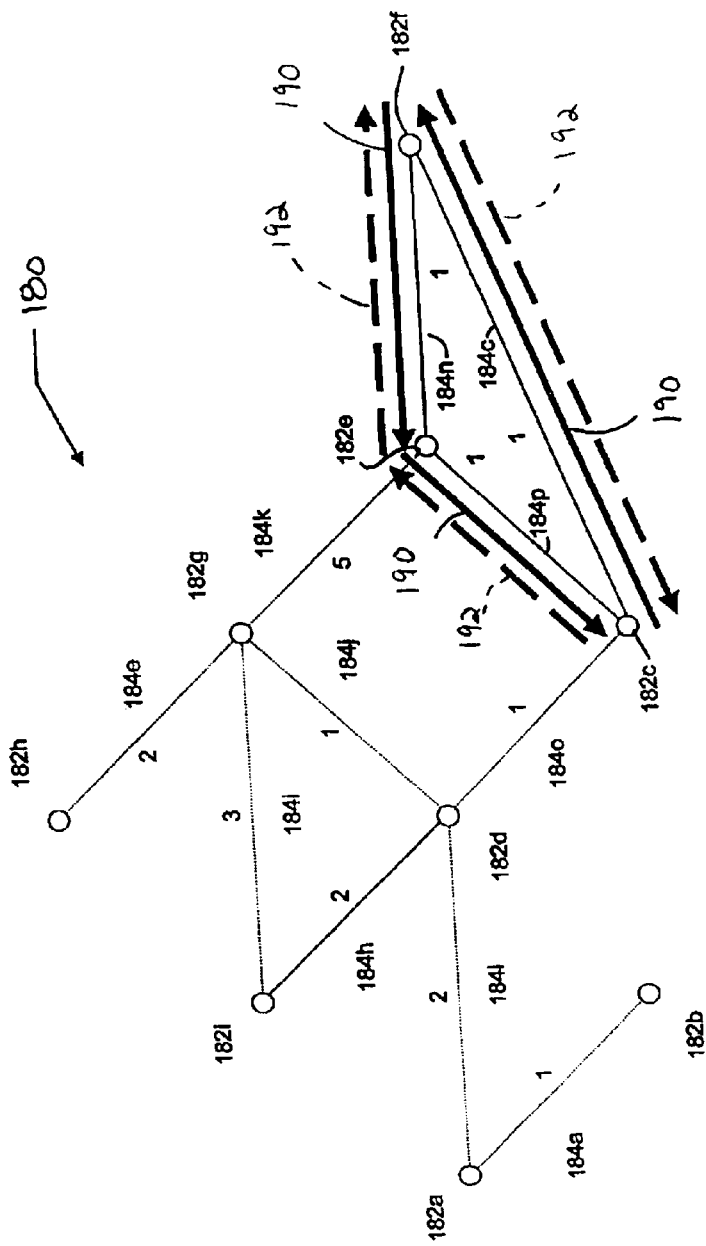

Referring now to FIGS. 12–12C in which like elements are provided having like reference designations, a network 180 includes a plurality of nodes 182A–182I and a plurality of links 184A–184P. Network 188 has an arbitrary topology.

As shown in FIG. 12A, a subgraph 186 defined by nodes 182A–182H and edges 184A, 184B, 184O, 184M, 184N, 184D, 184E, 184F and 184G is defined on the graph 180. The subgraph 186 thus exists within the graph 180. a second subgraph 187 (FIG. 12B) is defined by nodes 182A, 182I, 182H, 182G, 182F, 182E, 182C and 182D and edges 184G, 184F, 184E, 184D, 184N, 184M, 184O and 184H.

It should be noted that when subgraph 186 is defined the capacity of each link included in subgraph 186 is reduced by one. Thus, in this particular example, the capacity of link 184A is reduced from two to one, the capacity of 184B is reduced from one to zero, the capacity of 184O is reduced from three to two, etc.

When a link capacity reaches zero, that link is no longer available for use in another subgraph. Thus, as illustrated in FIG. 12B, a path from node 182C to 182A cannot include link 184B since the capacity of the link 184B, due to the use of that link on subgraph 186, is zero.

Referring now to FIG. 12C, the network 180 is thus shown having links with zero capacities removed. The remaining network is then examined per step 196 in FIG. 8 to identify redundant portions. If redundant portions are satisfied, then more subgraphs may be generated such as subgraphs 190 and 192.

Figure 13:
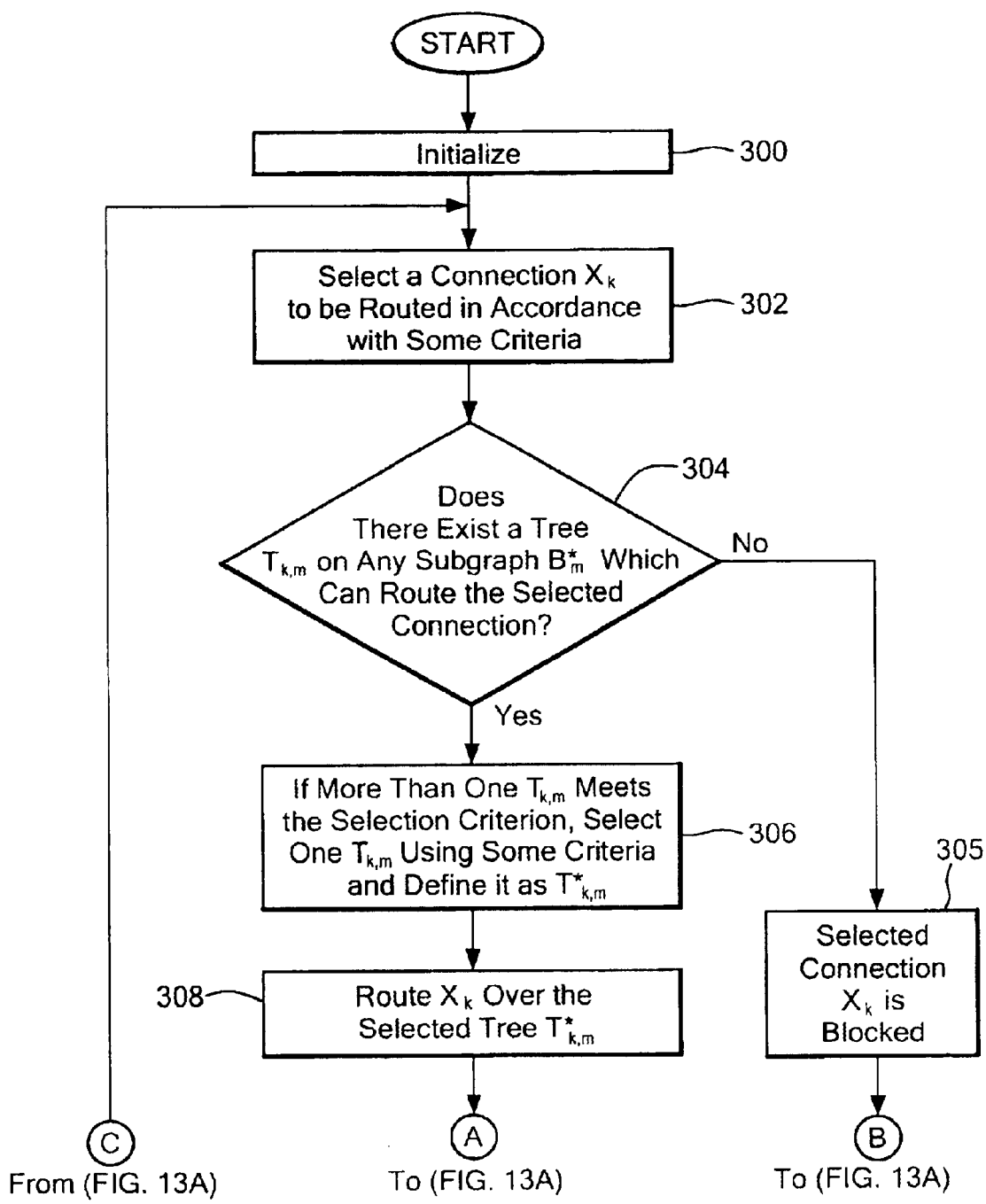
FIGS. 13–13A are a series of flow diagrams illustrating the process of routing traffic on a bidirectional link self-healing network subgraph.
Figure 13A:
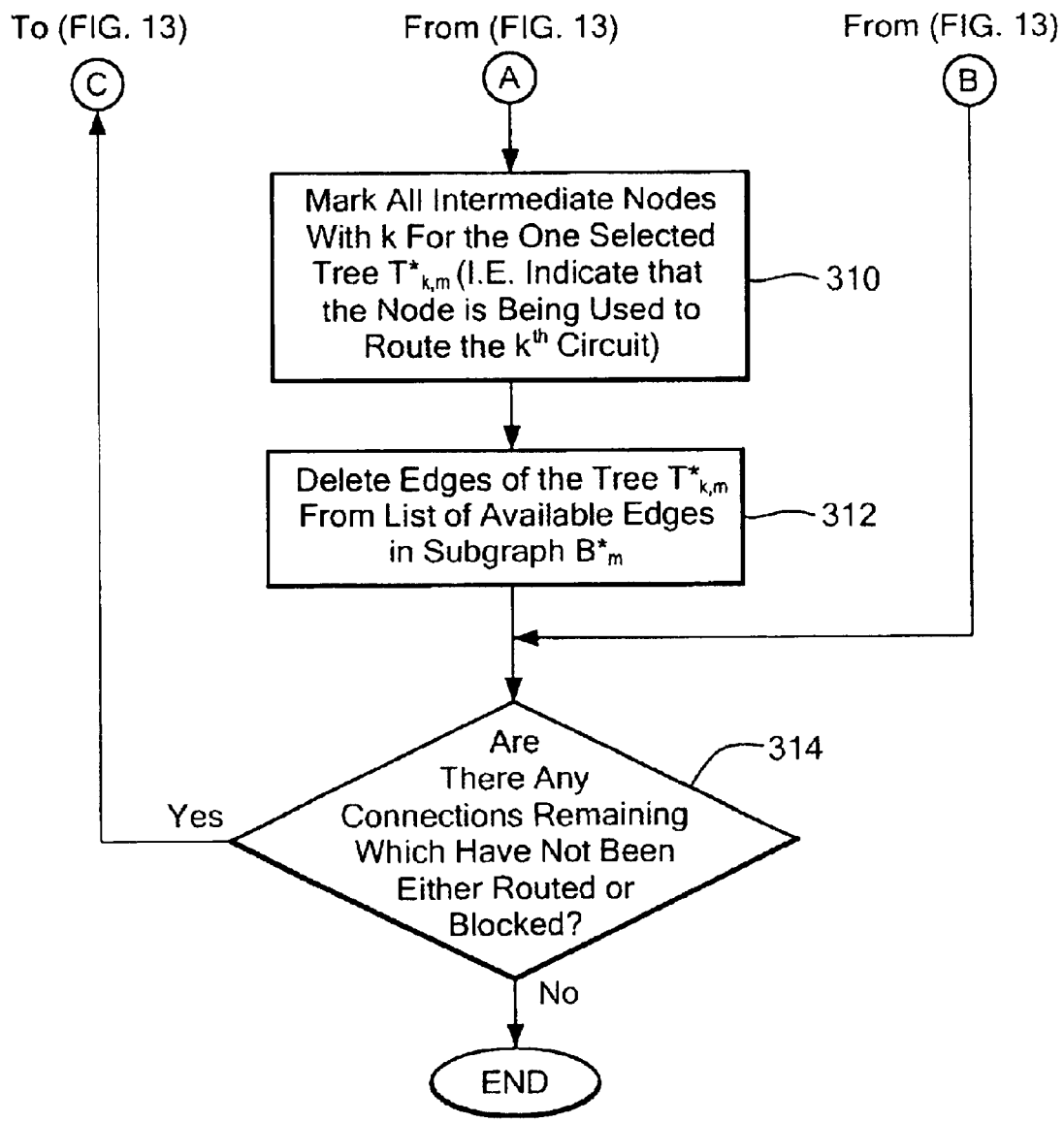

Referring now to FIG. 13, the processing to route traffic on a BLSN subgraph is shown. Processing begins with an initialization step 300 in which all inbound arcs on a secondary graph $R_m$ are disconnected and the values of an array $S_{n,m}$ are set to zero for each node and graph. The array $S_{n,m}$ holds values which indicate whether a circuit has been rerouted in a particular node. Thus, the index n takes on values from 1–N with N being the maximum number of nodes in the subgraph defined by the index m. The index m takes on values from 1–M with M corresponding to the number of subgraphs. Also, during initialization, a subgraph $B^*_m$ is created for each m and is set equal to subgraph $B_m$.

Processing next proceeds to step 302 where a connection $X_k$ to be routed in accordance with a predetermined criteria, is selected. Processing then flows to decision block 304 where decision is made as to whether there exists a tree $T_{k,m}$ on any subgraph $B^*_m$ which can route the selected connection $X_k$. If decision is made that no such tree exists which can route the selected connection, then processing flows to step 305. In processing block 305 an indication can be provided that connection $X_k$ is blocked. Flow continues to decision block 314 where a decision is made as to whether there are any connections remaining which have been neither routed nor blocked. If such connections exist, then processing flows to decision block 302. If no such connections remain, processing ends.

If, however, decision is made in decision block 304 that such a tree exists then processing flows to step 306 where the appropriate connection is selected. The criteria in determining which tree out of a plurality of possible trees is chosen may be based on a number of criteria such as least length, lowest cost, etc.

Once a tree is selected, then processing proceeds to step 308 in which the connection is routed over the selected path. Processing then flows to step 310 where all intermediate nodes are marked with the value k to identify that those nodes have been included in $k^{th}$ circuit for the one selected tree $T^*_{k,m}$. In one particular embodiment, the marking is stored in array $S_{nm}$. Those of ordinary skill in the art will appreciate, of course, that a number of other techniques for marking may also be used. For example, a list of intermediate nodes in the path indexed using the value k could be used. Thus, step 310 indicates that the node is being used to route the $k^{th}$ circuit or subgraph $B_m$.

Processing then flows to step 312 where the edges used to route the $k^{th}$ circuit are deleted from the list of available edges denoted as $B^*_m$. Processing then flows to decision block 314 which determines whether there are any connections remaining which have been neither routed nor blocked. If such connections exist, then processing flows to decision block 302 where another connection $X_k$ to be rerouted is selected. Steps 304–314 are then repeated until there are no connections to be rerouted remaining.

Figure 14:
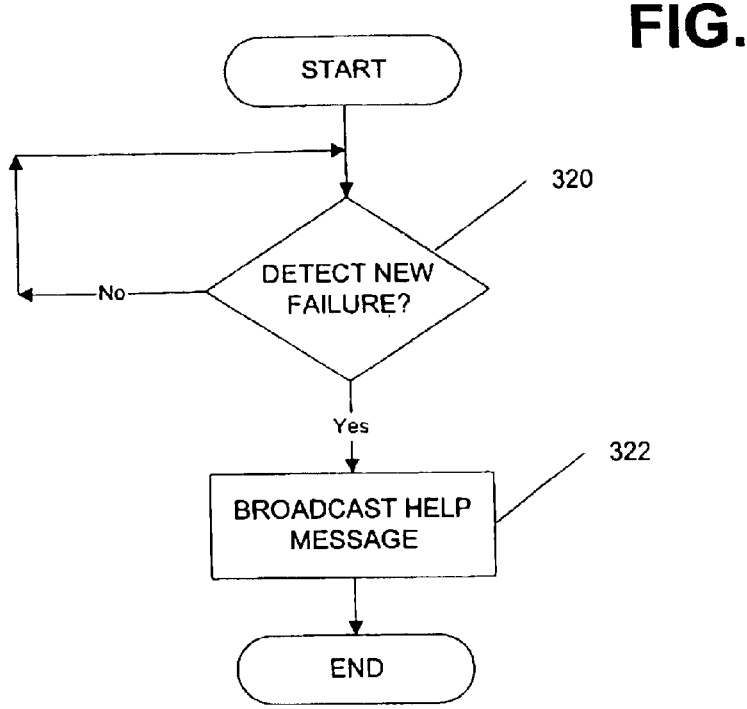
FIGS. 14–14B are a series of flow diagrams illustrating the processing to recover from a single link or node failure using help messages.
Figure 14B:
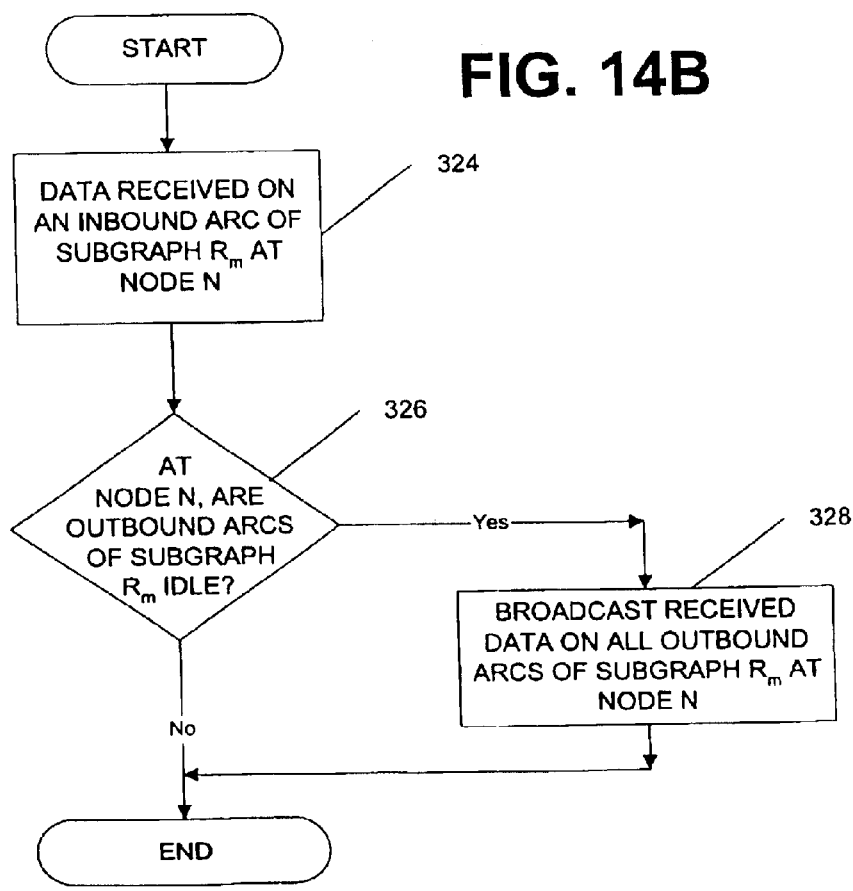

Referring now to FIGS. 14–14B, the processing steps included in recovering from a single link or node failure with help message assisted BLSN APS are shown. It should be noted that, for clarity, in some instances the description is given as though occurring at a single node. It should be appreciated, however, that in practice many or all nodes included in the network perform the described processing.

Turning now to FIG. 14, a flow diagram illustrating the node processing which takes place upon detection of a failure is shown. In practice, many or all nodes included in the network perform the processing described in conjunction with FIG. 14. Processing begins in decision block 320 where each of the nodes in the network detect new failures. The node periodically performs those steps necessary to detect failures. If a new failure is detected, then processing proceeds to processing block 322 where the nodes which detect the failure node broadcast a help message. Processing then ends.

Figure 14A:
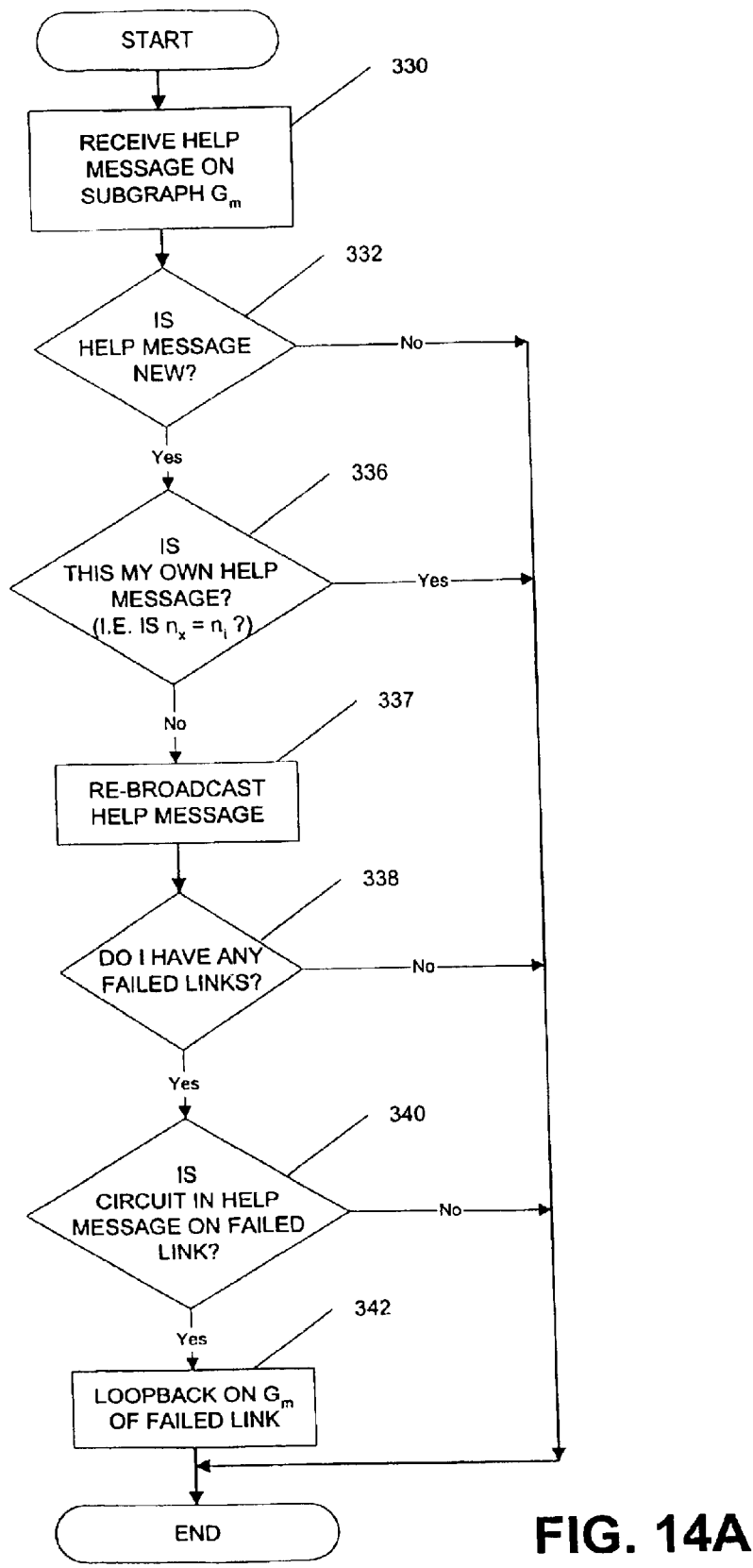

Referring now to FIG. 14A, the node processing which occurs when a node receives a help message is shown. Processing begins in step 330 where the node receives a help message on a subgraph $G_m$. Processing then proceeds to decision block 332 where the node which receives the help message determines if the help message is a new help message. If the help message is not a new help message, then processing ends as shown.

If decision is made that the message is a new help message, then processing proceeds to decision block 336 where the node determines if it has detected its own help message. If decision is made that the node is detecting its own help message, then processing ends as shown. If, on the other hand, decision is made that the node is not detecting its own help message, then processing proceeds to processing block 337 where the node re-broadcasts the help message.

Processing then continues in decision block 338 where the node determines if it has any failed links. If in decision block 338 decision is made that the node does not have any failed links, then processing ends as shown. If, on the other hand, in decision block 338 the node determines that it does have failed links, then processing flows through decision block 340 where decision is made as to whether the circuit in the help message is on the failed link. If the circuit identified in the help message is not on the failed link, then processing ends. If, on the other hand, the circuit identified in the help message is on the failed link, then processing proceeds to processing block 342 where a loopback operation on subgraph $G_m$ of the failed link is performed. Processing then ends as shown.

Processing then proceeds to Step 400 where a failure is detected at a node. It should be noted that this step is repeated at all nodes which detect a failure. It should also be noted that a node does not initially know whether a failure is due to a failure of a link or another node. The particular type of failure (i.e. a link failure or node failure) is determined by the node which detects the failure by information received from other nodes in a so-called reconciliation process. For example, in the case of a failed edge, the failure may be detected at only two nodes. In the case of failed node on the other hand, more than two nodes may detect a failure. Such information is utilized in the reconciliation process to determine whether a link or a node failed. Thus, all failures appear initially as link failures to a node in the sense that the node simply stops receiving information.

Processing then flows to Step 402 where a circuit to be checked is selected. As used herein, the term circuit refers to a logical connection between the point where a frame format for a signal is assembled (e.g. the source) and the point where the frame format for the signal is disassembled (e.g. a node).

Processing next proceeds to decision block 404 where a determination is made as to whether the selected circuit is routed over the failed link or node.

If the selected circuit is not routed over the failed link or node, then processing flows to decision block 416 where a determination is made as to whether all circuits have been checked. If all circuits have been checked then processing ends. If all of the circuits through the node under consideration are checked and no circuits are routed through the failed link or node, then this means that this node is not affected by the failure and need not re-route any signals.

If all circuits have not been checked then processing flows to Step 418 where the next circuit to be checked is selected and processing continues back to decision block 404.

If in decision block 404 a determination is made that the selected circuit is routed over the failed link or node, then processing flows to Step 408 where the subgraph $B_m$.

Referring now to FIG. 14B, the processing when data is received at a node N on an arc of a Red tree is shown. Processing begins in processing step 324, in which data flow is detected on an inbound arc of a subgraph $R_m$ at node N. Processing then proceeds to decision block 326 where decision is made as to whether the outbound arcs of node N on subgraph $R_m$ are idle. If the outbound arcs at node N on subgraph $R_m$ are not idle, then processing ends as shown. If, on the other hand, the outbound arcs of node N on subgraph $R_m$ are idle, then processing flows to processing step 328 where the received data is broadcast on all outbound arcs of subgraph $R_m$ at node N. Processing then ends as shown.

Figure 15:
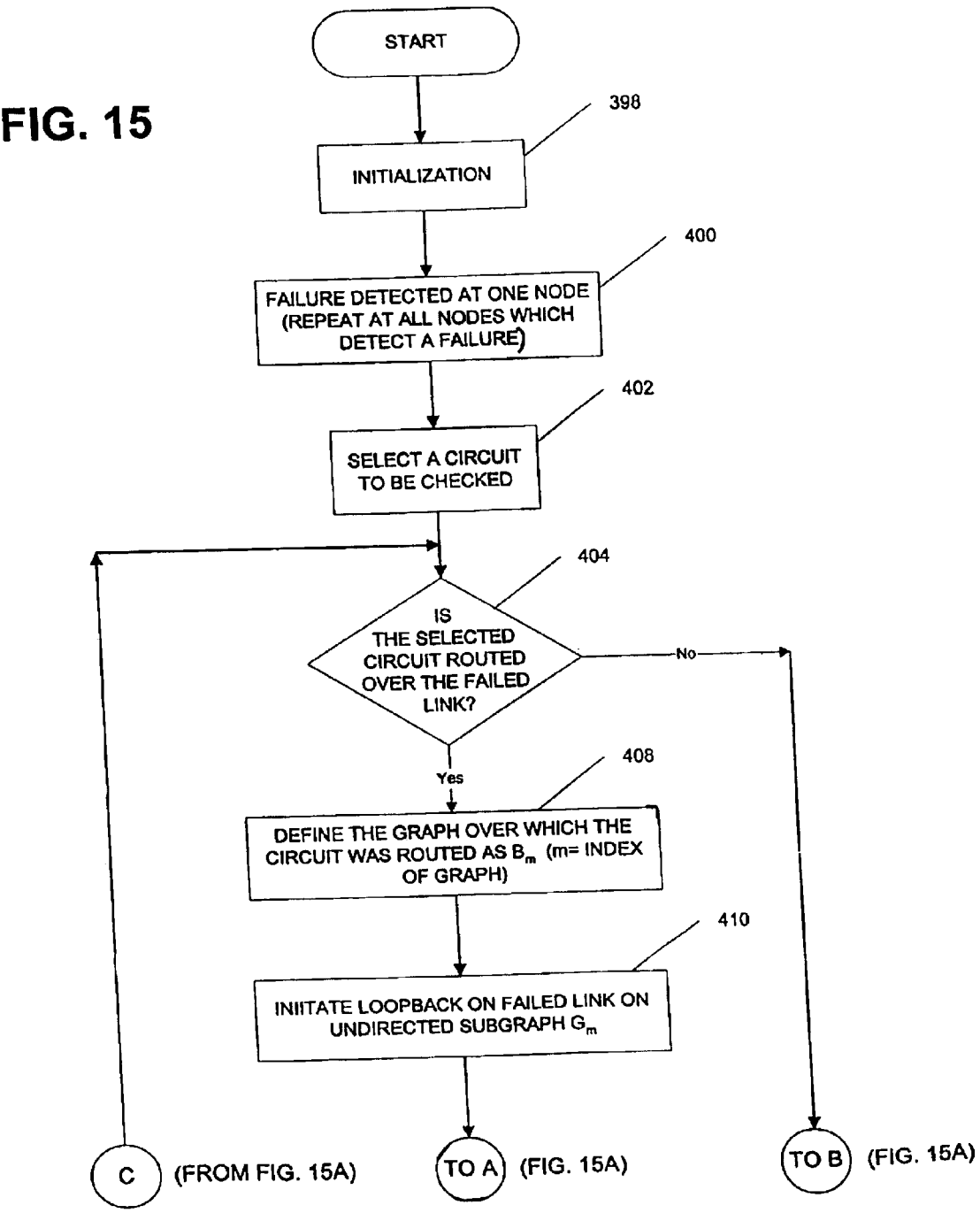
FIGS. 15 and 15A are a series of flow diagrams illustrating the steps to recover from a link or node failure without help messages.
Figure 15A:
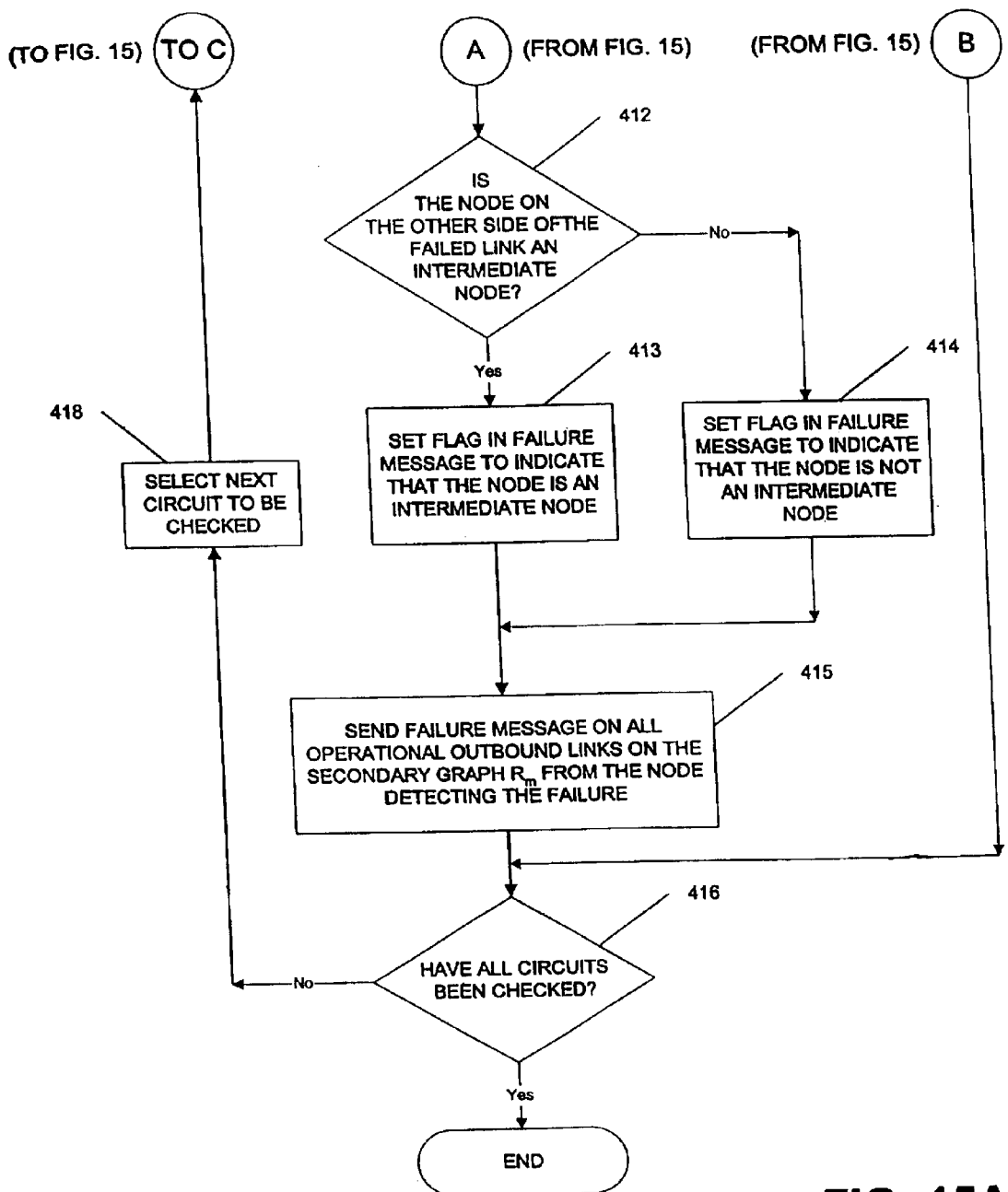

Referring now to FIGS. 15 and 15A, the steps to recover from a failure without the use of help messages is shown. It should be noted that in this restoration technique, nodes execute loopbacks on a primary graph $G_m$ for all circuits routed through a failure without waiting to receive a help message. Since the loopback process is performed immediately, the loopbacks occur more rapidly than the loopbacks which occur using the technique described above in conjunction with FIG. 14.

When a node fails, multiple loopbacks can occur with the potential to create incorrect connections. Thus, steps intended to discover and prevent such potential incorrect connections are included during the execution of this technique.

Processing begins with initialization step 398. In initialization step 398 all inbound arcs on a secondary graph $R_m$ are disconnected and an array $S_{n,m}$ in which is stored information indicative of whether the circuit under consideration has been rerouted on the node under consideration is re-set to an initial state (e.g. by setting all values in the array $S_{n,m}$ to zero). The subscript "n" represent different nodes and the subscript "m" represent different subgraphs. Thus the array name S followed by the subscripted n,m terms means the value in the array S corresponding to node "n" in subgraph "m". Thus, $S_{1,1}$ for example, refers to the status of node 1 in subgraph 1 as indicated by the value stored in the array S at array position 1,1. over which the circuit was routed is identified. In this notation "m" corresponds to the index of the subgraph over which the circuit was routed. Processing then flows to Step 410 where loopback is initiated on the failed link on the undirected subgraph $G_m$.

Processing then flows to decision block 412 where a determination is made as to whether the node on the other side of the failed link is an intermediate node. Depending upon the result of this determination, a flag "x" in a failure message transmitted by the node is set to one of a plurality of predetermined values. Thus, the flag value is included in the failure message transmitted by the node.

If it is determined that the node is an intermediate node, then as shown in step 413 the flag x is set to a first predetermined value (e.g. one) to indicate that the node is an intermediate node on circuit $x_k$. Processing then flows to Step 415 where the failure message on all operational outbound links on the secondary graph $R_m$ from the node detecting the failure is sent.

If on the other hand a determination is made that the failed link is not an intermediate node then the flag value is set to a second predetermined value (e.g. zero) n the failure message and processing again flows to Step 415.

After Step 415 processing flows to decision block 416 where a determination is made as to whether all circuits have been checked. If all circuits have been checked then processing ends. If all circuits have not yet been checked then processing flows to decision block 418 where a next circuit to be checked is selected and steps 404–416 are repeated until all circuits have been checked.

Figure 16:
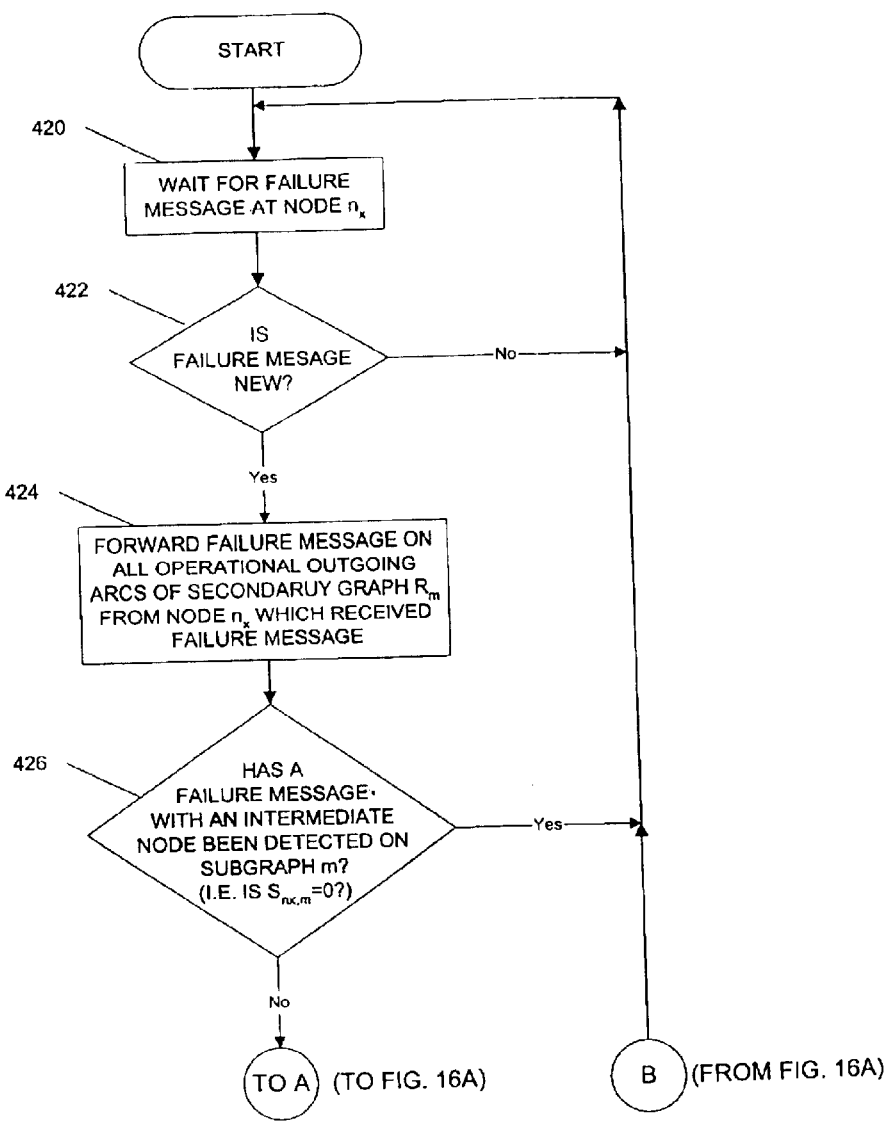
FIGS. 16 and 16A are a series of flow diagrams illustrating the steps to restore a connection between a pair of nodes.
Figure 16A:
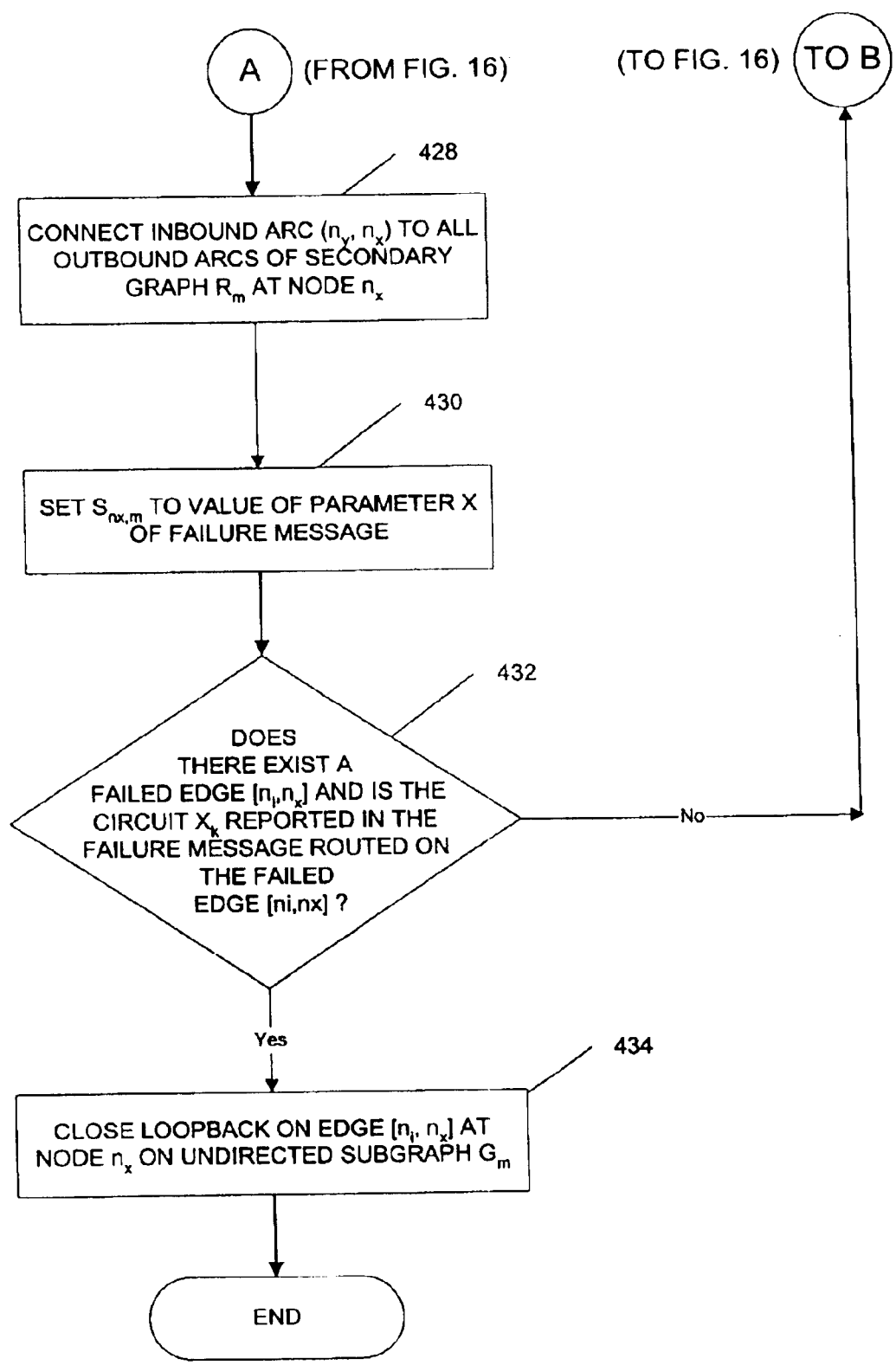

Referring now to FIGS. 16 and 16A, the processing which takes place to restore multicast and unicast circuits on an edge or node redundant network in the event of the failure of an edge or a node is shown. Processing begins in Step 420 where nodes wait for a failure message to arrive. In an effort to promote clarity, in this particular example, a node $n_x$ having an arc $(n_y, n_x)$ will be considered. Thus node $n_x$ waits for a failure message to arrive on arc $(n_y, n_x)$.

Once a failure message arrives, processing flows to decision block 422 where a determination is made as to whether the failure message is a new failure message. If the failure message is not a new failure message, then processing again flows to step 420 where node $n_x$ continues to wait for a new failure message. If, on the other hand, the failure message is a new failure message, then processing proceeds to step 424 where the failure message is forwarded on all operational outgoing arcs of a secondary graph $R_m$ from node $n_x$ which received the failure message.

Processing then flows to decision block 426 where a determination is made as to whether a failure message with an intermediate node (i.e. if x=1) has shown up on a subgraph m. If a failure message with the intermediate node flag set (i.e. parameter x=1) has already shown up on the subgraph m, then processing returns to step 420 where the wait for a new failure message begins again.

If, on the other hand, a determination is made in decision block 426, that a failure message with the intermediate node flag set has not yet shown up on the subgraph m then processing flows to step 428 where the inbound arc $(n_y, n_x)$ is connected to all outbound arcs of the secondary graph $R_m$ at node $n_x$. Processing then flows to Step 430 where a particular value $S_{nx, m}$ is set to the value of intermediate node flag of the failure message.

Processing then flows to decision block 432 where a determination is made as to whether there exists a failed edge $[n_i, n_x]$ at node $n_x$ which is used on the circuit for which the node $n_x$ received a failure message. If it is determined that this condition is not met then processing returns to step 420 where the wait for a new failure message begins.

If, on the other hand, the conditions in decision block 432 are met, then processing proceeds to step 434.where a loopback on edge $[n_i, n_x]$ at node $n_x$ on undirected subgraph $G_m$ is performed. Processing then ends as shown.

As indicated heretofore, aspects of this invention pertain to specific "methods" and "method functions" implementable on computer systems. Those of ordinary skill in the art should readily appreciate that computer code defining these functions can be delivered to a computer in many forms; including, but not limited to: (a) information permanently stored on non-writable storage media (e.g., read only memory devices within a computer or CD-ROM disks readable by a computer I/O attachment); (b) information alterably stored on writable storage media (e.g., floppy disks and hard drives); or (c) information conveyed to a computer through communication media such as telephone networks or other communication networks. It should be understood, therefore, that such media, when carrying such information, represent alternate embodiments of the present invention.

Having described preferred embodiments of the invention, it will now become apparent to one of ordinary skill in the art that other embodiments incorporating their concepts may be used. For example, one of ordinary skill in the art will appreciate that once a failure has been remedied, signal flow can then be restored through the primary paths and the secondary paths can thereafter be made available to recover from another failure which may occur in the future. Thus, back-up signal paths may be repeatedly used and again made available upon repair of failed links or nodes. It is felt therefore that such alternate embodiments should not be limited to disclosed embodiments, but rather should be limited only by the spirit and scope of the appended claims.

What is claimed is:

1. An apparatus for implementing bi-directional link automatic protection switching for an arbitrary node or edge redundant network comprising:
   a. means for representing a network as an undirected graph having a predetermined number of nodes and a predetermined number of edges;
   b. means for generating at least one bi-directional link self-healing network (BLSN) subgraph for a node redundant network;
   c. means for generating at least one BLSN subgraph for a network which can be represented as an edge redundant graph;
   d. means for routing traffic connection requests over the BLSN subgraphs to provide automatic protection switching;
   e. means for detecting a failure in the network;
   f. means, responsive to said means for detecting a failure, for implementing automatic protection switching wherein in response to detection of an edge failure by said means for detecting, said means for implementing automatic protection switching implements automatic protection switching for an edge failure and in response to detecting a node failure by said means for detecting, said means for implementing automatic protection switching implements automatic protection switching for a node failure.

2. The apparatus of claim 1 wherein said means for generating at least one BLSN subgraph for a node redundant network which can be represented as a node redundant graph comprises:
   (1) means for selecting a first edge from an undirected graph having a plurality of nodes and a plurality of edges with each of the edges having a predetermined length capacity;
   (2) means for selecting a first cycle which includes the first edge;
   (3) means for assigning node values to each node in the first cycle in accordance with a predetermined criteria to define a directed subgraph having a second plurality of nodes and a second plurality of arcs;
   (4) means for determining whether the subgraph includes all nodes to be connected;
   (5) means for selecting a path having a starting node and an ending node already included in the cycle but which includes at least one intermediate node not already included in the cycle or any path on which no values are already assigned in response to the means for determining whether the subgraph includes all nodes to be connected determines that the subgraph does not include all nodes to be connected;
   (6) means for assigning node values to each of the at least one intermediate nodes in the path selected by the means for selecting a path, wherein the node values are assigned in accordance with a predetermined criteria to define a new directed subgraph having a third plurality of nodes and a third plurality of arcs.

3. The apparatus of claim 1 wherein said means for generating at least one BLSN subgraph for an edge redundant network which can be represented as an edge redundant graph comprises:
   (1) means for selecting a cycle on a subgraph;
   (2) means for selecting a direction for the cycle;
   (3) means for determining whether some nodes are not yet reached by any path or cycle;
   (4) means for choosing a next path or a next cycle in response to some nodes not yet being reached by any path or cycle; and
   (5) means for selecting a direction for the path or cycle selected by the means for choosing a next path or a next cycle.

4. The apparatus of claim 1 wherein said means for implementing automatic protection switching comprises:
   (1) means for identifying a failed edge between a first node and second node in an edge redundant network;

(2) means for identifying a first arc between the first node and the second node, the first arc existing in a first subgraph;

(3) means for identifying a second arc between the first node and the second node, the second arc having a direction which is different than the direction of the first arc and the second arc existing in a second subgraph; and (4) means for generating a pair of looping arcs such that signals which arrive for transmission on the first arc in the first subgraph are looped back to a first one of the first and second nodes along the second arc in the second subgraph.

5. A method for generating one or more Bi-directional Link Self-healing Network subgraphs comprising the steps of:

(a) representing a network as an undirected graph having nodes andedges;

(b) identifying bi-directional capacity of each edge in the undirected graph;

(c) generating a bi-directional subgraph;

(d) generating two directed subgraphs which can provide loopback recovery for selected nodes in the undirected graph; and (e) reducing capacity on each edge used in the subgraphs by sharing capacity among multiple connections to provide a remaining network.

6. The method of claim 5 further comprising in the steps of:

(f) determining if network requirements are satisfied;

(g) in response to the network requirements not being satisfied, performing the step of determining if the remaining network has redundant portions.

7. The method of claim 6 wherein in response to the remaining network having redundant portions performing the steps of:

(h) generating a next subgraph from the remaining network; and (i) repeating steps (d)–(f) until a first one of the following conditions is met:
(1) network requirements are satisfied; and
(2) the remaining network does not have any redundant portions.

8. A method for generating a directed subgraph from a network which can be represented as an edge redundant graph comprising the steps of:

(a) selecting a cycle on a subgraph;

(b) selecting a direction for the cycle;

(c) determining whether some nodes are not yet reached by any path or cycle;

(d) in response to some nodes not yet being reached by any path or cycle choosing a next path or a next cycle; and (e) selecting a direction for the path or cycle selected in step (d).

9. The method of claim 8 further comprising the steps of repeating steps (c)–(e) until all nodes are reached by a path or cycle.

10. A method for generating a directed subgraph in a network which can be represented as node redundant graph comprising the steps of:

(a) selecting a first edge from an undirected graph having a plurality of nodes and a plurality of edges with each of the edges having a predetermined length capacity;

(b) selecting a first cycle which includes the first edge;

(c) assigning node values to each node in the first cycle in accordance with a predetermined criteria to define a directed subgraph having a second plurality of nodes and a second plurality of arcs;

(d) determining whether the directed subgraph includes all nodes to be connected; and (e) in response to the directed subgraph not including all nodes to be connected, performing the steps of:
(1) selecting a path having a starting node and an ending node already included in the directed subgraph but which includes at least one node not already included in the directed subgraph; and
(2) assigning node values to each of the at least one intermediate nodes in the path in accordance with a predetermined criteria to define a new directed subgraph having a further plurality of nodes and a further plurality of arcs.

11. The method of claim 10 wherein in response to determining that the directed subgraph includes all nodes to be connected performing the steps of:

accepting the directed subgraph and defining a reverse subgraph; and reducing the capacity of each of the edges remaining in the undirected graph.

12. The method of claim 11 further comprising the steps of repeating steps (d) and (e) until a first one of:

the directed subgraph includes all nodes to be connected; and the undirected graph does not have any redundant portions.

13. A method for routing traffic on a Bi-directional Link Self-healing Network (BLSN) subgraph comprising the steps of:

(a) selecting a connection to be routed in accordance with a predetermined criteria;

(b) determining if there exists a tree on any subgraph which can route the selected connection; and (c) in response to the existing a tree on a subgraph which can route the selected connection, performing the steps of:
(1) routing the connection over the selected tree;
(2) marking all intermediate nodes to indicate that the nodes are utilized in the selected circuit for the selected tree; and
(3) deleting edges of the tree from the list of available edges in the subgraph.

14. The method of claim 13 wherein in response to determining that there does not exist a tree on any subgraph which can route the selected connection, then performing the steps of:

(1) indicating that the selected connection is blocked; and (2) determining whether there are any connections remaining which has not been either routed or blocked.

15. The method of claim 14 wherein in response to determining that there are connections remaining which have not been either routed or blocked then performing the steps of:

selecting another connection to be routed; and repeating steps (b) and (g) until there are no connections remaining which have not been either routed or blocked.

16. A method for recovering from a single link failure or a single node failure using help messages, the method comprising the steps of:

detecting, at a node, a first one of a link failure and a node failure;

broadcasting, from the node, a help message on all outbound arcs of the node, wherein the outbound arcs include outbound arcs on a primary subgraph and a secondary subgraph:

receiving data on an inbound arc of a secondary subgraph at a node;

in response to the receiving data on an inbound arc of the secondary subgraph at the node, determining whether outbound arcs of the secondary subgraph at the node are idle; and in response to the outbound arcs of the secondary subgraph at the node being idle, broadcasting the data received on the inbound arc on all outbound arcs of the secondary subgraph at the node.

17. A method for recovering from a failure without a help message comprising the steps of:

(a) detecting a failure at a node;

(b) selecting a circuit to be checked;

(c) determining if the selected circuit is routed over the failed link; and (d) in response to the selected circuit being routed over the failed link performing the steps of:

(1) defining a graph over which the circuit was routed;

(2) initiating loopback on the failed link on an undirected subgraph;

(3) determining if the node on the other side of the failed link is an intermediate node;

(i) in response to the node on the other side of the failed link corresponding to an intermediate node performing the steps of setting a flag in a failure message to indicate whether the node is or is not an intermediate node; and (4) sending a failure message on all operational outbound links on a secondary graph from the node detecting the failure.

18. The method of claim 17 further comprising the steps of:

(e) determining if all circuits have been checked;

(f) in response to all circuits not having been checked, then performing the step of selecting the next circuit to be checked; and (g) repeating steps (c) and (d) until all circuits have been checked.

19. A method for restoring a connection between a pair of nodes comprising the steps of:

(a) receiving a help message at a node on an arc;

(b) determining if the help message is new;

(c) determining if the help message originated at the node;

(d) in response to the help message being new and not originating at the node, forwarding a help message on all operational outgoing arcs of the node;

(e) determining whether the node has any failed links;

(f) in response to the node having a failed link, determining if a circuit referred to in the help message uses the failed link; and (g) in response to the failed link under consideration being used on the circuit for which the node received the help message, performing the step of looping back on the failed link at the node to provide a signal path restoring the connection.

20. The method of claim 19 wherein the first node is a first one of a plurality of nodes and the method further comprises the steps of repeating steps (a)–(g) for each of the plurality of nodes.

21. The method of claim 20 wherein the help message includes an indicator which identifies a circuit.

22. The method of claim 21 wherein the step of looping back on the failed link at the node includes the steps of:

identifying a failed edge between the node and a second node;

identifying a first arc between the node and the second node, the first arc existing in a first subgraph corresponding to the subgraph over which the circuit is routed;

identifying a second arc between the first node and the second node, the second arc having a direction which is different than the direction of the first arc and the second arc existing in a second subgraph; and generating a looping arc such that signals which arrive for transmission on the first arc in the first subgraph are looped back to a first one of the first and second nodes along the second arc in the second subgraph.

* * * * *

UNITED STATES PATENT AND TRADEMARK OFFICE
CERTIFICATE OF CORRECTION

PATENT NO. : 6,728,205 B1
APPLICATION NO. : 09/018354
DATED : April 27, 2004
INVENTOR(S) : Finn et al.

It is certified that error appears in the above-identified patent and that said Letters Patent is hereby corrected as shown below:

Title page,
Item [57], ABSTRACT,
Lines 11 and 12, replace "that the remains" with -- that it remains --.

Drawings,
Figure 16, identifier 422 delete "message" and replace with -- message --.

Column 2,
Lines 7 and 49, delete "bidirectional" and replace with -- bi-directional --.

Column 3,
Line 5, delete "require" and replace with -- requires --.

Column 4,
Line 8, delete "different self-healing" and replace with -- different, self-healing --.
Line 11, delete "features another" and replace with -- features, another. --.

Column 5,
Line 37, delete "loopback the" and replace with -- loopback, the --.
Line 47, delete "bidirectional" and replace with -- bi-directional --.

Column 6,
Line 5, delete "limitations it" and replace with -- limitations, it --.

Column 19,
Line 32, delete "first node n," and replace with -- first node $n_1$, --.

Column 20,
Line 32, delete "which" and replace with -- which: --.
Line 65, delete "may fewer" and replace with -- may be fewer --.

UNITED STATES PATENT AND TRADEMARK OFFICE
CERTIFICATE OF CORRECTION

| | | |
|---|---|---|
| PATENT NO. | : 6,728,205 B1 | |
| APPLICATION NO. | : 09/018354 | |
| DATED | : April 27, 2004 | |
| INVENTOR(S) | : Finn et al. | |

It is certified that error appears in the above-identified patent and that said Letters Patent is hereby corrected as shown below:

Column 21,
Lines 13 and 47, delete "which" and replace with -- which: --.
Line 45, delete "where" and replace with -- where: --.

Column 23,
Line 39, delete "cycle 98" and replace with -- cycle 98, --.

Column 25,
Line 39, delete "step 110" and replace with -- step 110, --.
Line 65, delete "which" and replace with -- which: --.

Column 26,
Line 53, delete "which" and replace with -- which: --.

Column 27,
Line 9, delete "included" and replace with -- included: --.
Line 39, delete "where" and replace with -- where: --.

Column 28,
Lines 7-12, delete and replace with -- For any source node S belonging to the set of nodes N, two directed trees indentified as Blue tree B and Red tree R, may be generated such that after eliminating any pair of arcs $(v_1, v_2)$ and $(v_2, v_1)$ from the set of arcs A, the source node S remains connected to all nodes N of the network thorugh the arcs of the Blue and/or Red trees. --.

Column 33,
Line 47, delete "(i.e..$L_{arc,B}+L_{arc,R}\leqq C$)" and replace with -- (i.e..$L_{arc,B}+L_{arc,R}\leq C$) --.

UNITED STATES PATENT AND TRADEMARK OFFICE
CERTIFICATE OF CORRECTION

PATENT NO. : 6,728,205 B1
APPLICATION NO. : 09/018354
DATED : April 27, 2004
INVENTOR(S) : Finn et al.

It is certified that error appears in the above-identified patent and that said Letters Patent is hereby corrected as shown below:

Column 35,
Line 35, delete "require" and replace with -- required --.

Column 36,
Line 23, delete "(i.e..$L_{arc,B}+L_{arc,R}$)" and replace with -- (i.e..$L_{arc,B}+L_{node,R}$) --.

Column 37,
Line 2, delete "having a" and replace with -- having --.
Lines 7 and 30, delete "where" and replace with -- where: --.
Line 28, delete "a:" and replace with -- as: --.

Column 38,
Lines 1, 40 and 57, delete "where" and replace with -- where: --.
Line 44, delete "that" and replace with -- that: --.

Column 39,
Line 26, delete ". a second" and replace with -- . A second --.

Column 41,
Lines 15-52, move text beginning with "Processing then proceeds to Step 400...processing flows to Step 408 where the subgraph $B_m$" which will then be immediately followed by "over which the circuit was routed is identified.".

Column 41, line 53 though Column 42, line 24,
Move text beginning with "Referring now to FIG. 14B, … array S at array position 1.1" to Column 41, line 15.

UNITED STATES PATENT AND TRADEMARK OFFICE
CERTIFICATE OF CORRECTION

PATENT NO. : 6,728,205 B1
APPLICATION NO. : 09/018354
DATED : April 27, 2004
INVENTOR(S) : Finn et al.

It is certified that error appears in the above-identified patent and that said Letters Patent is hereby corrected as shown below:

<u>Column 42,</u>
Line 45, replace "n" with -- in --.

<u>Column 45,</u>
Line 18, replace "andedges;" with -- and edges; --.
Line 19, replace "identifying bi-directional" with -- indentifying the bi-directional --.

<u>Column 47,</u>
Line 47, delete "192 a" and repalce with -- 192, a --.

Signed and Sealed this

Twenty-seventh Day of June, 2006

JON W. DUDAS
*Director of the United States Patent and Trademark Office*